(12) United States Patent
Lund

(10) Patent No.: US 6,237,500 B1
(45) Date of Patent: May 29, 2001

(54) SYSTEM FOR AUTOMATED TRANSPORT OF PASSENGER CABINS, AUTOMOBILE PLATFORMS AND OTHER LOAD-CARRIERS

(75) Inventor: VanMetre Lund, Evanston, IL (US)

(73) Assignee: Autran Corp., Evanston, IL (US)

( * ) Notice: Subject to any disclaimer, the term of this patent is extended or adjusted under 35 U.S.C. 154(b) by 0 days.

(21) Appl. No.: 09/240,187

(22) Filed: Jan. 29, 1999

Related U.S. Application Data

(62) Continuation-in-part of application No. 09/005,854, filed on Jan. 12, 1998, now Pat. No. 6,082,268, and a continuation-in-part of application No. 08/945,919, filed as application No. PCT/US96/09390 on Jun. 6, 1996, now Pat. No. 5,979,334, and a continuation-in-part of application No. 08/746,318, filed on Nov. 12, 1996, now Pat. No. 5,706,735, and a continuation-in-part of application No. 08/481,771, filed on Jun. 7, 1995, now Pat. No. 5,590,604, and a continuation-in-part of application No. 08/477,182, filed on Jun. 7, 1995, now Pat. No. 5,590,603, and a continuation-in-part of application No. 08/475,750, filed on Jun. 7, 1995, now Pat. No. 5,598,783.

(51) Int. Cl.[7] ........................................................ B61J 3/00
(52) U.S. Cl. .................................. 104/88.01; 104/130.01
(58) Field of Search ............................ 104/88.01, 88.02, 104/88.04, 130.01

(56) References Cited

U.S. PATENT DOCUMENTS

| | | |
|---|---|---|
| 3,368,496 | 2/1968 | Falk et al. . |
| 4,538,950 | 9/1985 | Shiomi et al. . |
| 4,766,547 | 8/1988 | Modery et al. . |
| 4,991,516 * | 2/1991 | Rixen et al. .......................... 104/130 |
| 5,165,830 | 11/1992 | Vecellio . |
| 5,249,905 | 10/1993 | Warner . |
| 5,437,536 | 8/1995 | Bianca . |
| 5,775,227 * | 7/1998 | Mullen .............................. 104/88.04 |
| 6,039,135 | 3/2000 | Henderson . |

OTHER PUBLICATIONS

Paper 10 & 18 of Collection of Papers on Trans & Theory by J. Edward Anderson Date of Publication Unknown.
Paper 10—"Maximum Throughput", Etc.
Paper 18—"Control of Personal Rapid Transit Systems".

* cited by examiner

*Primary Examiner*—S. Joseph Morano
*Assistant Examiner*—Robert J. McCarry, Jr.

(57) ABSTRACT

A system is provided that uses small carrier vehicles that operate along electrified guideways and use standardized connections to automatically carry load-carriers to desired destinations. The load-carriers may be passenger cabins, freight loads or automobile platforms and in each case are loaded and unloaded at separate loading and loading regions. Loading regions are preceded by queue portions of branch paths and may include a group of regions which may be a series of cabin loading regions along a branch path or may be automobile loading regions in side-by-side lanes. Passenger station arrangements are provided for rapid and efficient movement of passengers and for transfer operations when desired. Platform constructions and loading arrangements are provided for rapid loading and unloading and safe transport of automobiles.

48 Claims, 33 Drawing Sheets

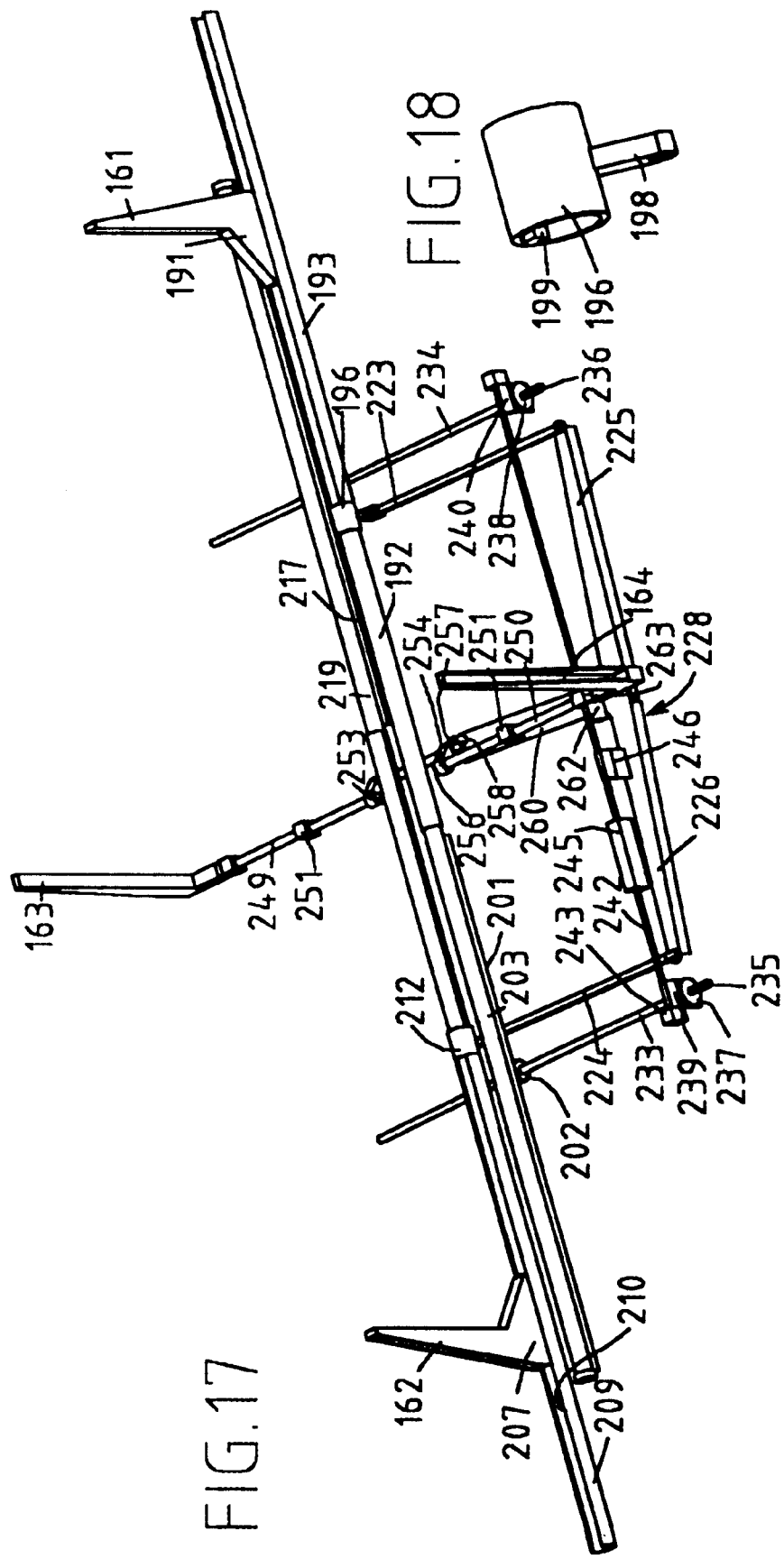

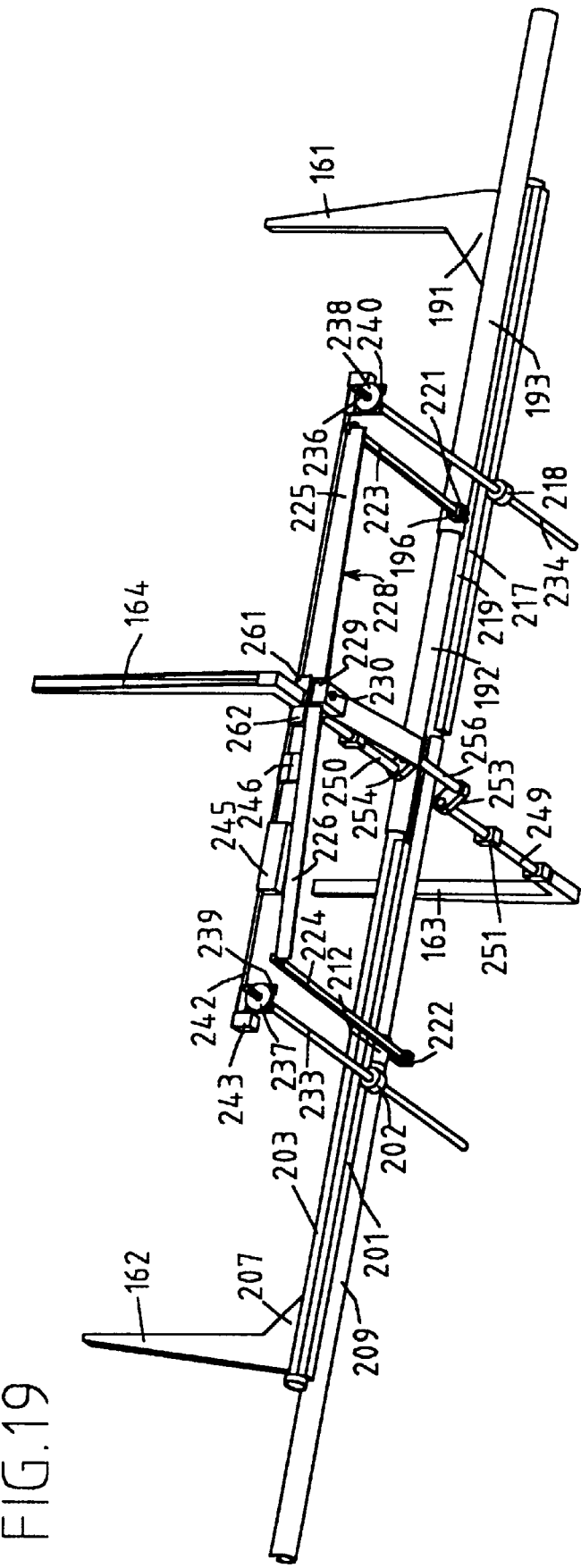

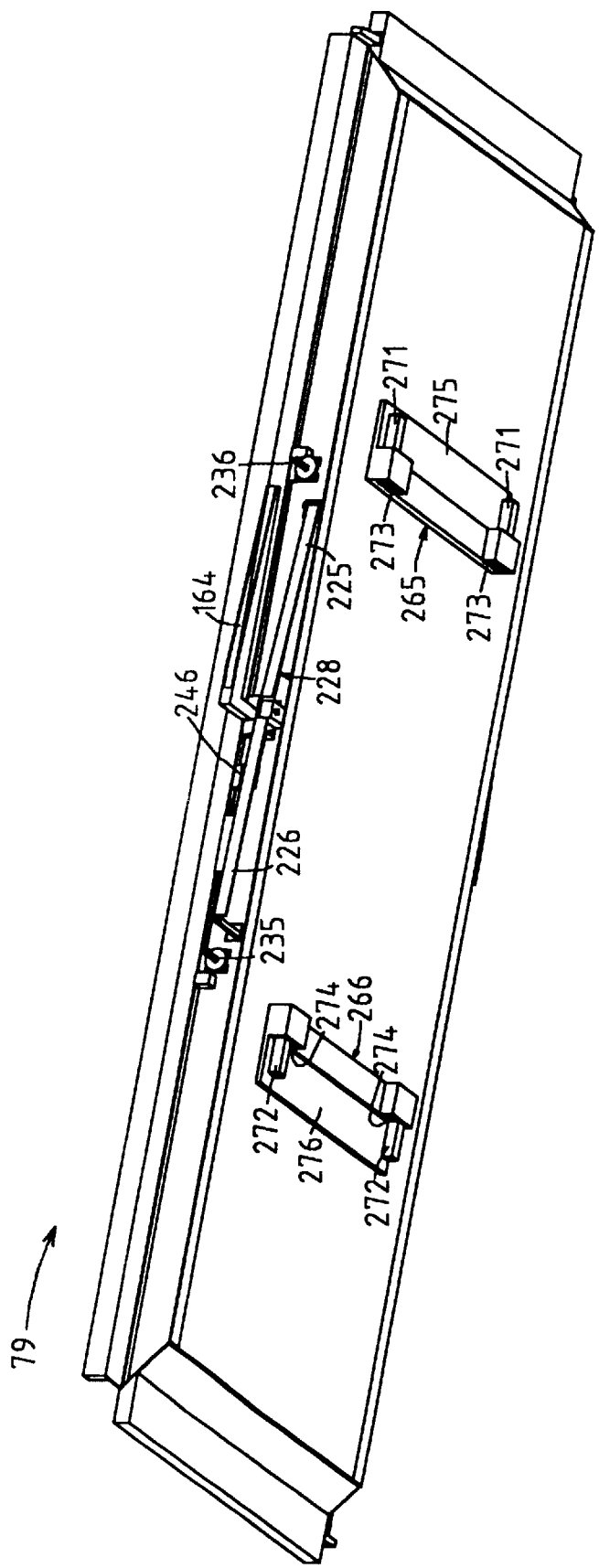

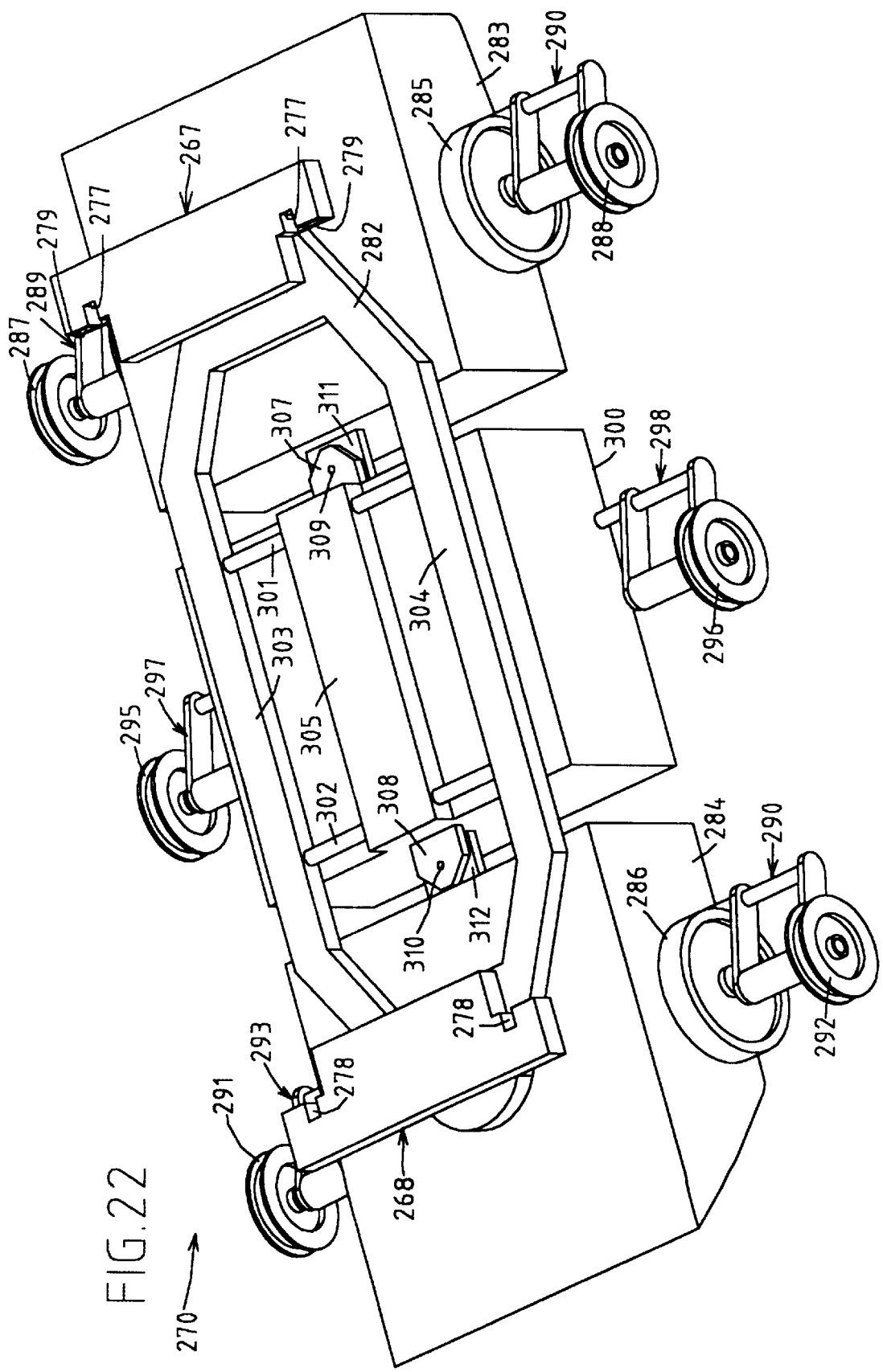

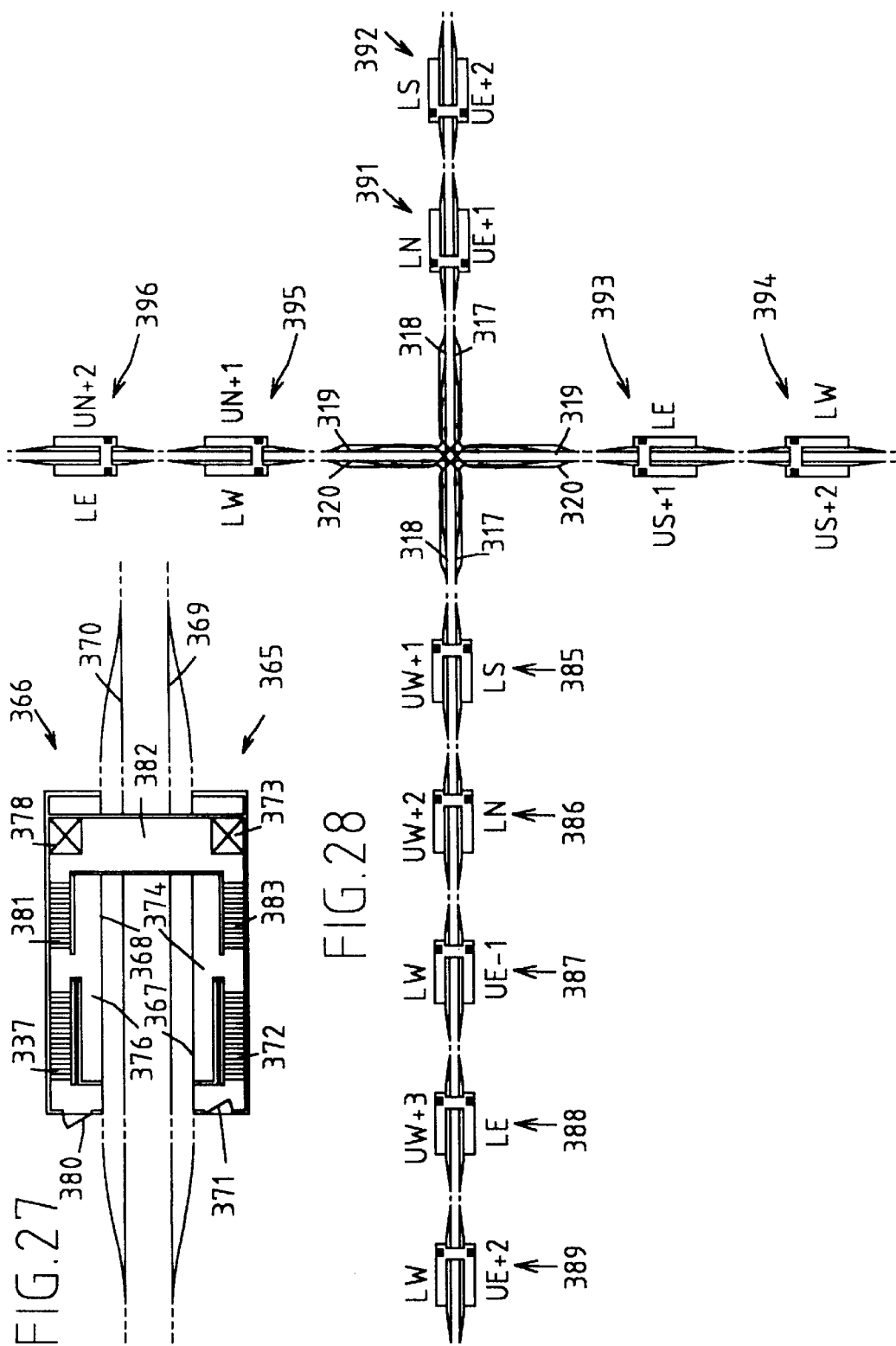

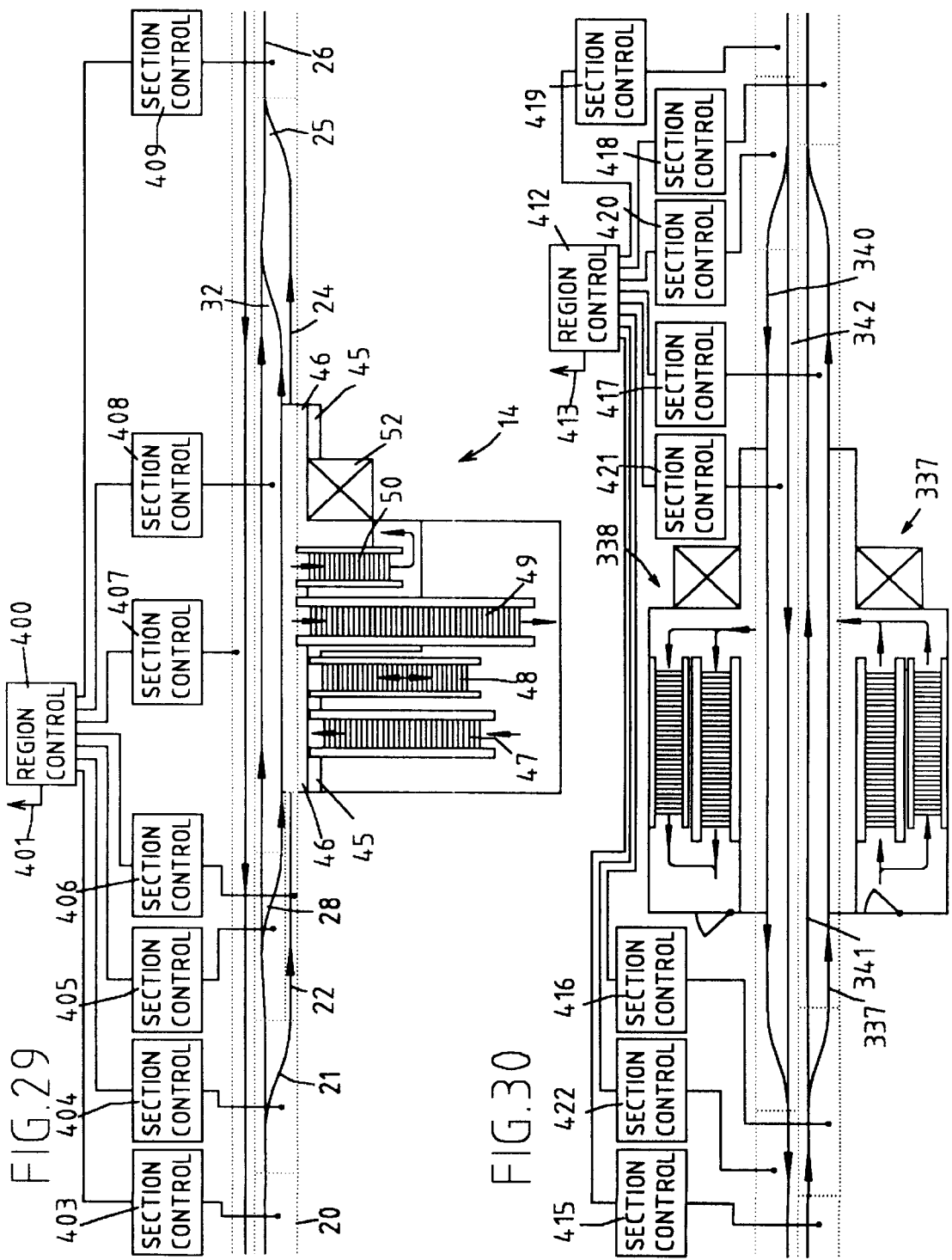

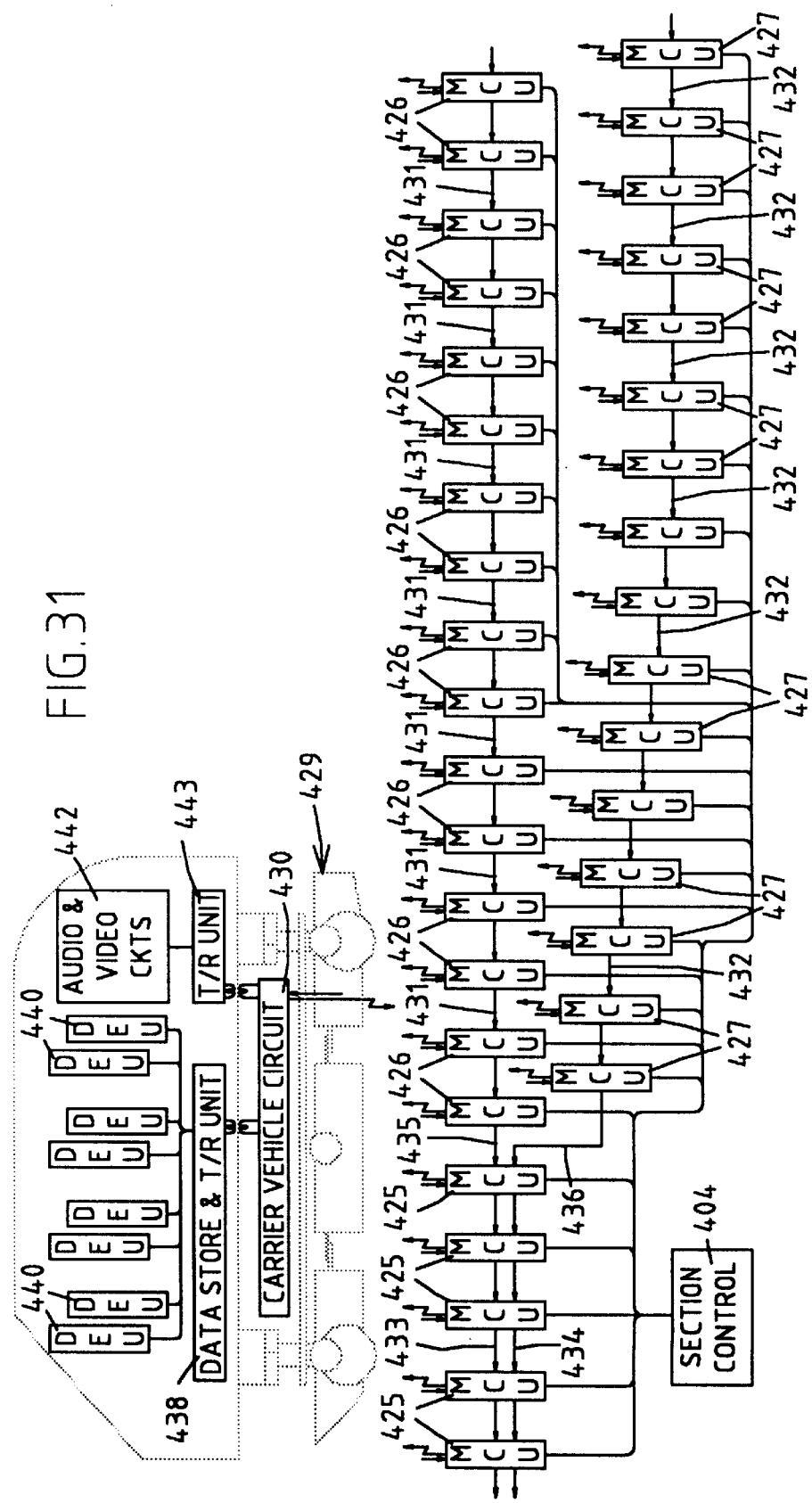

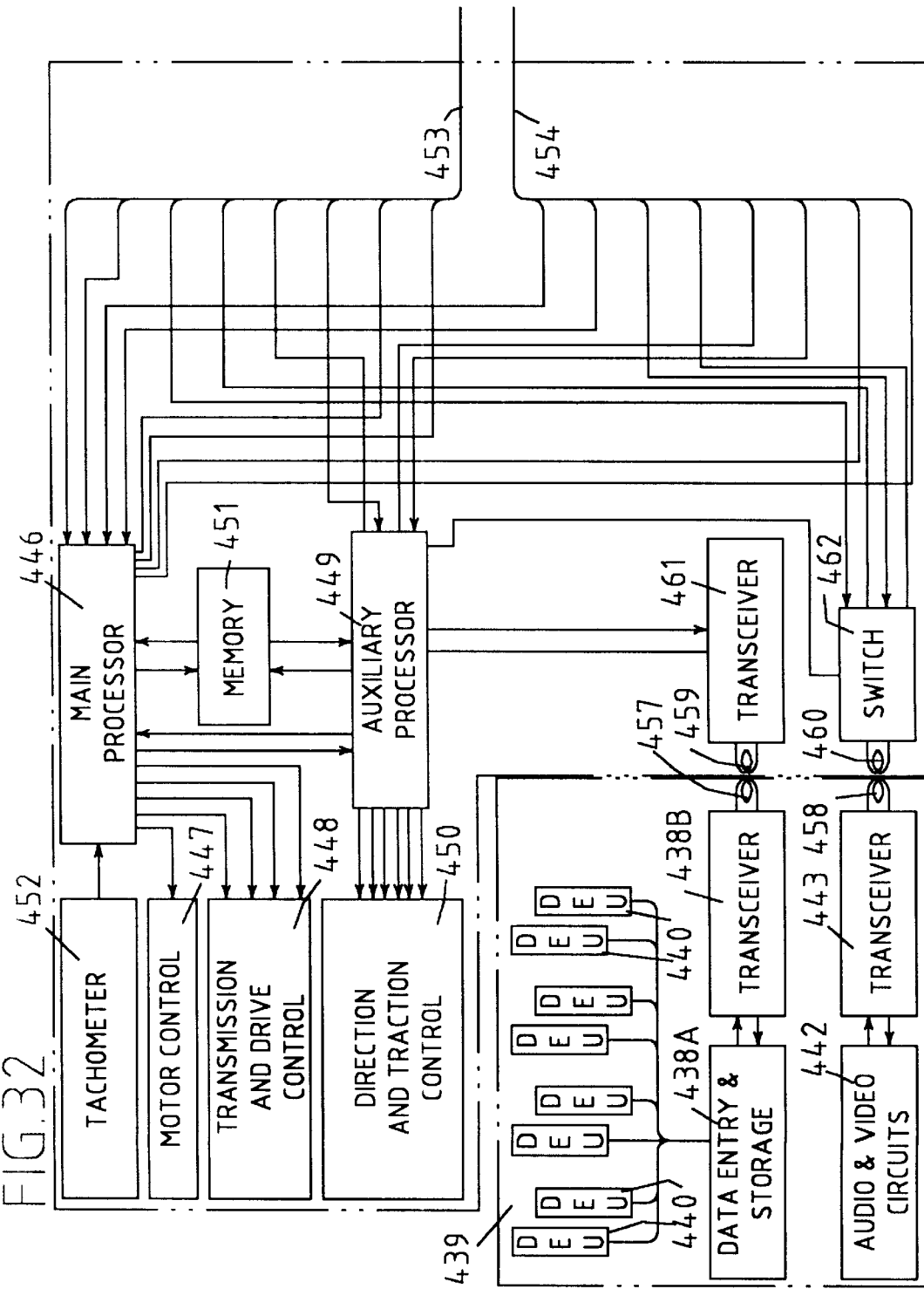

SYSTEM FOR AUTOMATED TRANSPORT OF PASSENGER CABINS, AUTOMOBILE PLATFORMS AND OTHER LOAD-CARRIERS

REFERENCE TO RELATED APPLICATIONS

Claim is made to the priority of the following national applications and U.S. Patents, this application being a continuation-in-part of the disclosures thereof:

1) Application in the USA of Van Metre Lund entitled "INTEGRATED TRANSPORTATION SYSTEM INCLUDING TRANSFER VEHICLES", U.S. Ser. No. 08/475,750, filed Jun. 7, 1995, issued as U.S. Pat. No. 5,598,783 on Feb. 4, 1997;

2) Application in the USA of Van Metre Lund entitled "TRANSPORTATION SYSTEM INCLUDING ELEVATED GUIDEWAY", U.S. Ser. No. 08/477,182, filed Jun. 7, 1995, issued as U.S. Pat. No. 5,590,603 on Jan. 7, 1997;

3) Application in the USA of Van Metre Lund entitled "TRANSPORTATION SYSTEM WITH HIGH SPEED VEHICLES AND AUTOMATIC CONTROL", U.S. Ser. No. 08/481,771, filed Jun. 7, 1995, issued as U.S. Pat. No. 5,590,604 on Jan. 7, 1997;

4) Application in the USA of Van Metre Lund entitled "SYSTEM FOR AUTOMATED TRANSPORT OF AUTOMOBILE PLATFORMS, PASSENGER CABINS AND OTHER LOADS", U.S. Ser. No. 08/746,318, filed Nov. 12, 1996, issued as U.S. Pat. No. 5,706,735 on Jan. 13, 1998;

5) Application in the USA of Van Metre Lund entitled "SYSTEM FOR AUTOMATED TRANSPORT OF AUTOMOBILE PLATFORMS, PASSENGER CABINS AND OTHER LOADS", assigned U.S. Ser. No. 08/945,919 and a filing date of Dec. 1, 1997 now U.S. Pat. No. 5,979,334 upon acceptance of International Application No. PCT/US96/09390 that has a filing date of Jun. 6, 1996 and that was published Dec. 19, 1996, International Publication No. WO 96/40545; and 6) Application in the USA of Van Metre Lund entitled "SYSTEM FOR AUTOMATED TRANSPORT OF AUTOMOBILE PLATFORMS, PASSENGER CABINS AND OTHER LOADS", U.S. Ser. No. 09/005,854, filed Jan. 12, 1998, now U.S. Pat. No. 6,082,268.

The disclosures of said prior applications are incorporated herein by reference.

BACKGROUND OF THE INVENTION

1. Field of the Invention

This invention relates to a transportation system and more particularly to a system usable for transportation of people as well as automobiles and other freight loads with very high safety, efficiency, speed and convenience, with capital costs and fuel, labor and other operating costs being minimized and with minimal adverse environmental effects. The system is compatible with existing systems and is readily integrated therewith.

2. Background of the Prior Art

Conventional rail systems have become increasingly costly to construct, maintain and operate with the result that their use for transport of freight and for interurban passenger travel has been supplanted to a large degree by use of trucks and automobiles. For public transportation in cities, rail-supported street cars have been replaced by buses which have been used less and less as a result of the increased use of automobiles for personal travel. The resulting truck and automobile traffic over streets and highways is a problem of increasing magnitude.

Systems known as "Intelligent Vehicle Highway Systems" are now being proposed for reducing certain problems associated with automobiles and are receiving considerable attention, but it appears that they may be very expensive and the degree to which such systems will be successful is open to question. Systems have been also been used or proposed using automatically operated and driver-less vehicles supported on elevated "monorail" guideways, but such systems have generally been limited to use on a small scale in special applications and have not enjoyed widespread success.

High speed rail systems are also being proposed but it is questionable whether they will attract enough passengers to justify the very high costs of constructing and operating such systems. Passengers who might consider using such systems may find the scheduled times unattractive and decide instead to travel by automobile, leaving when they want to leave.

SUMMARY OF THE INVENTION

This invention was evolved with the general object of overcoming disadvantages of prior transportation systems and of providing a practical system for general use in transportation of people and freight in urban and interurban use.

Another object of the invention is to provide a transportation system which is compatible with existing transportation systems.

A further object of the invention is to provide a transportation system which makes practical use of existing technology and which is so constructed as to allow for expansion and for the use of improvements which may reasonably be expected in the future from advancing technology.

Still another object of the invention is to provide a system which is convenient, fast, low in cost and otherwise attractive for travel as a passenger, for travel by automobile and for transport of freight.

The system of this invention uses many of the advantageous features that are disclosed in my aforementioned patents and patent applications. It uses automated carrier vehicles which can carry small passenger cabins, automobile platforms or freight containers and move at high speed along a main path, move off at a divergent Y guideway section to stop along a branch path for loading or unloading and then enter a convergent Y section to reenter the main path.

A very important feature of the invention relates to the recognition of the importance of providing a system that is immediately available for use when desired and to the recognition of features that are necessary to produce that objective. It must be recognized that the extensive use of the automobile for travel is due to the fact that people know that they can get in their automobiles, be on their way without delay and continue to their destinations.

To have a passenger carrying system that can compete with the immediately available capability of the automobile requires that a cabin be stopped in a station to be available for immediate use when one or more passengers enter the station. This imposes another requirement which leads to a system that is quite different from conventional transportation systems. In particular, it is found that a region used for loading passengers should be used for that purpose alone and a that a region used for unloading passengers should be used for that purpose alone. It is found from analysis that if one region is used for both purposes, a cabin cannot always be available for immediate use since it may be necessary to either await arrival of a cabin dispatched from a distance or await an incoming cabin that is to be unloaded. It is also found that incoming loaded cabins cannot always be immediately unloaded. If there is an empty cabin in the region, the incoming loaded cabin must either wait until a passenger arrives or wait until the empty cabin is dispatched to another location. An additional problem in using one region for both purposes is that passengers may take an unduly long time to reach their destinations, sometimes encountering stops and associated delays at every intervening station before reaching his or her destination.

The use of separate regions for loading and unloading avoids these problems and thus has important advantages from the standpoint of speed, making cabins immediately available to passengers and minimizing travel time. It is found that such speed advantages can be insured by providing a supply of cabins such that upon departure of one cabin, another cabin can be quickly made available for use by the next passenger or passengers who enter the station. In a preferred arrangement, queue portions of branch paths precede loading regions and have sizes sufficient for containing several cabins awaiting entry into passenger loading regions.

Still another speed advantage is obtained by providing a group of loading regions for simultaneous loading. In the case of a passenger station, the loading regions are preferably located seriatim along a branch path, opposite a loading platform therealong. This feature is particularly important during rush hours when passengers are arriving at a rapid rate.

There are other important features that relate to passenger use. In one type of passenger station of the invention, loading and unloading regions are provided at different levels along portions of associated branch paths that are located one above the other. This type of station is advantageous for use as a transfer station in which passengers arriving at an unloading region can move to the loading region to travel to a desired destination.

Another type of passenger station is usable only as an loading station or as an unloading station. A pair of stations of this type can be located on opposite sides of guideways that define parallel paths going in opposite directions and that may be elevated above a street. In this case, passengers departing from a loading station on one side of the street to go in one direction may come back to the unloading station on the opposite side of the street. It is also possible to use locate such a pair of stations near an interchange and use it for transfer purposes as well as for exit purposes. In this case, an elevated cross-over may preferably be provided to allow passengers to move from the unloading station to the loading station without crossing a street.

In urban areas, it is desirable to use elevated guideways that extend along streets or other readily available rights-of-way and it is desirable that loading and unloading levels be above ground level. In each type of station, elevators are provided for use by handicapped persons and stairs as well as escalators may also be provided.

With respect to transport of automobiles, the system has important advantages. In comparison to conventional travel by automobiles, travel by automobile with the system avoids any strain on a driver and is faster, safer and with less adverse environmental effects.

Immediate availability for use is also important in making the system attractive for use in moving automobiles and some of the same considerations that are applicable to passenger use and also applicable to automobile use. It is highly desirable to use separate loading and unloading regions, that there be queue portions of branch paths that precede loading regions and have sizes sufficient for containing several empty platforms awaiting entry into automobile loading regions.

It is also desirable that there be a group of loading regions that follow each queue portion of a branch path and that may be in use at the same time. For loading of automobiles, loading regions are provided in two or more lanes which may be selectively used, allowing a driver to select one lane when another is in use, thereby speeding up entry into the system.

An important consideration is that immediate availability for use is not only important from the standpoint of being attractive to those who may wish to use the system but is also very important from the standpoint of speeding up entry into the system and the number of passengers or automobiles that can enter and exit each station per unit time. When more passengers and automobiles can be transported per unit time without any substantial increase in the capital costs of providing guideways and stations, it means that the portion of fares that are attributable to such capital costs can be proportionately reduced.

Important features relate to the construction and operation of automobile platforms and to the rapid loading of automobiles thereon and unloading of automobiles therefrom. In a preferred arrangement, an empty platform to be loaded is moved forwardly under an automobile support structure which is then tilted downwardly to position the forward end thereof at the same level as the platform. The automobile is then driven forwardly to engage its front bumper with an element of a buffer assembly which is so positioned as to center the automobile on the platform. Then forward and rearward lock means of the platform are moved from lowered folded positions to upwardly projecting positions, being then moved rearwardly and forwardly into engagement with front and rear bumpers of the automobile. The buffer assembly is then moved out of the way and the automobile and its occupants are carried on the platform to a desired destination. The buffer assembly absorbs shocks and is very rugged and its use avoids stresses which might otherwise be applied to elements of the platform.

At an unloading station, the operation is reversed. After moving the forward and rearward lock means forwardly and rearwardly, they are moved downwardly to lowered folded positions and the automobile is then driven off of the platform and onto a receiving structure which has been tilted to place its rearward end at the same level as the platform. Then the receiving structure is lifted to allow the folded platform to be moved thereunder and to a storage position to a queue of a loading station. The loading and unloading stations both have operating means for controlling folding and unfolding mechanisms of the platforms.

Further features relate to the construction of guideways and guideway interchanges in a manner such that they can be readily installed in urban areas as elevated structures over streets or other available rights-of-way.

Additional features relate to control of the vehicles in a manner such that they can be moved at high speeds but with safe distances between vehicles. Vehicles which have been loaded or unloaded at stations along branch can safely merge into the flow of vehicles on main paths. The system provides for communications such that passengers in cabins and occupants of automobiles can choose and modify their destination, issue emergency alerts and obtain instructions.

These and other objects, features and advantages will become more fully apparent from the following detailed description taken in conjunction with the accompanying drawings.

BRIEF DESCRIPTION OF THE DRAWINGS

FIG. 17 is a view like FIG. 16 but showing the positions of components in an unfolded condition of the platform;

FIG. 18 is an enlarged view of a turn sleeve component of the mechanism shown in FIGS. 16 and 17;

FIG. 19 is a view of the mechanism shown in FIG. 17 but from a different viewpoint, looking upwardly rather than downwardly;

FIG. 21 is a view looking at the underside of the complete platform in a folded condition and showing connectors used in connecting the platform to a carrier vehicle;

FIG. 22 shows a carrier vehicle usable in the system of the invention;

FIG. 27 is a diagrammatic view of another alternative passenger station arrangement;

FIG. 28 is a diagrammatic view showing an arrangement of passenger stations in relation to the interchange of FIG. 23;

FIG. 29 is a diagrammatic view showing a region control and section controls used in control of movement of vehicles through and past the passenger station of FIGS. 1–3;

FIG. 30 is a diagrammatic view similar to FIG. 29 but showing a region control and a section control used in control of movement of vehicles through the alternative passenger station arrangement of FIG. 26;

FIG. 31 is a view showing the interconnection of monitoring and control units and a section control of the system shown in FIG. 29;

FIG. 32 is a schematic diagram of circuitry of a carrier vehicle;

DESCRIPTION OF PREFERRED EMBODIMENTS

Figure 1:
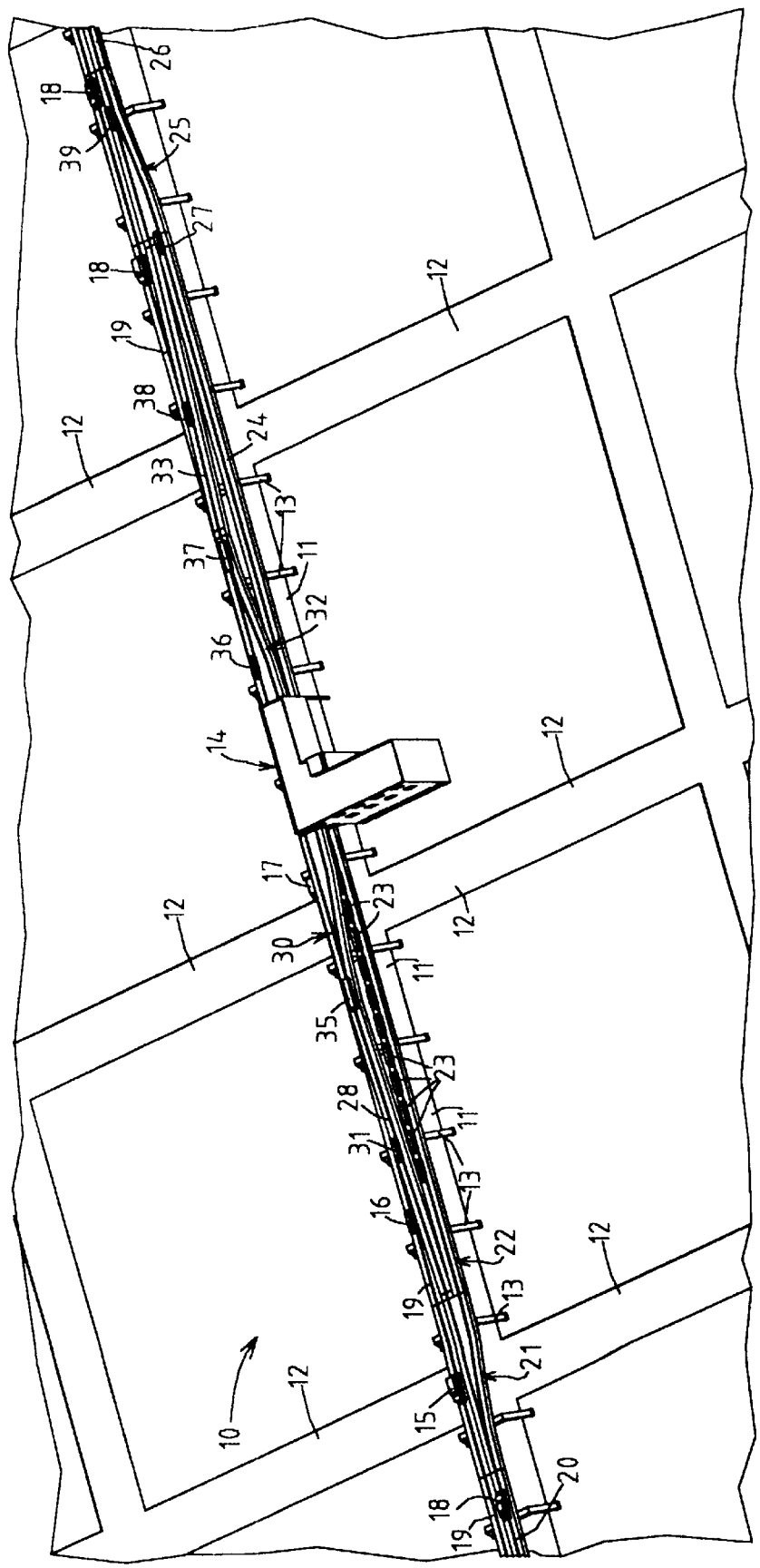
FIG. 1 is an aerial view showing an urban area including a passenger station and guideways of a transportation system of the invention.

Reference numeral 10 generally designates a transportation system constructed in accordance with the principles of this invention. The system 10 includes carrier vehicles which move in guideways and which may carry load-carriers of different types. As illustrated, the system 10 includes load-carriers in the form of passenger cabins that are arranged to be loaded and unloaded at passenger stations along the guideway. It also includes load-carriers in the form of automobile platforms that are arranged to be loaded and unloaded at automobile loading and unloading stations which are provided along the guideway at locations different from the locations of passenger stations. It may also include load-carriers in the form of freight containers that are not shown but which may be loaded and unloaded at freight stations, that are also not shown but, if provided, are preferably separate from passenger and automobile stations.

A control system is provided that controls each vehicle to move to a selected station along a guideway and that has features like disclosed in my aforesaid U.S. Pat. No. 5,590, 604. The control system preferably effects control of carrier vehicles from command signals that are transmitted thereto from monitoring and control units along the guideway. Each such unit controls the maximum speed of a passing vehicle and operates to reduce the speed of a passing vehicle when necessary to maintain a safe distance behind a vehicle ahead. The control system also performs merge control operations in which a vehicle may be accelerated on a branch path of a guideway to safely enter a stream of vehicles moving at high speed on a main path of a guideway.

Each user of the system whether as a passenger or as the driver of an automobile may be issued a hand-held control device which has a keyboard and display and which may be capable of issuing audible instructions. Each such device may effect wireless communications through short distances and with devices at various locations in the system to signal the identity of the user and to signal his destination. Each device may be used to issue distress signals when needed and to receive instructions from a central operator.

A user who has entered a passenger cabin and who occupies a region that includes a seat may key in a code number that is determined from a display within the cabin and that signals his or her destination. The display of the device may then show the selected destination and indicate to the user that it will remain selected if not changed. Data as to the identity of the user and as to his or her selected destination are then transmitted to the carrier vehicle which in turn transmits such data to control and monitoring devices along the guideway.

The guideways are of generally tubular form and include tracks for movement of carrier vehicles therewithin. Each carrier vehicle may have a construction such as shown in FIG. 22 and that is similar to the construction shown in FIGS. 21–25 of my aforesaid application Ser. No. 09/005, 854 filed Jan. 12, 1998. Front and rear posts project up from each carrier vehicle and through a relatively narrow slot in the top of the guideway and to a support pad to which a standard connector of a passenger cabin, automobile platform or other load-carrier may be releasably but securely connected.

Figure 4:
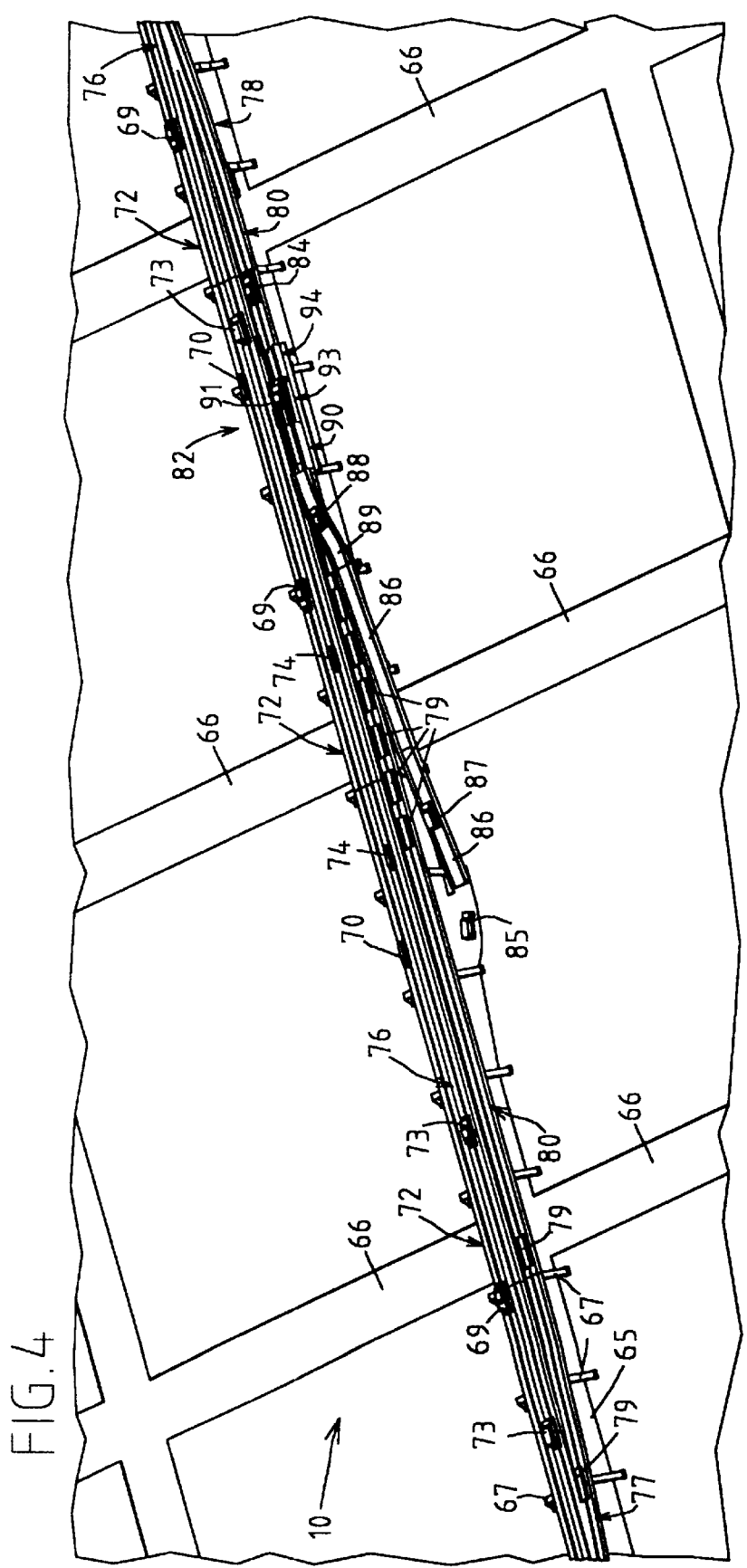
FIG. 4 is an aerial view similar to FIG. 1, but showing guideways, an automobile loading station and an associated entrance ramp structure of the transportation system of the invention.
Figure 5:
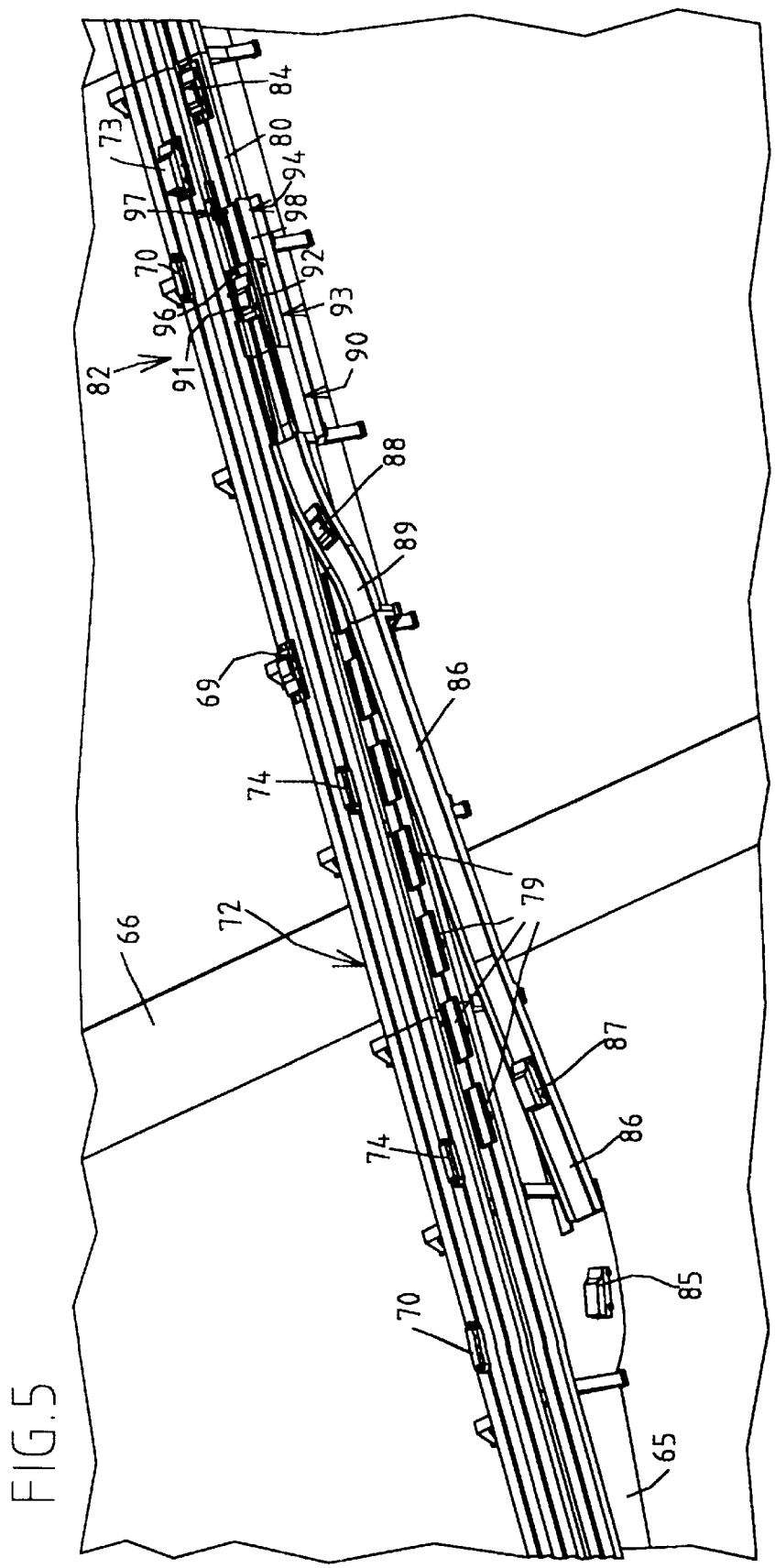
FIG. 5 is a view which is an enlargement of a portion of FIG. 4 to more clearly show the automobile loading station and associated entrance ramp structure.
Figure 6:
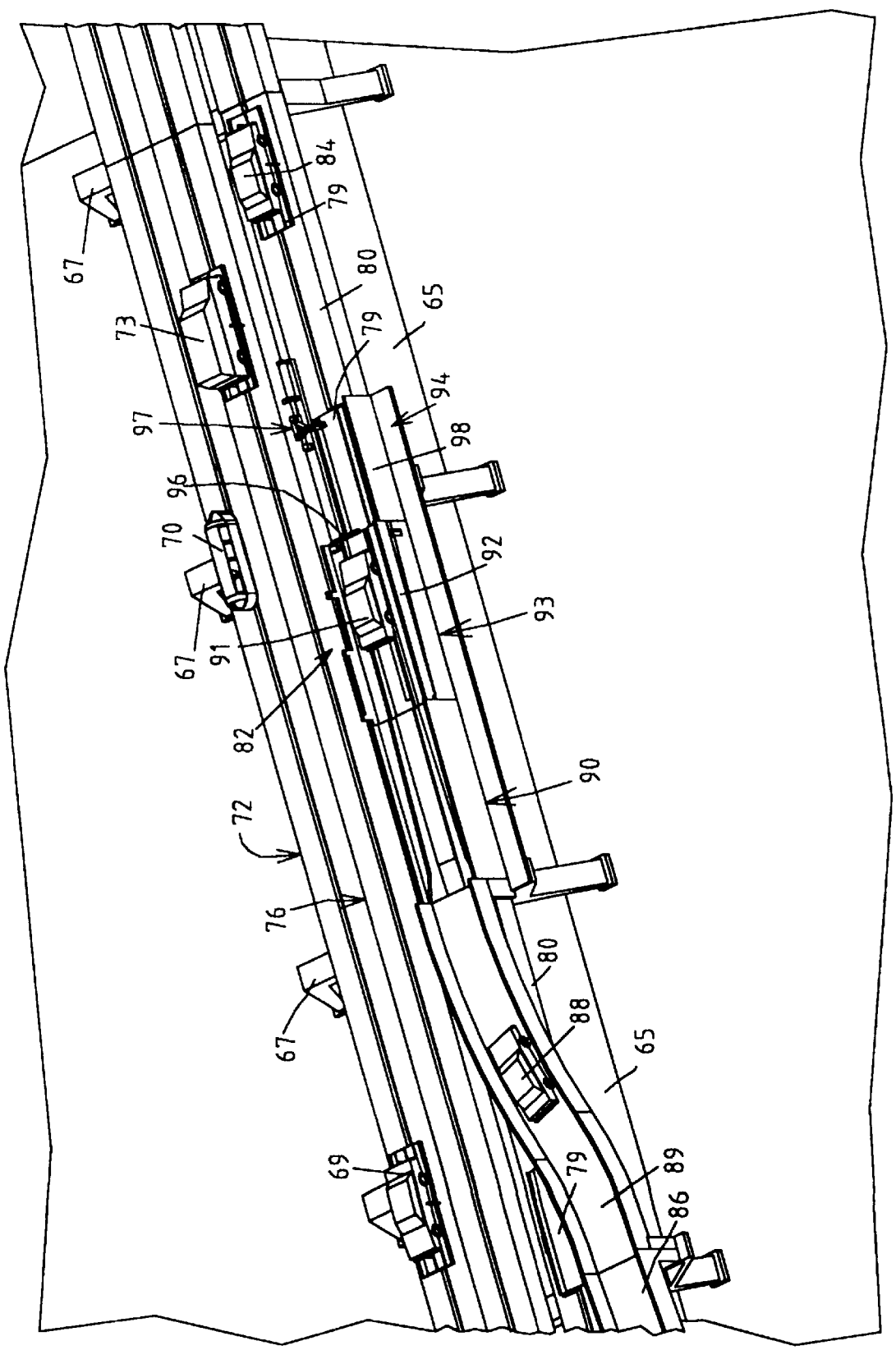
FIG. 6 is a view which is an enlargement of a portion of FIG. 5 to more clearly show the automobile loading station itself.
Figure 7:
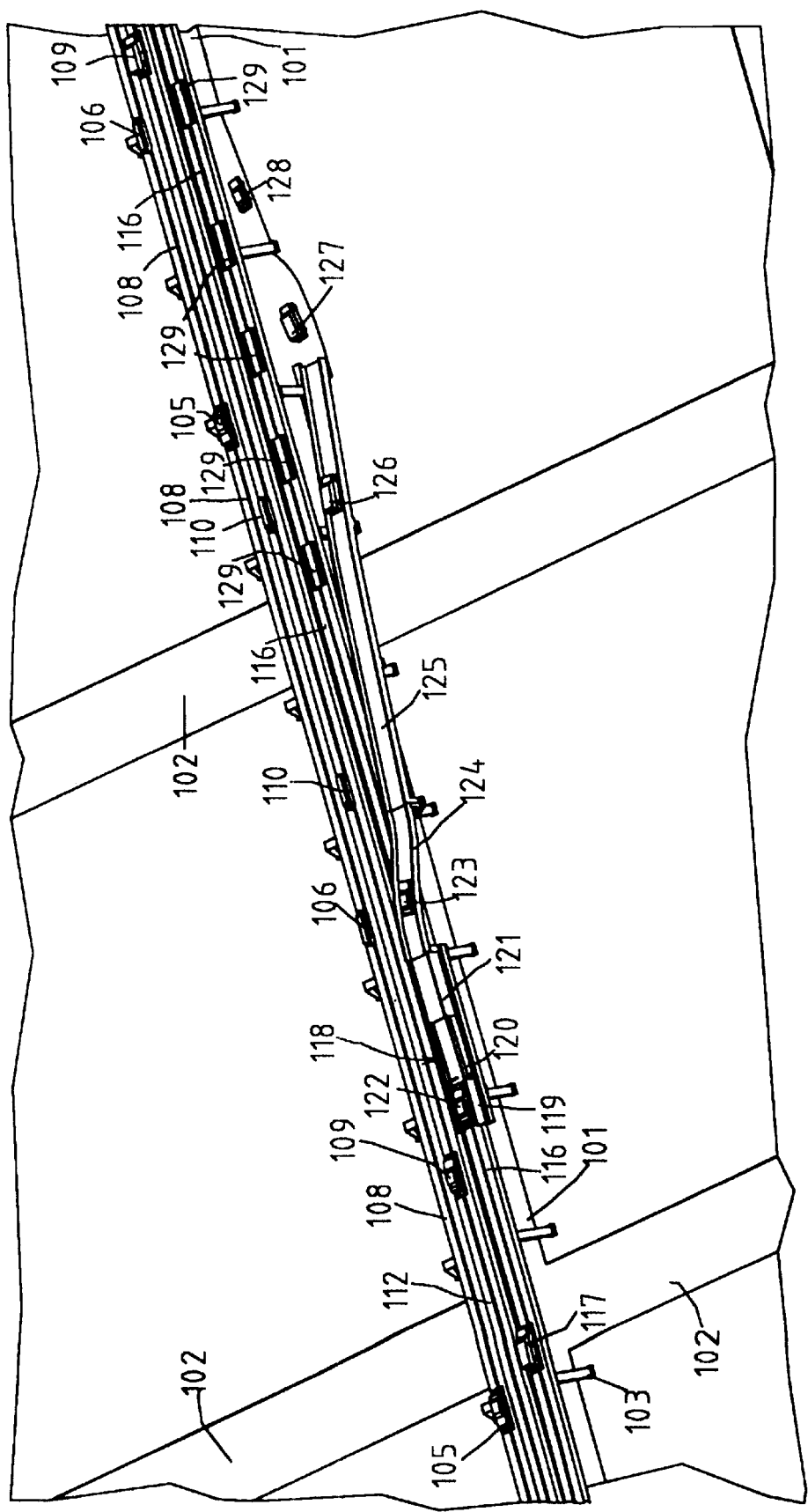
FIG. 7 is an aerial view similar to FIGS. 1 and 4 but showing guideways, an automobile unloading station and an associated exit ramp structure of the transportation system of the invention.

A passenger station is shown in the aerial view of FIG. 1, while automobile loading and unloading stations are shown in similar aerial views of FIGS. 4 and 7, each being a view of an urban area that includes a guideway supported above an east-west street which is crossed by north-south streets. In FIG. 1, an east-west street 11 is crossed by north-south streets 12. Supports 13 of inverted U-shaped configuration straddle the street 11 to support guideways above the path of traffic and away from trees and power lines that may be positioned along the sides of the street 11.

Figure 2:
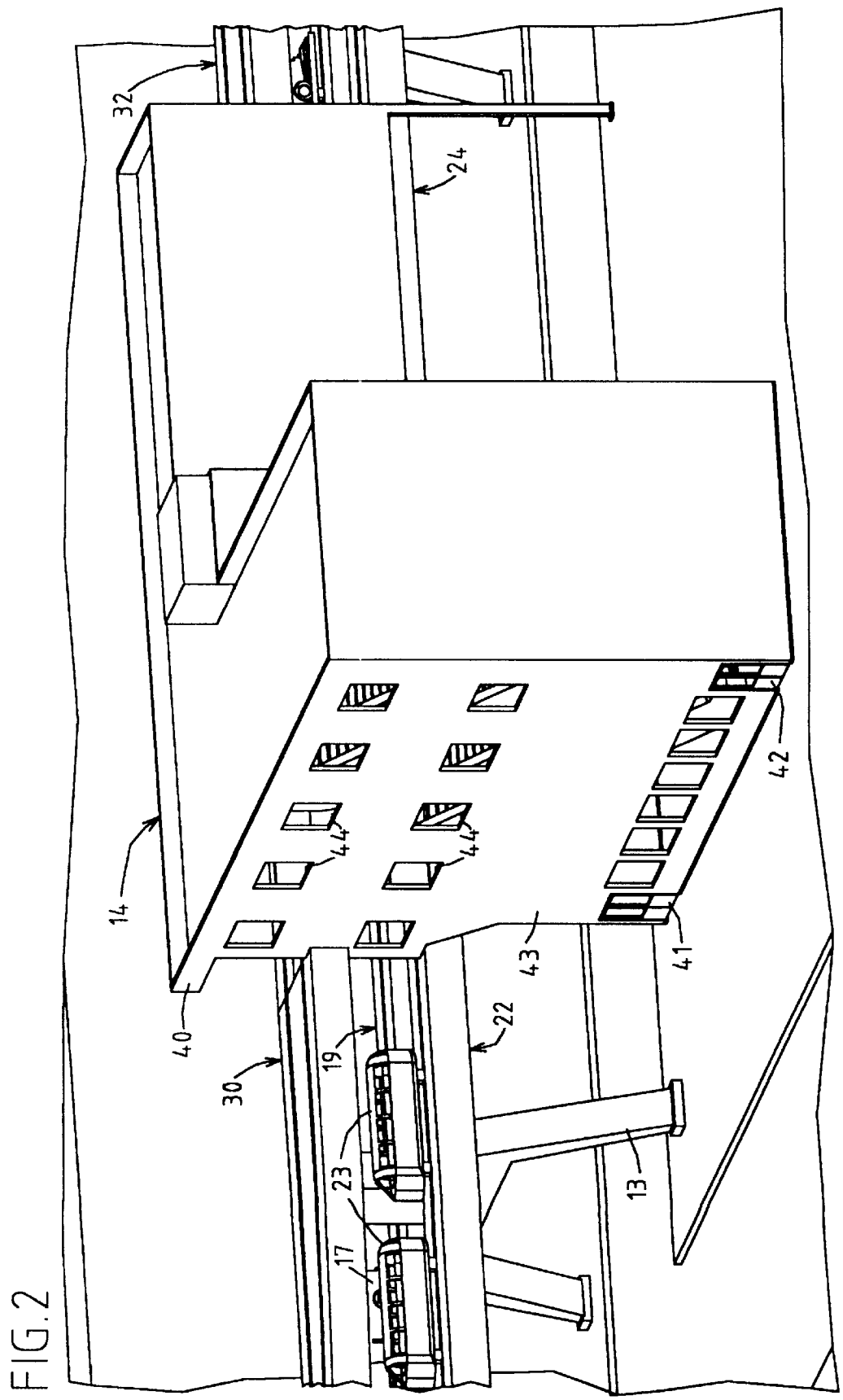
FIG. 2 is an aerial view similar to FIG. 1, but from a different viewing angle and showing only the passenger station and portions of the guideways in close proximity thereto.
Figure 3:
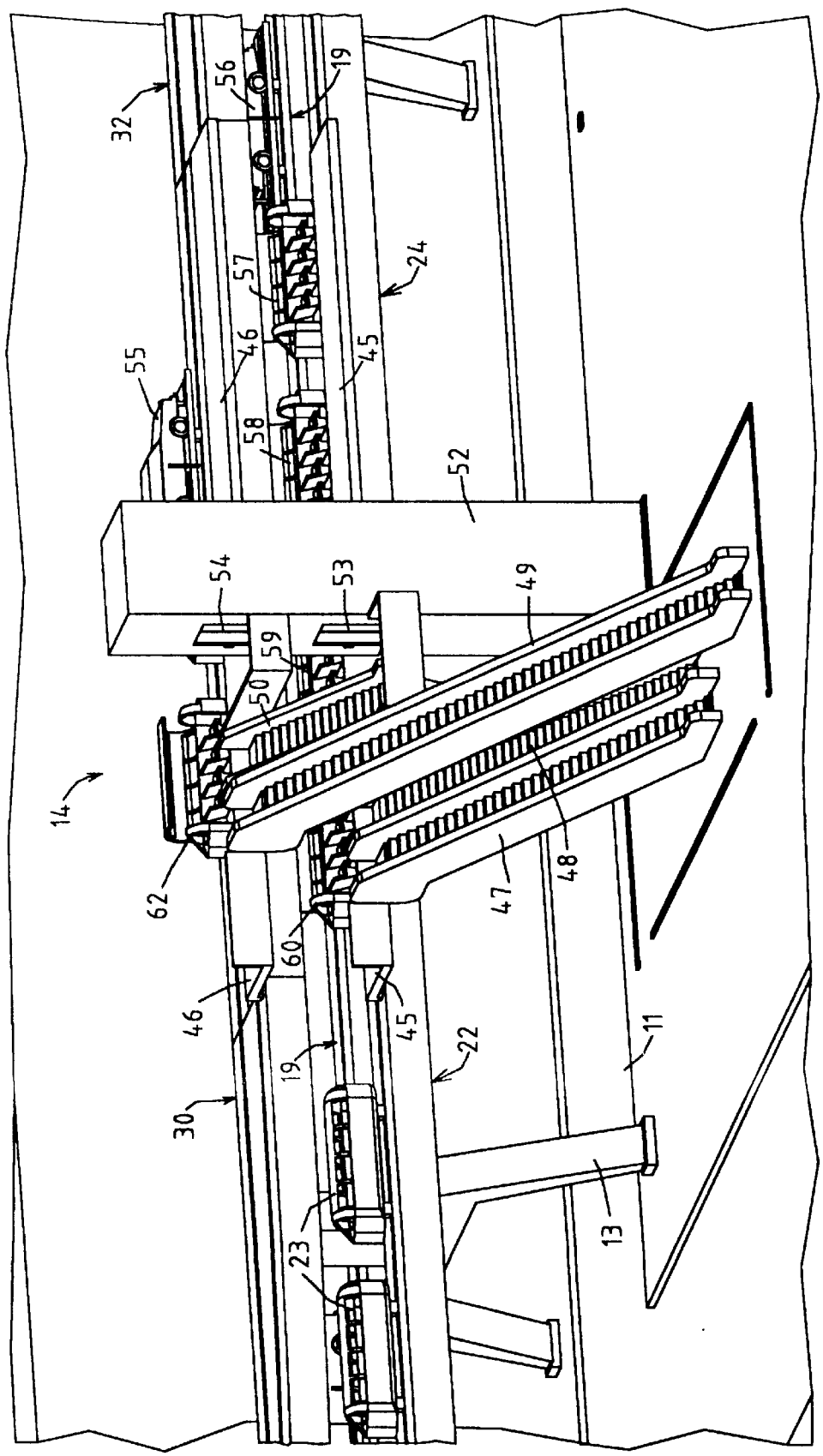
FIG. 3 is a view similar to FIG. 2, but with roof and wall structures of the passenger station removed to show how it is used by departing and arriving passengers.

Passenger Loading and Unloading (FIGS. 1–3)

An important feature of the invention relates to the provision of regions for loading and unloading of passengers and the provisions of branch guideway paths each of which allows movement of vehicles off of a main path and to one of such regions and then back onto the main path. Each of the carrier vehicles is controllable to stop at a loading region for entry of one or more departing passengers thereat and being controllable to thereafter stop at one or more unloading regions for exit of one or more arriving passengers at each such unloading region. This feature has advantages in that each cabin loaded with passengers may stop only at unloading regions selected by passengers who have entered together at one of the loading regions. It also facilitates temporary storage of carrier vehicles and cabins carried thereby in a queue in a portion of a branch guideway path ahead of a loading station, ready to be quickly moved into a loading region of the loading station when desired. At the same time, the separation of the loading and unloading regions allows cabins to be unloaded to be moved directly from a main guideway path and to an unloading region to be quickly unloaded and thereafter reenter the main path of the guideway.

In FIG. 1, a passenger station 14 is shown which includes loading regions and unloading regions, such regions being along portions of branch guideways that are separate from each other. Station 14 is positioned along the south side of the east-west street 11 and is designed for use by both arriving and departing passengers who have been or will be traveling in an easterly direction. At least one passenger may enter an awaiting cabin at a loading region. After each passenger selects a desired destination station, the loaded cabin is then moved at high speed to by-pass non-selected stations and to stop at an unloading region of the first selected destination station to allow one or more passengers to exit the cabin. If the cabin not then empty, it is moved to an unloading region of the next selected destination station. If it is empty, it is typically moved to a temporary storage region in proximity to another station to be movable to a loading region of that station.

When no new passenger is allowed to enter a cabin that is stopped at an unloading region, a cabin can contain only those passengers that entered together at the loading region of the initial station. This limits the maximum number of intermediate stops that can be encountered by any one passenger. The typical number is much less than the maximum number. For example, if an eight passenger cabin is fully loaded by eight passengers who proceed to select eight different destination stations, the first passenger to exit will have encountered no intermediate stops and the last passenger to exit will have encountered seven intermediate stops. The average in this case is 3.5 intermediate stops. However, when considering duplication in selection of destination stations and when considering that cabins will not be fully loaded, except in rush hours, a passenger may reasonably expect to encounter an average of less than two intermediate stops before reaching his or her destination.

The loading and unloading regions can be at the same level and separated in the direction of travel of vehicles and in separate stations or, as is the case with the station 14, they may be in one station and at different levels, one above the other. An advantage of this feature is that a common elevator may be used for getting to or from the loading and unloading regions. Another is that the station may be used as a transfer station in which passengers exiting from the unloading region my move directly to the loading region. A possible disadvantage is that passenger who enters the station for the purpose of going to the loading region may go to the unloading region and improperly attempt to enter a cabin thereat. However, such an improper attempt is discouraged by placing the unloading region above the loading region and making it necessary to climb a flight of stairs to get from the loading region to the unloading region.

FIG. 1 shows loads that are moving in a westerly direction and that include a platform-carried automobile 15, a passenger cabin 16, and additional platform-carried automobiles 17 and 18. Such loads move in a straight line along sections 19 that form a west-bound main guideway path on the northern side of the structure.

Loads that move in an easterly direction move along a guideway section 20 along a main path to a guideway section 21 which may be described as a divergent Y section in that it has a single entrance from which loads can diverge to either of two exits. Empty passenger cabins that are to pick up passengers at station 14 move eastwardly along section 20 of the main east-bound path, thence along the right or southward side of the divergent Y section 21 and thence in a straight eastward path along a branch path formed by sections 22 and into the west side of passenger station 14 at the lower entrance level thereof. Normally, there will be several passenger cabins such as cabins 23 as shown that are in a queue waiting to enter station 14.

Each cabin that is loaded within the station 14 is moved to the east and along section 24 and along the right or southward side of a convergent Y section 25 to enter a section 26 of the main east-bound path, a cabin 27 being shown at the entrance to the right side of convergent Y section 25.

Except for empty cabins that are to be loaded at station 14, loads coming from the west move from the section 20 of the main east-bound path and through the left or northward side of the divergent Y junction 21, thence upwardly along an up ramp section 28 to the entrance to a divergent Y section 30, a cabin 31 being shown on ramp section 28. If any such load is a passenger cabin that is to discharge one or more passengers at station 14, it will be moved along the right or southward side of the Y section 30 and to the station 14 at the upper exit level thereof. A cabin that has discharged one or more passengers in station 14 is moved along the right or southward side of a convergent Y section 32, thence down along a down ramp section 33 and thence along the left or northward side of the convergent Y section 25 to enter the section 26 of the main east-bound path.

If any load arriving at the left or westward side of the divergent Y section 30 is a load other than a passenger cabin that is to discharge one or more passengers, it is moved without stopping and at a relatively high speed past the station 14. More particularly, any such load is moved in a main path along the left or northern side of section 30, thence eastwardly past the station 14, thence along the left or northward side of convergent Y section 32, thence down along the down ramp section 33, thence along the left or northern side of convergent Y section 25 and to the main section 26. An empty platform 35, a passenger cabin 36 and another empty platform 37 are shown in such a main path.

A cabin 38 is shown on down ramp section 33 and a cabin 39 is shown on the left side of Y section 25. Either of such cabins may be a cabin that moved past the station 14 without stopping or a cabin that discharged one or more passengers at station 14.

With regard to guideway construction and support, the spacing between adjacent supports 13 is preferably substantially greater than the width of crossing streets and, in areas in which there is a uniform spacing between adjacent parallel streets, there are preferably an integer number of supports from one crossing street to the next. For example, in Chicago, Ill. and surrounding areas, the width of streets is usually from 30 to 40 feet and there are usually sixteen streets to the mile. In this case, the spacing between supports 13 may be 66 feet with five supports between each street and the next street parallel thereto. In this example, preformed or prefabricated straight guideway sections of a standard length of 66 feet may be used for constructing portions of the guideway that extend in a straight line or in a curve having a large radius. To extend in curves of shorter radii, straight sections of a shorter standard length, or specially formed sections may be provided, with supports appropriately spaced and constructed.

As shown in FIG. 2, the passenger station 14 includes a roof structure 40 which has an overhang portion that protects exiting passengers and that extends over a guideway section which protects entering passengers and extends between the right hand exit of the divergent section 30 and the left hand entrance to the convergent guideway section 32. To provide additional protection for passengers in cold or hot climatic conditions, walls and automatically opened doors may be provided such that cabins may be moved into and out of protected paths that are adjacent the loading and unloading regions and that may be heated or cooled.

Doors 41 and 42 are provided in one wall 43 of the station and an additional door, not shown, is preferably provided in an opposite wall. Windows 44 may be provided in the wall 43 as shown.

FIG. 3 is similar to FIG. 2 but with roof and wall structures of the station 14 removed to show lower and upper level platforms 45 and 46. Departing passengers may use either an up escalator 47 or stairs 48 to reach the lower platform 45. Arriving passengers may either use a down escalator 49 to go directly from the upper platform 46 directly to the ground level or use down stairs 50 to go to the lower platform 45 and then down stairs 48 to go to the ground level. Alternatively, passengers may use an elevator 52 having a ground level door, not shown, and doors 53 and 54 at the lower and upper platforms 45 and 46.

FIG. 3 also shows automobiles 55 and 56 that are hidden from view in FIGS. 1 and 2. Automobile 55 is being carried on a platform moving in an easterly direction along a guideway section that extends between the left side of the divergent Y section 30 and the left side of the convergent Y section 32. Automobile 56 is being carried on a platform moving in a westerly direction on one of the guideway sections 19.

The length of the loading platform is such as to provide a group of loading regions which permit substantially simultaneous loading of several cabins at the same time. In the station as shown, a departing passenger reaching the lower level platform 45 may find four awaiting eight-passenger cabins 57, 58, 59 and 60 with open doors as shown and may then enter lead cabin 57 which will be the first to depart. However, he or she may find it desirable to enter one of the other cabins if other passengers are rushing to enter the lead cabin 57.

The operation is such that during rush hours, the cabins will normally be fully or nearly fully loaded. However, at times of less demand a single passenger may enter a cabin and be carried to his or her destination. The door of the lead cabin 57 will start to close after all eight seats are occupied or after elapse of a certain time such as sixty seconds following the initial entry of a passenger. The door will then close completely if no passengers or obstructions are in its path and if all passenger who have entered have signaled their destinations. After the door of the lead cabin 57 is safely closed, the lead cabin 57 is moved out of the station 14. It is then accelerated along the guideway section 24 and the right side of the convergent Y section 25 to enter the guideway section 26, merging at a high but safe speed with any loads that may be moving down the down ramp 33.

After the lead cabin 57 is so moved out of the station, the cabins 58, 59 and 60 are loaded with passengers and moved out in the same manner. Then, after the last cabin 60 has moved out of the station, additional cabins that may be available from the queue, up to four in number with the station as illustrated, are moved into the station and the doors thereof are opened. This mode of operation allows loading of several cabins at the same time and minimizes the time required to load cabins. During rush hours, many passengers will find it to be desirable to enter a cabin behind a more leading cabin being loaded. As a result, the time required to load a plurality of cabins is minimized. Although the station as shown allows entry of passengers into four cabins at the same time, it will be understood that the station might be designed for simultaneous entry into a greater or lesser number of cabins.

A cabin 62 is shown opposite the upper level platform 46 and is shown with its door open. It will be in this condition immediately after one or more arriving passengers have moved from the cabin and onto the platform. The door of cabin 62 will then be closed and the cabin 62 will be moved out of the station 14 along the left side of the convergent Y junction 32, down the ramp 33, along the left side of the convergent Y junction 25 and to the guideway section 26 shown in FIG. 1. If no passengers remain in the cabin, it will be moved to a storage region or directly to the loading region of another station. If one or more passengers remain in the cabin, the cabin 62 will be moved to the next destination station, continuing until all passengers who initially entered the cabin have exited therefrom.

Each arriving passenger who has moved from the cabin 62 and onto the upper platform 46 may go directly to the ground level by using the down escalator 49, or he or she may go down the stairs to the 50 to the lower platform 45 and then down the stairs 48 to the ground level or he or she may use the elevator 52 to go to the ground level.

As will be discussed in connection with FIGS. 23–27, the station 14 may be used as one of a series of stations along a main guideway path or may be used as transfer station and other forms of stations may be used. When the station 14 is used as a transfer station, departing passengers are moved from the main guideway path along which the station is located and then to a second main guideway path. Arriving passengers may either exit the station or may transfer to the second main guideway path by moving down to the lower platform to enter an awaiting cabin alone or along with departing passengers and to then be moved to the second main guideway path.

Automobile Loading

FIG. 4 is similar to FIG. 1, showing another portion of the system 10 which includes guideways supported in a urban area that includes an east-west street 65 crossed by north-south streets 66. Supports 67 of inverted U-shaped configuration straddle the street 65 to support guideway sections above the path of traffic and away from trees and power lines that may be positioned along the side of the street 65. Automobiles 69 and passenger cabins 70 are shown moving in a westerly direction on guideway sections 72 along the north side of the guideway. Automobiles 73 and cabins 74 are shown moving in an easterly direction along a main line section 76 which extends between the north side of a divergent Y section 77 and the north side of a convergent Y section 78. Platforms 79 that are to be loaded with automobiles move on a branch guideway 80 which extends between the south side of the divergent Y section 77 and the south side of the convergent Y section 78.

A number of such platforms 79 are shown in a queue formation on the west side of a loading station 82.

When an automobile enters the loading station 82, the lead platform in the queue is moved to the east and through the loading station 82 to be loaded with the automobile. An automobile 84 is shown after being loaded on a platform 79, ready to be moved to the east through the south side of the convergent Y section 78 and onto a main guideway path section.

To show how automobiles enter the loading section, an automobile 85 is shown moving off the street 65 and toward the lower end of a ramp 86. Another automobile 87 is shown moving up the ramp 86. A third automobile 88 is shown moving on a guide section 89 which is above the level of platforms 79 moving on the branch guideway 80 and which extends eastwardly and northwardly between the upper end of the ramp 86 and an entrance section 90 the loading station 82. A fourth automobile 91 is shown on an automobile support 92 of a supply section 93 that is located between the entrance section 90 and an exit section 94 of the loading station 82.

Bearings are provided that support the rearward end of the automobile support 92 of the supply section 93 for pivotal movement about a horizontal axis and hydraulic cylinders are provided to control vertical movement of the forward end of the automobile support 92. In the loading operation, the forward end of the automobile support 92 of the supply section 93 is lowered from an elevated position to a position at the same level as a platform 79 in the exit section 94. A control gate 96 is then lifted to allow the automobile 91 to be driven forwardly and onto a platform 79 in the exit section 94 and to then be locked to the platform 79 and moved out of the loading station 82. A buffer assembly 97 of the exit section 94 limits forward movement of an automobile and insures proper positioning of an automobile on a platform 79. A lock control unit 98 of the exit section 94 then operates to unfold lock elements of the platform 79 to upright positions and to securely lock the automobile to the platform 79. Then the buffer assembly 97 is so operated as to allow the platform 79 and automobile to be moved forwardly out of the exit section 94.

The construction and operation of the supply section 93, buffer assembly 97 and lock control unit 98 are described in detail hereinafter in connection with FIGS. 9–12.

Automobile Unloading

FIG. 7 is similar to FIGS. 1 and 4, showing guideways supported in a urban area that includes an east-west street 101 crossed by north-south streets 102. Supports 103 of inverted U-shaped configuration straddle the street 101 to support guideway sections above the path of traffic and away from trees and power lines that may be positioned along the side of the street 101. Automobiles 105 and passenger cabins 106 are shown moving in a westerly direction on guideway sections 108 along the north side of the guideway. Automobiles 109 and cabins 110 are shown moving in an easterly direction along a main line section 112 which extends between the north side of a divergent Y section 113 and the north side of a convergent Y section 114.

A branch guideway 116 extends between the south side of the divergent Y section 113 and the south side of the convergent Y section 114. An automobile 117 is shown moving on a platform 79 on the branch guideway 116 and toward an unloading station 118. Station 118 includes an entrance section 119 that includes a lock control unit for unlocking and folding locking elements of a platform 79 that are engaged with an automobile. The lock control unit of section 119 is substantially identical to the lock control unit 98 of the loading station 82. The unloading station 118 also includes an automobile receiving section 120 and an exit section 121.

Another automobile 122 is positioned on a platform in the entrance section 119, waiting to be unloaded. An automobile 123 that has been unloaded from a platform 79 is shown on a guide section 124 (FIG. 7) which extends between the exit section 121 of the unloading station 118 the upper end of a ramp 125. Another automobile 126 is shown moving down the ramp 125 and automobiles 127 and 128 are shown moving from the lower end of the ramp and onto the street 101.

After automobiles are driven off of a platform in the entrance section 119, the platform is folded and a support in the receiving section is lifted to allow the empty and folded platform to be moved to the east under the receiving section and along the path provided by branch guideway 116. A number of such empty and folded platforms 129 are shown moving along the branch guideway 116 in FIG. 7 after leaving the unloading station 118.

Figure 8:
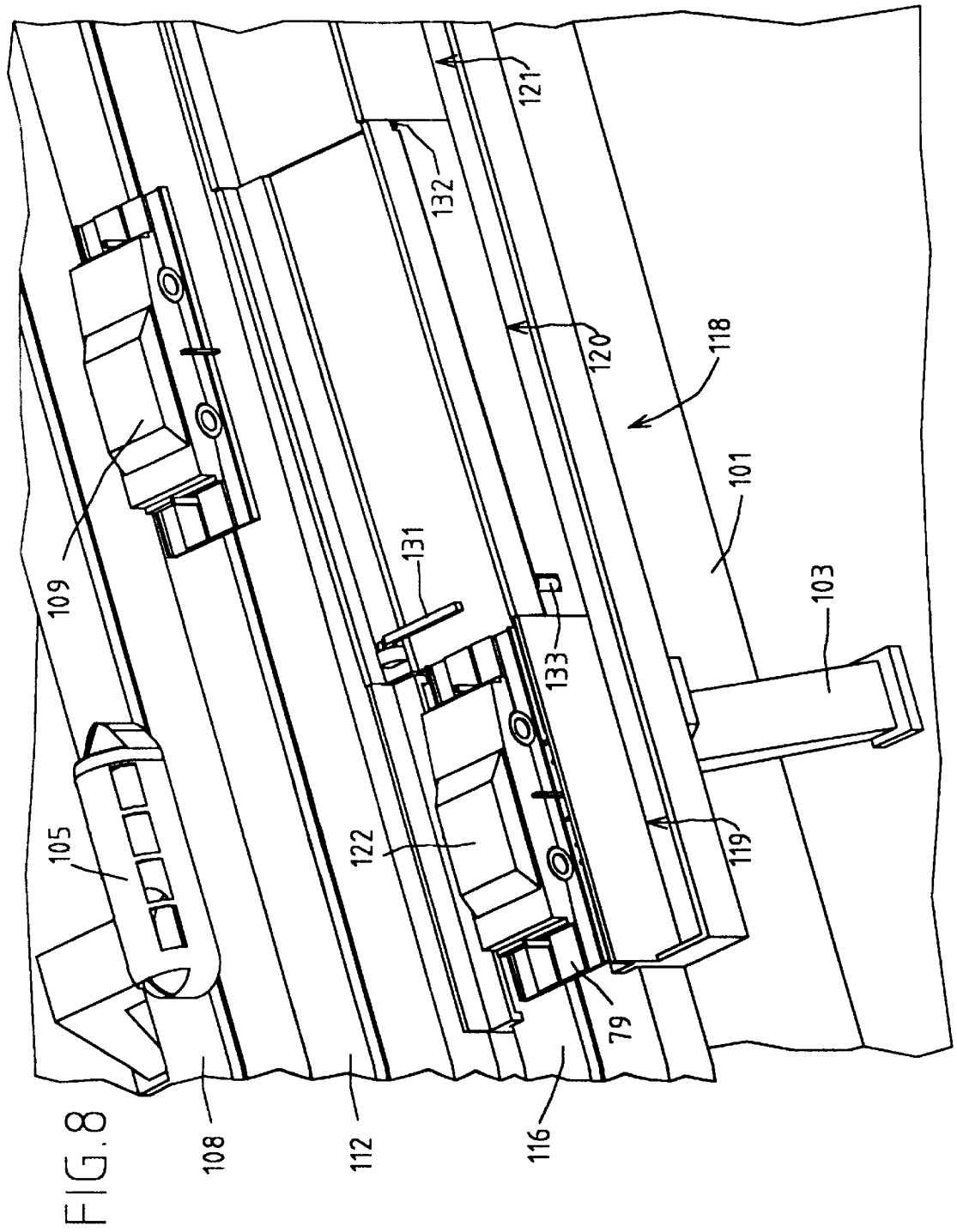
FIG. 8 is a view which is an enlargement of a portion of FIG. 7 to more clearly show the automobile unloading station itself.

As shown in FIG. 8, the automobile receiving section 120 includes an automobile support 130 that has a rearward end movable between a lowered position as shown and an elevated position that allows empty and folded platforms to be moved thereunder. In the lowered position of the illustrated support 130, the rearward receiving end is at the same level as a platform 79 in the receiving section 119. Normally, the support 130 will be in its lowered position when a platform 79 to be unloaded has arrived in the receiving section 119 at a position as shown in FIG. 8. An unlock and fold operation is then performed by the lock control unit of the receiving section 119 to move forward and rearward locking elements of the platform 79 away from the front and rear bumpers of an automobile and to move such forward and rearward lock elements as well as side locking elements into folded positions.

With platform 79 in a folded condition and with the rearward end of support 130 in its lowered position, a control gate 131 is lifted to allow the automobile 117 to be driven onto the automobile support 130 and then over the exit section 121 and guide section 124 to the ramp 126. Then the rearward end of the support 130 is moved upwardly to a position in which a supporting carrier vehicle can move a folded platform forwardly and under the support 130 and along the branch guideway 116 to an automobile loading station or to a storage location. In FIG. 7, reference numeral 129 indicates a number of such unloaded and folded platforms.

To allow the required vertical movement of the rearward end of support 130, bearings are provided that support a shaft 132 shown on one side of the forward end of support 130 and that support a coaxial shaft, not shown, on the opposite side of support 130. Such vertical movement is controlled by a hydraulic cylinder 133 as shown that underlies one side of its rearward end as shown and by a similar cylinder that underlies the opposite side of its rearward end.

Supply Section 93 of Automobile Loading Station 82 (FIGS. 9–12)

Figure 9:
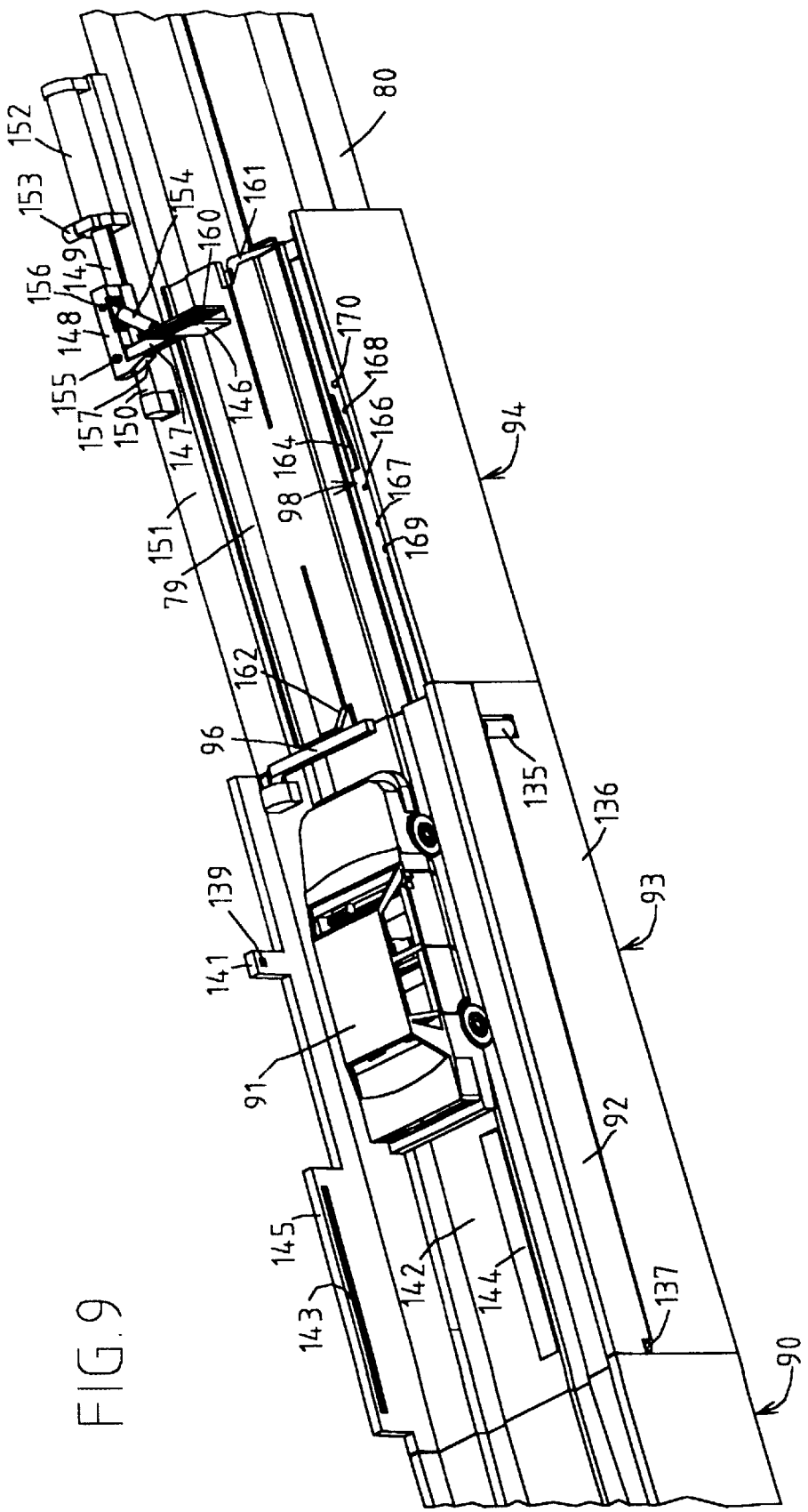
FIG. 9 is a view similar to a portion of FIG. 6 but on an enlarged scale, showing portions of the loading station in a condition prior to driving of an automobile onto a platform.
Figure 10:
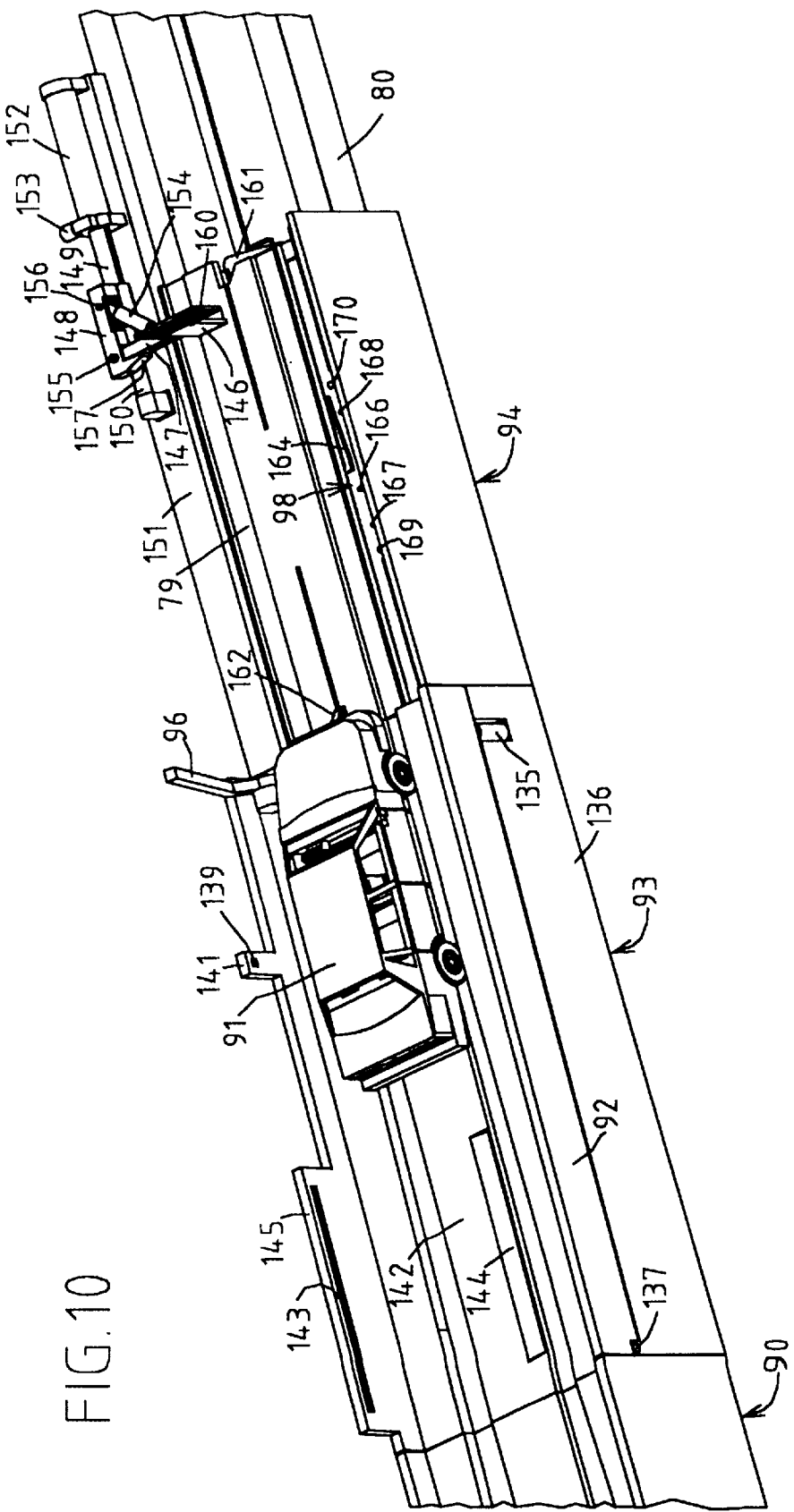
FIG. 10 is a view like FIG. 9 but showing the automobile being driven onto the platform.
Figure 11:
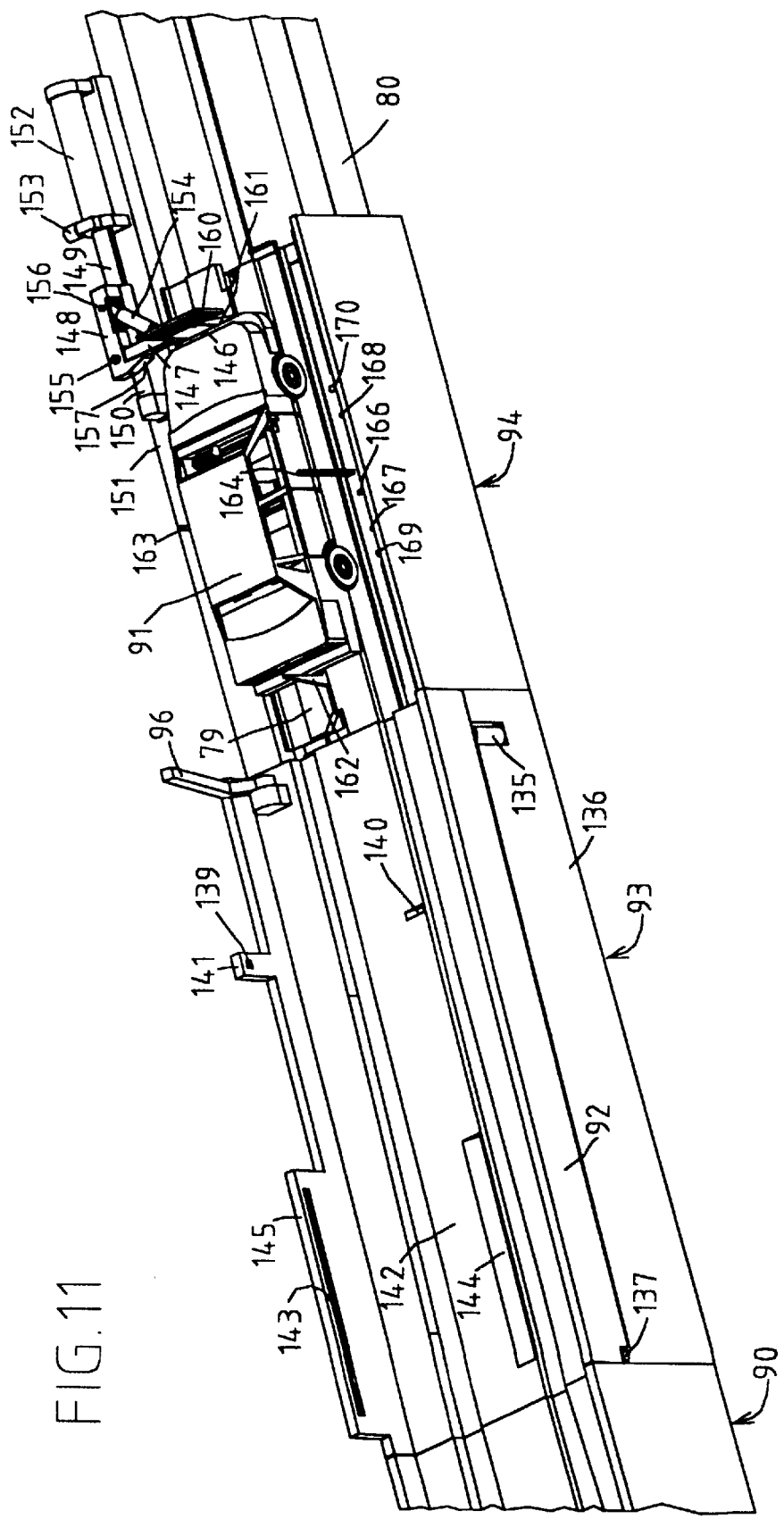
FIG. 11 is a view like FIGS. 9 and 10 but showing a condition in which the automobile has been driven onto the platform and has been locked to the platform.
Figure 12:
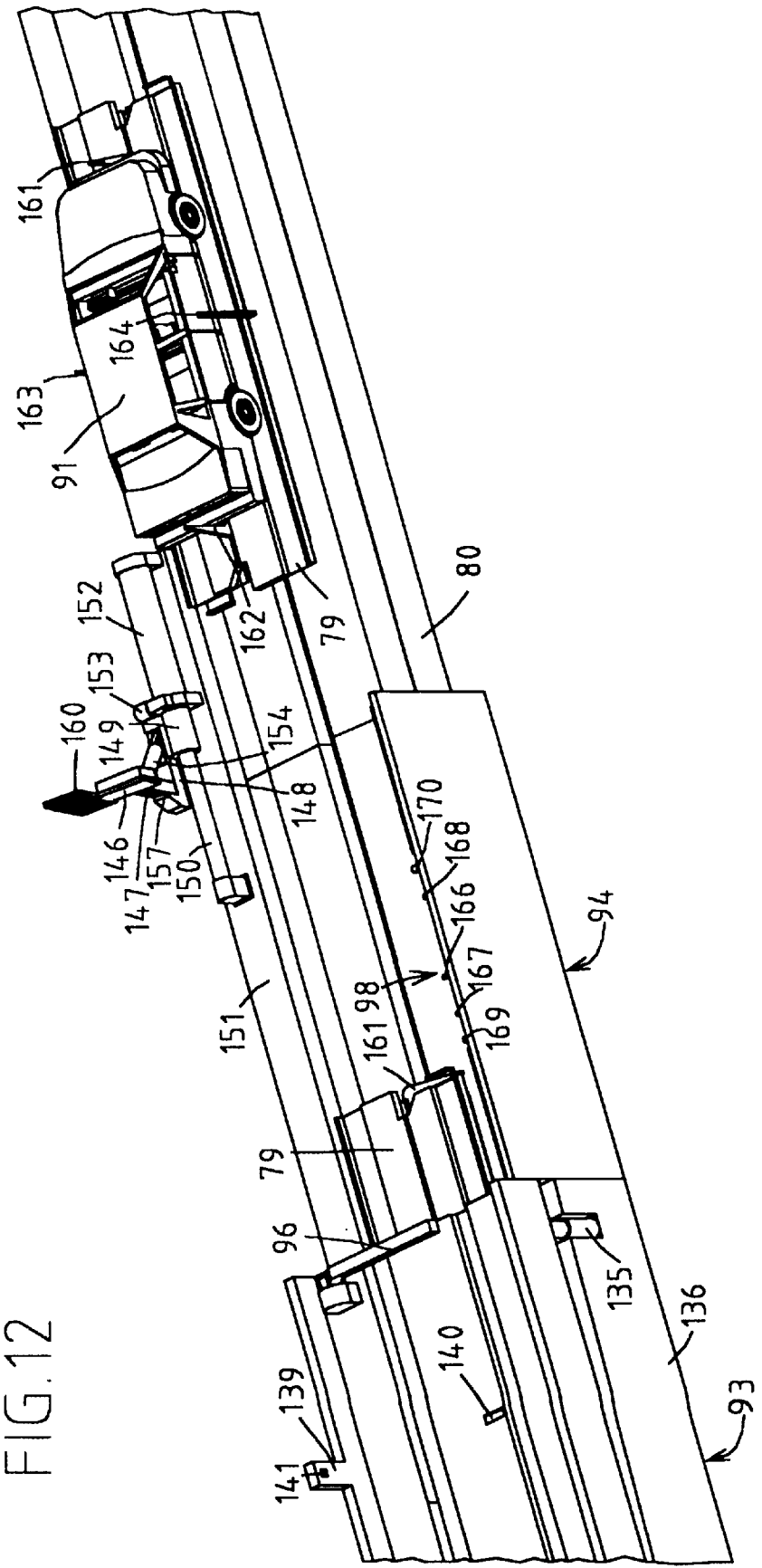
FIG. 12 is a view like FIGS. 9, 10 and 11 but showing the automobile being carried forwardly on the platform while another platform is being moved toward a position for driving of an automobile thereon.

The supply section 93 includes the automobile support 92, the gate 96, means for controlling movement of the forward end of support 92 and means for determining the length of an automobile for the purpose of controlling the buffer assembly 97. In FIG. 9, the forward end of support 92 is in a lowered position at the same level as the platform 79, the gate 96 is in a lowered or closed position, and the length of the automobile has been measured to control the buffer assembly 97. In FIG. 10, the gate is in a lifted or open position and the automobile 91 is starting its movement onto the platform 79. In FIG. 11, the buffer assembly 97 has limited forward movement of the automobile 91 and the lock control unit 98 has operated to move locking elements of the platform 79 to upright positions and to move forward and rearward locking elements into engagement with the front and rear bumpers of the automobile 91. In FIG. 12, the buffer assembly 97 has been operated to a condition to allow forward movement of the platform 79 and automobile 91 out of the loading station 82. Also, the gate 96 has been lowered to a closed position and the forward end of the automobile support 92 has been lifted to allow another platform 79 to start to move into the exit section 94 of the loading station 82, as shown.

To control of lowering and lifting of the forward end of the automobile support 92, a hydraulic cylinder 135 is supported at the forward end of a base structure and underlies on side of the forward end of the support 92. Support 92 is pivotally supported for movement about a horizontal axis by means of a shaft 137 that is secured to one side of the rearward end of the support 92 and that is journaled in a bearing at the rearward end of the base structure 136. A similar hydraulic cylinder, base structure, shaft and bearing are provided on the opposite side.

The illustrated supply section 93 also includes means for measuring the length of an automobile for the purpose of control of the buffer assembly 97 to obtain proper centering of the automobile on a platform 79. When an automobile moves toward the gate 96 at the forward end of the support 92, its front bumper will interrupt a forward beam that is projected to a beam detector in an opening 139 from a beam source in an opening 140. Beam detector opening 139 is at an elevated position in a side wall portion 141 of support 92 along one side of the path of movement of the automobile. As shown in FIGS. 11 and 12, beam source opening 140 is located in a floor portion 142 of the support 92 below the path of the automobile body and between the paths of the automobile wheels.

When interruption of the forward beam is detected by the detector in opening 139, a rearward portion of the automobile will interrupt one or more of a series of beams that are projected to a series of beam detectors that are located along a longitudinal slot 143 from a series of beam sources that are located in a longitudinal slot 144. The length of the vehicle is then determined from a determination as to which of the beams are interrupted and which are not, as indicated by the condition of the detectors in slot 143. Slot 143 is located at an elevated position in a side wall portion 145 of the support 92 along one side of the path of movement of the automobile. Slot 144 is located in the floor portion 142 of the support 92 below the path of the automobile body and between the paths of the automobile wheels.

The projected beams may preferably be light beams projected through lenses from lamps and detected by photocells or photo-transistors or the like, but it will be understood that other forms of beams and detectors may be used. It will also be understood that the positions of the sources and detectors may be reversed. For example, beam sources may be provided in the opening 139 and slot 143 while beam detectors are provided in the opening 140 and slot 144.

Buffer Assembly 97 of Loading Station 82

The buffer assembly 97 includes a buffer element 146, means for moving the element to a position in which it will be engaged by the front bumper of an automobile when centered on a platform 79, means for absorbing energy developed during such engagement and means for moving the element 146 out of the path of the automobile to allow forward movement thereof while carried by a platform 79.

Element 146 is supported through an arm 147 and a member 148 from a sleeve 149 that is movable forwardly and rearwardly on a support shaft 150. The rearward end of the support shaft 150 is supported from a base structure 151 which also supports a hydraulic cylinder 152 that receives the forward end of the sleeve 149 and that controls rearward and forward movement thereof.

After the length of an automobile is determined, the hydraulic cylinder 152 is controlled to move the sleeve 149 to a position as shown in FIG. 9 in which the buffer element 146 is engageable by the front bumper of an automobile when properly positioned. The gate 96 may then be lifted to allow the driver of the automobile to start moving onto the platform 79 as shown in FIG. 10. In the condition of FIG. 11, the lock control unit 98 has performed a locking operation in response to engagement of the buffer element 146 by the front bumper of the automobile. In the locking operation, side and end locking elements are moved to upright positions and the end locking element are then moved into engagement with the front and rear bumpers of the automobile to lock the automobile to the platform 79.

After an automobile is locked to the platform 79, the cylinder 152 is operable to move the sleeve 149 forwardly to move the buffer element 146 away from the front bumper of the automobile. A motor 153 is then operable through a worm and worm gear assembly to rotate the sleeve 149 about its axis, the element 149 being then moved upwardly to the position shown in FIG. 12 to allow the automobile 91 and platform 79 to be moved forwardly out of the loading station 82.

The arm 147 which supports buffer element 146 is supported from member 148 through a shaft 155 that is vertical in the position of member 148 as shown in FIG. 9. A compression spring and shock absorber unit 154 is connected to an intermediate portion of the arm 147 and is connected through a shaft 156 to a portion of the support member 148 that is spaced forwardly from the shaft 155. A stop portion 157 of member 148 limits rearward movement of the arm 147 and also supports a sensing and measuring device that is not shown in FIGS. 9–12 but which measures the distance of any rearward movement of the arm 147 away from the stop portion 157.

The compression spring and shock absorber unit 154 is designed to absorb the energy that may be developed from engagement by the front bumper of an automobile moving at substantial speed such as 1 MPH for example. If a signal developed by the sensing and measuring device is within corresponding limits, the lock control unit 98 may be operated to lock the automobile to the platform 79. However, if the signal developed by the sensing and measuring device exceeds such limits, valves in the hydraulic cylinder 152 may be opened to allow movement of the support 148 forwardly and to allow absorption of energy beyond that which can be safely absorbed by the compression spring and shock absorber unit 154. Damage to the automobile as well as to the platform and the buffer element and supporting structures may be thereby avoided. The driver of the automobile may then be instructed to slowly back up a few inches and when satisfactory conditions are reached, the lock control unit 98 may be operated. Under severe conditions, a system attendant may be alerted to monitor the conditions and, if necessary, to go to the loading station 82.

An important feature is in the provision of a display unit 160 which is supported on the arm 147 above the buffer element 146 and which provides instructions to the driver of an automobile. The display unit 160 also shows the driver where the buffer element 146 is located to assist the driver in proper positioning of the automobile. The display unit 160 is located in a centered position with respect to the center line of path of the automobile but the buffer unit is located to the left of that center line. This is due to the positioning of the end of the buffer element 146 as to allow the forward lock element of the platform 79 to be moved rearwardly into engagement with an area of the front bumper that is approximately at the center thereof. The buffer element 146 thus engages only the left portion of the front bumper.

In a preferred mode of operation, the buffer element is clearly marked with the legend "BUFFER". When the automobile 91 is in the position of FIG. 9, the following is displayed by the display unit 160:

PLEASE SIGNAL YOUR DESTINATION

AFTER GATE IS LIFTED

DRIVE FORWARD TO TOUCH

BUFFER WITH YOUR BUMPER

The driver then signals his or her destination, using a hand-held control device that is required for use of the system. After he or she does so, the display changes to the following:

AFTER GATE IS LIFTED

DRIVE FORWARD TO TOUCH

BUFFER WITH YOUR BUMPER

When gate is lifted as shown in FIG. 10, the following instruction is displayed:

DRIVE FORWARD TO TOUCH

BUFFER WITH YOUR BUMPER

AND GET OK SIGNAL

When the buffer element 146 is then engaged by the bumper and its displacement is within allowable limits, the display changes to a final display as follows:

OK, WAIT FOR LOCKING OPERATION

MAKE SURE EMERGENCY BRAKE IS ON

AND TRANSMISSION IS IN "PARK"

If however the displacement of the buffer element 146 is not within allowable limits, other instructions may the displayed. If the displacement has occurred but is less than a minimum allowable value, the following instruction is displayed:

PLEASE TRY DRIVING FORWARDLY

BUT NOT MORE THAN A FEW INCHES

If the displacement is greater than a maximum allowable value, the following instruction is displayed:

PLEASE BACK UP AT LEAST 2 FEET then the following instruction is again displayed:

DRIVE FORWARD TO TOUCH

BUFFER WITH YOUR BUMPER

AND GET OK SIGNAL

Then if conditions are satisfactory, the final instruction will be displayed:

OK, WAIT FOR LOCKING OPERATION

MAKE SURE EMERGENCY BRAKE IS ON

AND TRANSMISSION IS IN "PARK"

As aforementioned, after an automobile is locked to the platform 79, the buffer element 146 is moved forwardly, away from the front bumper of the automobile. Then the buffer element is rotated about the axis of the sleeve 149 to move upwardly and to the left out of the path of forward movement of the automobile as shown in FIG. 12.

Each displayed instruction is preferably accompanied by a corresponding audible instruction and it will be understood that other instructions may be displayed. If the driver prefers use of Spanish, French or another foreign language, his or her hand-held control unit may be programmed to signal that fact to the control system. The displayed and audible instructions may then be in the selected language.

Lock Control Unit 98 of Loading Station 82

Each platform 79 has forward and rearward lock elements 161 and 162 and left and right side protective elements 163 and 164. After an automobile is properly positioned on a platform 79, the lock control unit performs an unfold and lock operation, unfolding the platform 79 by moving such lock elements 161–164 to upright positions and then locking the automobile to the platform 79 by moving the forward and rearward elements 161 and 162 into firm engagement with the front and rear bumpers of the automobile. In an unlock and fold operation, the sequence is reversed. The forward and rearward elements 161 and 162 are moved to the forward and rearward ends of the platform 79. Then all four elements 161–164 are rotated to folded positions.

The operation of the lock control unit 98 of the loading station 82 will be described with reference to both loading and unloading operations since, as aforementioned, the lock control unit of the receiving section 119 of the unloading station 118 is substantially identical to the lock control unit. The ends of five actuating elements of the lock control unit 98 of the loading station 82 are shown in FIGS. 9–12. Each of such actuating elements is movable along a horizontal axis transverse to the direction of movement of a platform.

A latch release element 166 is movable inwardly to a latch release position and to allow movements of the lock elements 161–164. In a loading operation, an unfold element 167 is then movable inwardly to rotate the lock elements from folded horizontal positions to upright unfolded positions. In an unloading operation, a fold element 168 is movable inwardly to rotate the lock elements from upright unfolded positions to horizontal folded positions. Fold element 168 is not required in normal operations of the loading station and unfold element 167 is not required in normal operations of the unloading station 118. However, both elements are provided in both stations to facilitate installation, servicing and maintenance.

When the lock elements 161–164 are in unfolded upright positions and when the actuating element 166 is in a release position, actuating elements 169 and 170 may be moved inwardly to engage and rotate shafts of the platform 79 and thereby move the forward and rearward lock elements 161 and 162 rearwardly and forwardly into firm engagement with the front and rear bumpers of the automobile 91. In an unlocking operation of the unloading station 118, the forward and rearward lock elements 161 and 162 are movable forwardly and rearwardly away from the automobile bumpers and to the ends of the platform 79, the elements 161 and 162 being then rotatable to folded positions through operation of the fold element 168.

Construction of Platform 79

Figure 13:
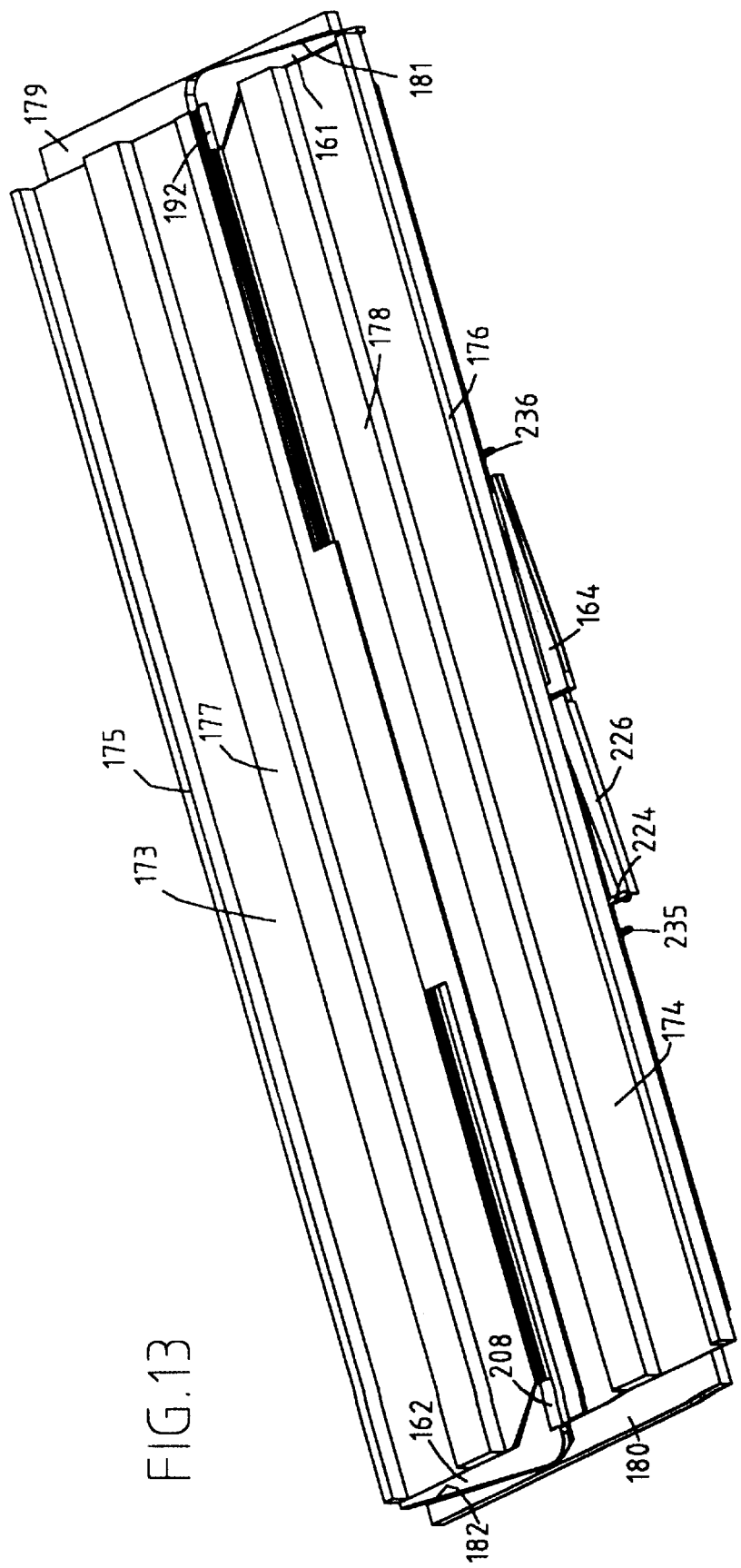
FIG. 13 is a view of an automobile platform in a folded condition.
Figure 14:
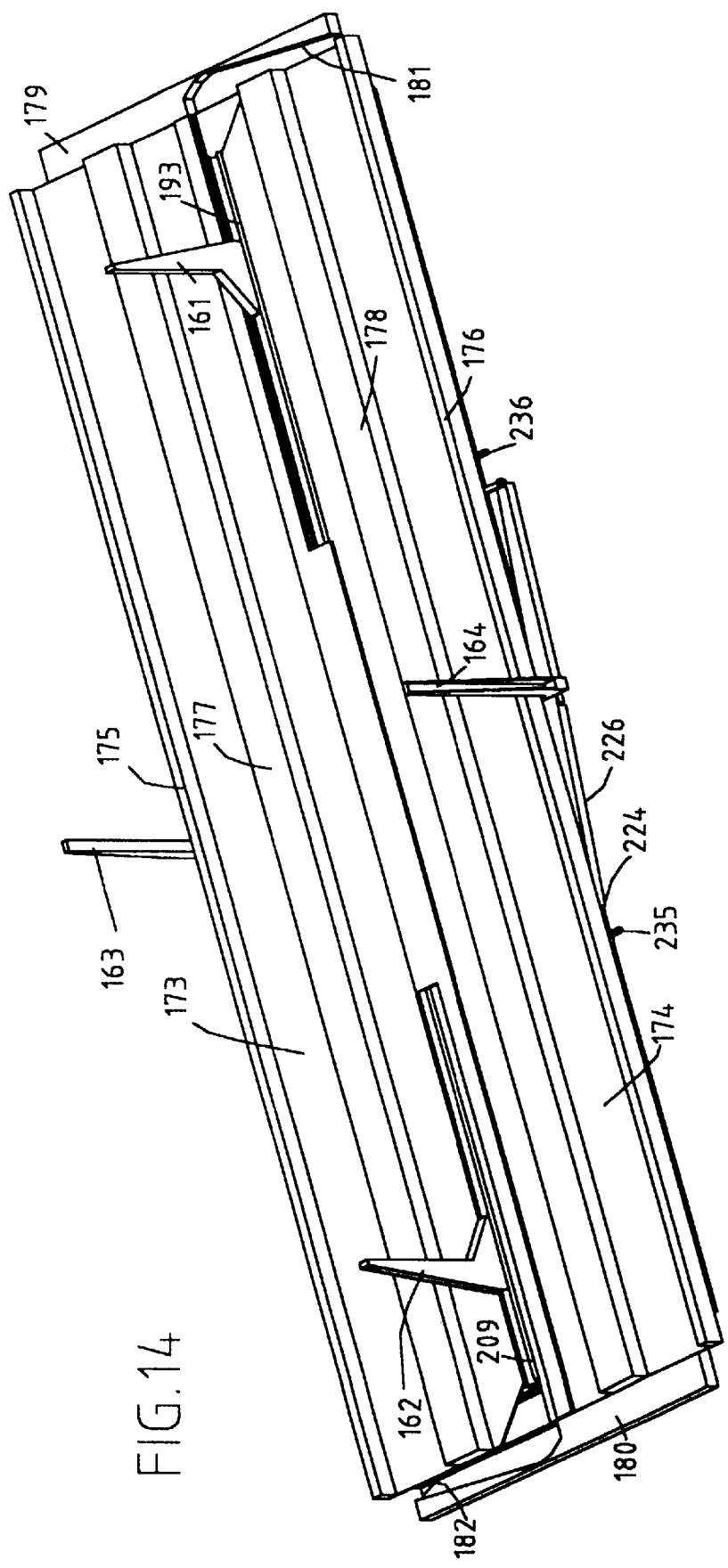
FIG. 14 is a view like FIG. 13, but showing the automobile platform in an unfolded condition.

The mode of operation will be made more clear from FIGS. 13–20 that show a preferred construction of one of the platforms 79. FIG. 13 shows the platform 79 in a folded. FIG. 14 shows the platform 79 in an unfolded condition, also showing the forward and rearward lock elements moved to positions appropriate for engaging bumpers of an automobile. The wheels of an automobile move along wheel support surfaces 173 and 174 that are bounded by outer upstanding curb portions 175 and 176 and inner upstanding curb portions 177 and 178. A pair of support members 179 and 180 have recesses 181 and 182 that are shaped to receive the lock elements 161 and 162 when in the folded condition of FIG. 13. Surfaces of the elements 161 and 162 are then at the same level as upper surfaces of members 179 and 180 which are at the same level as support surfaces 173 and 174, thereby providing substantially continuous support of the wheels of an automobile moving onto or off of the platform 79.

Figure 15:
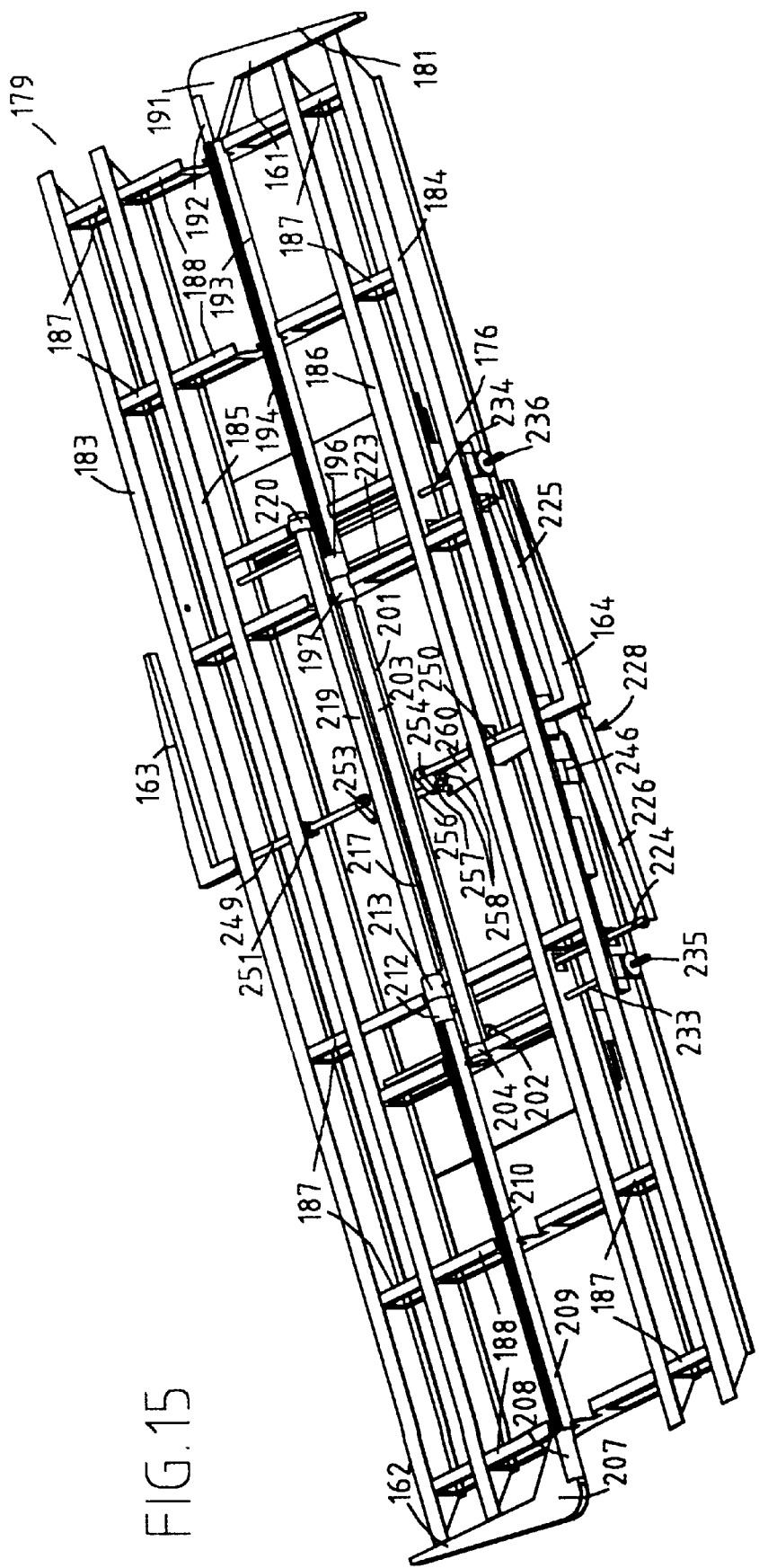
FIG. 15 is a view of the automobile platform of FIG. 13 in its folded condition but with top, side and bottom wall components removed to show operating mechanisms.
Figure 16:
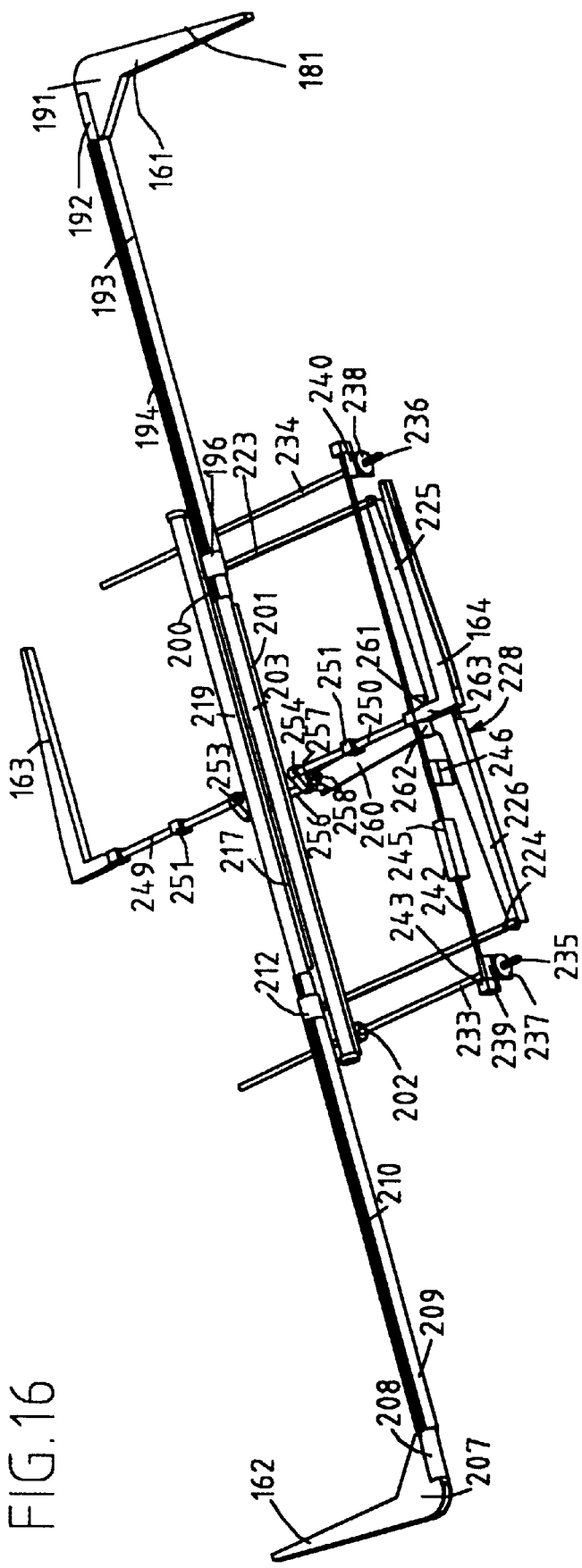
FIG. 16 is a view like FIG. 15 but showing only certain components of the mechanism in order to more clearly show the operation thereof.
Figure 20:
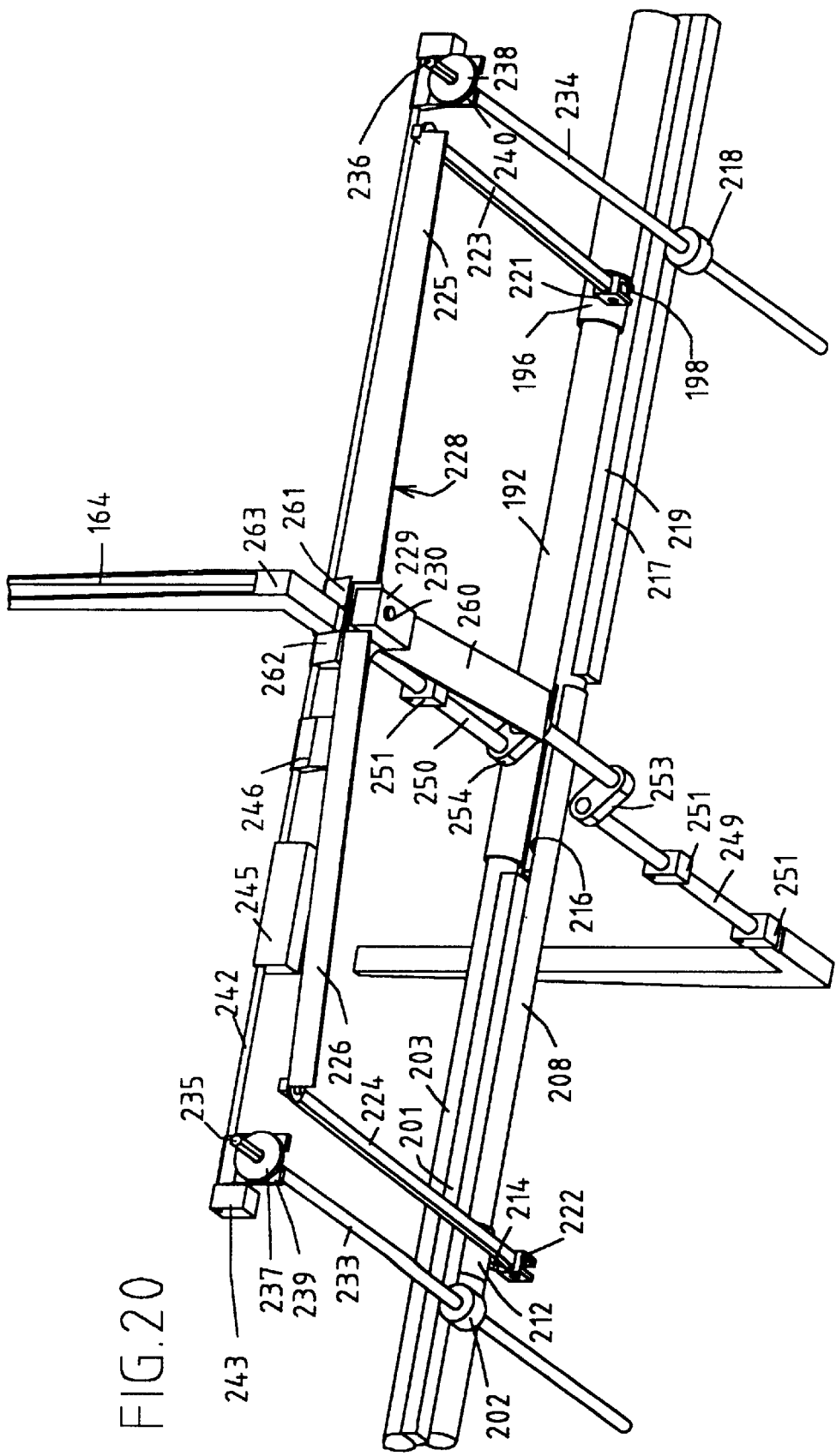
FIG. 20 is a view corresponding to a portion of FIG. 19 to show components on an enlarged scale.

FIGS. 15–21 show features of construction of the platform 79 and of mechanisms for operation of the lock elements 161–164. In FIG. 15 the platform 79 is shown in a folded condition but with the top plate and curb structure and support members 179 and 180 removed. FIG. 16 is like FIG. 15 but with beams and other support structures removed to show the mechanisms for operation of the lock elements 161–164. FIG. 17 is like FIG. 16 but shows the condition with the lock elements 161–164 in unfolded upright positions. FIG. 18 is a detail view of a part of the mechanism in a position as shown in FIG. 17 but on an enlarged scale. FIG. 19 is a view from an upwardly looking viewing angle of the mechanism as shown in FIG. 17. FIG. 20 is a view corresponding to a portion of FIG. 19. FIG. 21 is a view of the underside of a complete platform 79.

As shown in FIG. 15, a pair of outer beams 183 and 184 underlie outer edge portions of the wheel support surfaces 173 and 174 shown in FIGS. 13 and 14 and a pair of inner beams 185 and 186 underlie inner edge portions of the wheel support surfaces 173 and 174. A series of cross members 187 are provided between beams 183 and 185 and between beams 184 and 186. Another series of cross members 188 are provided between the inner beams 185 and 186.

A base portion 191 of the forward lock element 161 is secured to the forward end of an inner sleeve 192 that is movable within an outer guide sleeve 193. The outer guide sleeve 193 is secured to three of the cross members 188 at the forward end the platform and is formed at its upper side with a longitudinally extending slot 194. The width of the slot 194 is substantially the same as the thickness of the base portion 191 of the forward lock element and is substantially less than the inner diameter of the outer guide sleeve 193. As a result, the inner movable sleeve 192 and the lock element 161 are movable rearwardly when the lock element 161 is in upright position but are against rotation relative to the outer guide sleeve 193. In addition, when the inner sleeve 192 is held against axial movement with the lock element 161 engaged with a bumper of an automobile, the outer guide sleeve 193 cooperates with the inner sleeve 192 to provide strong support against tilting movement of the lock element 161 about a transverse horizontal axis.

To move the forward lock element 161 from the folded horizontal position of FIGS. 15 and 16 to the lock condition of FIG. 17, the lock element 161 must first be rotated through a ninety degree angle to an upright position at the forward end of the platform 79. Then the inner movable sleeve 192 can be moved rearwardly while the base portion 191 of element 161 moves into and along the slot 194 of the outer guide sleeve 193.

To effect such ninety degree rotation of the inner sleeve 192, it extends through and is rotatably coupled to a turn collar 196 that is disposed between the rearward end of the outer guide sleeve 193 and a collar 197 to be held against longitudinal movement. Collar 197, as shown only in FIG. 15, is secured to one of the cross members 188 of the frame structure of the platform 79. The turn collar 196 has a radially projecting arm portion 198 that is connected to an actuating rod as will be described. To rotatably couple the turn collar 196 to the inner sleeve 192, the turn collar 196 has an inward projection 199 which extends into an axially extending slot 200 in the inner movable sleeve 192.

A portion of the inward projection 199 is shown in FIG. 18 which is an enlarged detail view of the turn collar 196 by itself. In FIGS. 15 and 16, which depict the folded condition, the slot 200 is on the upper side of the inner sleeve 192 in alignment with the slot 194 in the outer guide sleeve 193 and is not clearly shown except for a portion at the rear end of the inner sleeve 192 that appears in FIG. 16. The slot 200 is not shown at all in FIG. 17 which depicts the unfolded condition.

To effect rearward and forward movement of the inner sleeve 192 and the locking element 161, a rack 201 and a pinion 202 are provided that have meshing teeth which are not shown for ease of illustration. The rack 201 is secured to the underside of a carrier 203 which has a forward end portion that extends into and is so coupled to the rearward end of the inner sleeve 192 as to prevent relative longitudinal movement while allowing a ninety degree rotation of the inner sleeve 192. A guide member 204 is provided which is shown only in FIG. 15 and which is secured on one of the cross members 188 of the platform frame near the pinion 202. The guide member 204 has an opening so shaped as to support and guide rearward end portions of the rack 201 and the carrier 203 during forward and rearward movements thereof while preventing rotation of the rack 201 and carrier 203 about the common axis of the inner and outer sleeves 192 and 193.

The rearward lock element 162 has a base portion 207 and is operated by an assembly which has components corresponding to those used to control movement of the forward lock element 161. Such components include an inner movable sleeve 208, an outer guide sleeve 209 having a slot 210, a turn collar 212, a fixed collar 213 shown in FIG. 15, an arm portion 214 of the turn collar 212 shown in part in FIGS. 19 and 20, a slot 216 in the inner movable sleeve 208, a rack 217, a pinion 218, a rack carrier 219 and a guide member 220 that is shown only in FIG. 15, respectively corresponding to the inner movable sleeve 192, the outer guide sleeve 193 with its slot 194, the turn collar 196, the fixed collar 197, the arm portion 198 of the turn collar 196, the slot 201 in the inner movable sleeve 192, the rack 201, the pinion 202, the rack carrier 203 and the guide member 204. The turn collar 212 is has an inward projection which is not shown in the drawings but which corresponds to the inward projection 199 of the turn collar 196.

To actuate the turn collars 196 and 212, the projecting arm portions 198 and 214 thereof are coupled through connectors 221 and 222 to the ends of two actuating rods 223 and 224 which extend horizontally in directions transverse to the direction of movement of the platform and in parallel relationship to each other. The opposite ends of actuating rods 223 and 224 are connected to the ends of arms 225 and 226 of a fold/unfold control member 228 that is pivotal about a vertical axis midway between the ends of the rods 223 and 224. As shown in FIG. 19, the fold/unfold control member 228 is supported for pivotal movement on a support member 229 by means including a vertical shaft 230.

To actuate the fold/unfold control member 228, the arms 225 and 226 thereof have depending flanges that are respectively engageable by the fold and unfold actuating elements 168 and 167 of the lock control unit 98. When the platform is in its folded condition as shown in FIGS. 15 and 16, the unfold actuating element 167 can be moved inwardly to engage the depending flange of arm 226 to pivot the control member 228 about its vertical pivot axis and to pull the rod 223 outwardly while pushing the rod 224 inwardly. As viewed looking forwardly, the turn collar 196 is then rotated ninety degrees in a counter-clockwise direction while the turn collar 212 is rotated ninety degrees in a clockwise direction. As a result, the forward and rearward lock elements 161 and 162 are rotated in counter-clockwise and clockwise directions to upright positions at the ends of the platform.

The elements 161 and 162 can then be moved rearwardly and forwardly into engagement with the front and rear bumpers of an automobile on the platform. In particular, the pinions 202 and 218 are rotated to move racks 201 and 217 and thereby the inner sleeves 192 and 208 and elements 161 and 162 in rearward and forward directions. Pinions 202 and 218 are secured on shafts 233 and 234 which are journaled by bearings that are supported from the beams 183–186 of the platform. For effecting rotation of the pinions 202 and 218, the shafts 233 and 234 have ends 235 and 236 of hexagonal shape that mate with sockets at the ends of the actuating elements 169 and 170 of the lock control unit 98.

It is desirable that rotation of the pinions 202 and 218 be restricted, particularly when the lock elements 161 and 162 have been moved into engagement with the front and rear bumpers of an automobile. For this reason, a pair of discs 237 and 238 are secured to the shafts 233 and 234 and have inwardly facing surfaces engageable by a pair of latch members 239 and 240. The latch members 239 and 240 are secured to a horizontal shaft 242 which has end portions journaled in bearings 243 and 244 that are supported on the beam 184. Shaft 242 extends through a spring unit 245 and a latch release member 246 is secured to the shaft 242. The spring control unit applies a counter-clockwise torque to the shaft 242, as viewed looking forwardly. Normally, the outer surfaces of the latch members 239 and 240 are engaged with the inner surfaces of the discs 237 and 238 and to prevent rotation of the pinions 202 and 218. When required, however, the latch release member 246 can be moved inwardly through engagement by the actuating element 166 when element 166 is moved inwardly to a latch release position. The mating surfaces of the discs 237 and 238 and latch members 239 and 240 are then disengaged to allow rotation of the shafts 233 and 234.

In the construction as shown, the fold/unfold control member 228 rotates the side lock elements 163 and 164 about a common transverse horizontal axis at the same time that it rotates the end lock elements 161 and 162 about longitudinal axes.

The elements 163 and 164 are secured to the outer ends of shafts 249 and 250 which are journaled by bearings 251 for rotation about the aforesaid common transverse horizontal axis. A pair of parallel crank arms 253 and 254 are secured to the inner ends of shafts 249 and 250 and have ends secured to a connecting shaft 256 that moves in a path which is below the components used for control of movements of the end lock elements 161 and 162. Interference with such components is thereby avoided while allowing the aforesaid common transverse horizontal axis to intersect such components.

For operation by the fold/unfold control member 228, an end portion 257 of the connecting shaft 256 projects outwardly from the crank arm 256 and is engaged between a pair of pins 258 that project upwardly from the inner end of an arm 260 of the fold/unfold control member 228. In the folded condition of FIGS. 15 and 16, the crank arms 253 and 254 extend rearwardly and downwardly at a forty-five degree angle. In the unfolded condition of FIGS. 17–20, the crank arms 253 and 254 are moved through a ninety degree angle to extend forwardly and downwardly at a forty-five degree angle. The distance between the axis of shaft 256 and the axis of shafts 249 and 250 is so related to the distance from pins 258 to the pivot axis of the fold/unfold control member 228 that the side lock elements 163 and 164 are moved from horizontal to upright positions in unison with the movements of the forward and rearward lock elements from horizontal to upright positions.

To prevent movement of the side lock elements 163 and 164 after being moved to upright positions, a pair of latch elements 261 and 262 are secured to the latch control shaft 242 and are engageable with mating surfaces of a base portion 263 of the lock element 164 when the spring unit 245 urges the shaft 242 to its normal position. When the latch release member 246 a release position, the elements 261 and 262 are moved out of engagement with mating surfaces of the base portion 262 of the lock element 164 to allow movement of both lock elements 163 and 164.

In the loading operation, the actuating element 166 is moved inwardly to move the latch release member 246 to a release position. The unfold actuating element 167 is then moved inwardly to engage the arm 226 of the fold/unfold control member 228 and to move the lock elements 161–164 to upright positions. The actuating elements 169 and 170 are then moved inwardly toward the platform to engage the hexagonal ends 235 and 236 of shafts 233 and 234, being then rotated to rotate the pinions 202 and 218 and to move the lock elements 161 and 162 rearwardly and forwardly. Rotation of each of the actuating elements 169 and 170 is controlled to stop when the torque applied thereby reaches a certain value such as to cause the elements 161 and 162 to firmly engage the front and rear bumpers without applying a force so excessive as to cause possible damage to the bumpers. The latch actuating element 166 is moved outwardly to lock the side lock elements 163 and 164 in upright positions and to engage the mating surfaces of the latch members 239 and 240 with the discs 237 and 238 and thereby prevent rotation of the pinions 202 and 218. Finally, the actuating elements 167, 169 and 170 are moved outwardly to allow movement of the platform along with the automobile then locked thereto.

In the unloading operation, the actuating element 166 is moved inwardly to engage the latch release member 246 and to allow rotation of the pinions 202 and 218 as well as to allow rotation of the side lock elements 163 and 164 to folded positions. Then the actuating elements 169 and 170 are moved inwardly toward the platform to engage the hexagonal ends 235 and 236 of shafts 233 and 234, being then rotated to rotate the pinions 202 and 218 and to move the lock elements 161 and 162 forwardly and rearwardly to the forward and rearward ends of the platform. Then the actuating element 168 is moved inwardly to engage the depending flange of the arm 225 of the latch/unlatch control member 228 and to move all of the lock elements 161–164 to folded positions. Then the latch actuating element 166 is moved outwardly to lock the side lock elements 163 and 164 in folded positions and to engage the mating surfaces of the latch members 239 and 240 with the discs 237 and 238 and thereby prevent rotation of the pinions 202 and 218. Finally, the actuating elements 168, 169 and 170 are moved outwardly to allow forward movement of the folded platform after the automobile has been driven off the platform and after lifting of the rearward end of the automobile support 130, FIG. 8, to allow movement of a folded platform thereunder.

FIG. 21 is a view looking upwardly at the underside of the platform and showing forward and rearward connectors 265 and 266 that are designed to mate with pads 267 and 268 on the upper ends of vertical support posts of a carrier vehicle 270 that is shown in FIG. 22. The connectors 265 and 266 and pads 267 and 268 are preferably constructed in the manner as disclosed in the aforesaid application Ser. No. 08/949,919 that was assigned a filing date of Dec. 1, 1997 upon acceptance of International Application NO. PCT/US96/09390 which has a filing date of Jun. 6, 1996 and which was published Dec. 19, 1996. Attention is invited to FIGS. 42–46 of those applications and the descriptions thereof, disclosing the use of pinions acting between racks on prongs of a transfer vehicle and racks on locking elements to move the locking elements in one direction upon insertion of the prongs and in opposite directions upon withdrawal of the prongs. Such pinions and racks are not shown in the drawings hereof but it will be understood that they may be provided as disclosed in said applications.

A pair of locking elements 271 are provided on the connector 265 and a pair of locking elements 272 are provided on the connector 266. When the platform 79 is to be transferred to a carrier vehicle, a pair of prongs of a transfer vehicle are inserted forwardly into the rearward ends of a pair of openings 273 in the connector 265 which are spaced inside the locking elements 271 in parallel relation thereto. At the same time, another pair of prongs of the transfer vehicle are inserted rearwardly into the forward ends of a pair of openings 274 in connector 266 which are spaced inside the locking elements 272 in parallel relation thereto. The connectors 265 and 266 have pinions which mesh with racks on the insides of the locking elements 271 and 272 and which may also mesh with racks on the outsides of the prongs of the transfer vehicle. Insertion of the prongs in a forward direction into the openings 273 causes the locking elements 271 to be moved rearwardly while insertion of prongs rearwardly into the openings 274 causes the locking elements 272 to be moved forwardly.

After insertion of its prongs into openings of the connectors 265 and 266, the transfer vehicle can then move the platform 79 to a position in which surfaces 275 and 276 of the connectors 265 and 266 rest on surfaces 277 and 278 of the pads 267 and 268 of the vehicle 270. In this position, the ends of the prongs extend into notches 277 and 278 in the pads 267 and 268 and the locking elements 271 are aligned with a pair of openings 279 in the pad 267 while the locking elements 272 are aligned with similar openings in the pad 268. The transfer vehicle may then operate to withdraw the prongs rearwardly out of the openings 273 and forwardly out of the openings 274 and leave the platform 79 on the vehicle 270. When the prongs are withdrawn the racks thereon operate through the pinions and the racks on the locking elements 271 and 272 to move the locking elements 271 forwardly into the openings 279 of the pad 267 and to move the locking elements 272 rearwardly into the similar openings of the pad 268.

As a result, the connectors 265 and 266 of the platform 79 are left securely connected to the pads 267 and 268 of the vehicle 270. Preferably, as disclosed in said application Ser. No. 08/949,919 and said PCT application, the engagement of the locking elements 271 and 272 within openings in the pads 267 and 268 may establish electrical connections between the pads of the vehicle and connectors of a platform or other load connected thereto.

Connectors like the connectors 265 and 266 are preferably provided on all platforms, on all passenger cabins and all freight containers that may be transported by the system, the connectors and pads being designed to be usable as standard connections between carrier vehicles and loads to be carried thereby, to obtain a number of very important advantages.

With such standard connections, carrier vehicles can be used more efficiently, being usable as needed to carry any desired type of load. For example, carrier vehicles used during daytime hours for carrying passenger cabins or automobile platforms may be used during nighttime hours for carrying freight containers. Or, where there is a greater than ususal demand for passenger cabins and less demand for automobile platforms, or vice versa, carrier vehicles may be used for one purpose or the other as appropriate.

The use of standard connections also promotes competition, improvements, innovation and the manufacture of quality components at low cost. Passenger cabins, automobile platforms and freight containers can be made separately by different suppliers and with different designs so long as they include standard connectors for locking to the standard pads of the carrier vehicles. Carrier vehicles can be made by different suppliers and with different designs so long as they have standard pads and are compatible with the guideways with which they are to be used. Guideways can be made or operated by different manufacturers or operators and constructed for use by any carrier vehicles compatible therewith. For example, a passenger cabin may be moved at a relatively low speed along and urban guideway using one type of carrier vehicle and then transferred to a vehicle of an interurban guideway using a different type of vehicle, possibly one using magnetic or aerodynamic levitation, and designed to move loads at high speed between cities.

The illustrated carrier vehicle 270 is similar to that disclosed in the aforesaid application Ser. No. 09/005,954 filed Jan. 12, 1998, reference being made to FIGS. 21–25 and the descriptions thereof. The vehicle 270 is supported on lower tracks of a guideway that has upper tracks performing the functions of limiting upward and tilting movements of the vehicle 270, guiding its path of movement, controlling steering thereof through Y junctions and supplying electrical power thereto. The tracks are not shown but are similar to those shown in said application Ser. No. 09/005,954, differing in that the track width of the upper tracks for the vehicle 270 as shown is substantially greater than the track width shown in said application. However, a narrower track width as shown in said application may be used or an even narrower track width may be used with the upper wheels of the vehicle being on the insides of the lower wheels rather than on the outside thereof.

The pads 267 and 268 of the vehicle 270 are supported at the upper ends of posts that are hidden from view in FIG. 22 but which have lower ends secured to opposite ends of a frame member 282. Front and rear bogies 283 and 284 support the ends of the frame member 282 are supported from lower tracks by a pair of lower front wheels 285 and a pair of lower rear wheels 286, a left wheel of each pair of lower wheels being hidden from view in FIG. 22. For engagement with left and right upper tracks, left and right upper front wheels 287 and 288 are supported from the front bogie 283 through left and right support assemblies 289 and 290. Similarly, left and right upper rear wheels 291 and 292 are supported from the rear bogie 284 through left and right support assemblies 293 and 294.

Important features relate to guiding of movement of the vehicle 270 along guideway paths, including the selective guiding of the vehicle 270 through either left-hand or right-hand paths of divergent Y sections. Each of the upper wheels 287, 288, 291 and 292 is a grooved wheel to provide flanges engageable with the sides of upper tracks. In addition, a pair of upper grooved auxiliary wheels 295 and 296 are provided that are engageable with the upper tracks and that are supported by support assemblies 297 and 298 from a carriage 300. When approaching the a divergent Y section, the support assemblies 289, 293, and 297 are controllable to lower the grooved wheels 287, 291 and 295 on the left side of the vehicle 270 and to allow the grooved wheels 290, 292 and 296 to remain in engagement with right-hand upper tracks and to guide the vehicle through the right path of the divergent Y section. Similarly, the right-hand wheels 290, 292 and 296 can be lowered to allow the left-hand wheels 289, 291 and 295 to guide the vehicle through the left path of the divergent Y section.

The support assemblies for the grooved wheels are also usable to control traction. When increased traction is desired they may apply increased forces against the upper tracks and thereby apply increased traction forces between drive wheels and lower tracks.

The grooved wheels also control angles of turn of the front and rear bogies which are pivotal relative to the frame about centrally located front and rear vertical steering axes that are substantially in the same front and rear vertical planes as the axes of the front and rear lower wheels as well as the axes of the upper front and rear wheels. The grooved wheels provide a means for controlling the angles of turn of the front and rear bogies to maintain substantial alignment of such front and rear vertical planes with the axis of curvature of any curved portions of the tracks on which the vehicle moves.

The carriage 300 is supported from the frame 282 for rectilinear movement in a direction transverse to the direction of movement of the vehicle. As shown, support shafts 301 and 302 extend transversely and in longitudinally spaced parallel relation between left and right side portions 303 and 304 of the frame 282 and through openings in an upstanding portion 305 of the carriage 300. Tongues 307 and 308 extend forwardly and rearwardly from the front and rear sides of the carriage 300 and carry pins 309 and 310 which extend downwardly through openings in tongues 311 and 312 that extend rearwardly and forwardly from rear and front sides of the front and rear bogies 283 and 284.

In a straight ahead condition of the vehicle 270 as shown, the axis of the auxiliary wheels is in an intermediate vertical plane that is midway between front and rear vertical planes in which the front and rear turn axes and the axes of the front and rear lower and upper wheels are located. In this condition, the pins 309 and 310 are located midway between the front and rear vertical planes and the intermediate vertical plane. By way of example, the distance between the front and rear vertical planes, i.e. the wheel base, may be 108 inches and the distance from the intermediate plane to each of the pins 309 and 310 may be 27 inches. If, for example, the vehicle 270 moves from a straight portion of the tracks onto a portion that curves to the left, the auxiliary wheels 295 and 296 and the carriage 300 will move to the right, turning the front bogie 283 in a counter-clockwise direction as viewed from above and turning the rear bogie 284 in a clockwise direction. As explained in the aforesaid application Ser. No. 09/005,854, it is possible to obtain an alignment between the axes of the wheels and the axis of curvature of a curved portion of the tracks which is nearly exact for practical purposes.

As also disclosed application Ser. No. 09/005,584, the upper front, rear and auxiliary wheels may preferably be used in supplying electrical power to the vehicle as well as for guiding the vehicle. For this purpose, the upper tracks are electrified, each of the upper wheels or at least the portions thereof that engage upper tracks is insulated from supporting structures and the support assemblies 289, 290, 293, 294, 297 and 298 include slip ring assemblies for conducting current from the upper wheels to electrical circuitry within the vehicle.

The drive train as shown in FIGS. 22–25 of said application Ser. No. 09/005,954 may be used or a similar proposed drive arrangement may be used in which a three-phase AC induction motor is continuously operated at near rated speed and is operated as a generator during deceleration to return energy to a power source and thereby achieve regenerative braking and to reduce the need for braking and to reduce brake wear.

In the proposed drive arrangement, the induction motor is coupled through a special multi-speed transmission and through a differential gearing assembly to a pair of lower drive wheels of a bogie. The special multi-speed transmission may, for example, be a four speed transmission using friction clutches which when fully engaged and when the induction motor is operated at rated speed from a 60 Hz AC source, permit driving of the vehicle at speeds of 20, 40, 60 and 80 MPH. To accelerate the vehicle to 80 MPH, the friction clutches and first, second, third and fourth gears of the transmission are used to progressively accelerate to 20 MPH, then to 40 MPH, then to 60 MPH and finally to 80 MPH. To decelerate the vehicle to a stop, the third gear is initially used through a friction clutch to decelerate to 60 MPH. During such deceleration, part of the kinetic energy of the vehicle will be dissipated in the friction clutch but a substantial part will be returned to the power source through operation of the induction motor as a generator. After deceleration to 60 MPH, the second and first gears are progressively used to decelerate to 40 MPH and then to 20 MPH. Deceleration from 20 MPH to zero is accomplished entirely by conventional wheel braking.

In a proposed transmission design, four gear sets are provided each including a sun gear, a ring gear, and planet gears that are meshed with the sun and ring gears and that are supported by a planet carrier. The four sun gears are splined on a shaft driven by the motor. The four planet carriers are connected together and to an output shaft that is coupled to the differential. Four annular discs are secured to the outsides of the ring gear and are arranged to be braked by four standard types of disc brake assemblies to provide in effect a friction clutch arrangement. When each disc is braked to a stop, the transmission is operated efficiently at the gear ratio determined by the gears of the corresponding gear set. Preferably, the speeds of operation of vehicles moving along the guideway are so controlled as to normally operate with full engagement of one of the gear sets and to brake the discs or otherwise use friction clutching only when accelerating or decelerating. This not only provides high efficiency but facilitates movement of the vehicles along guideways with substantially fixed and safe distances between vehicles. The disc brakes and wheel brakes may preferably be controlled using a common hydraulic system with electrically controlled valves.

Other features as disclosed in application Ser. No. 09/005, 584 may be used in the vehicle 270, including the mechanisms for control of the support assemblies for the upper grooved wheels.

Guideway Interchanges, Transfer Operations and Alternative Station Constructions (FIGS. 23–27)

Figure 23:
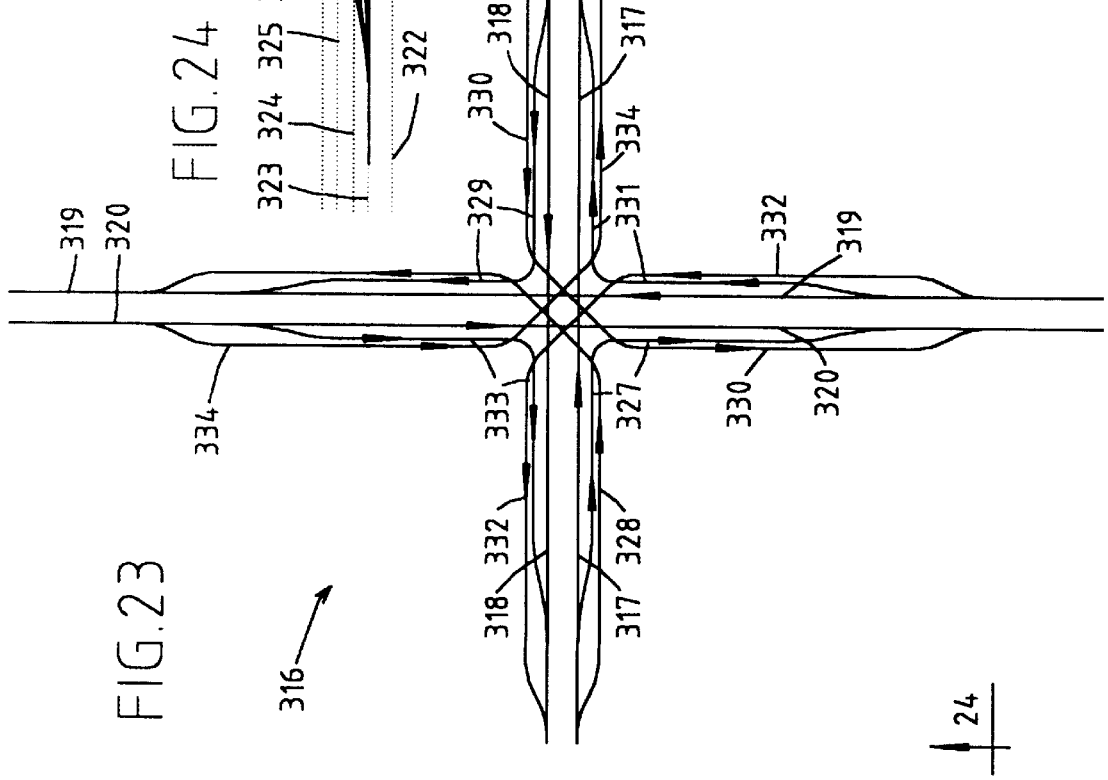
FIG. 23 is a diagrammatic view of an interchange of the system.

FIG. 23 diagrammatically illustrates an interchange 316 in which a pair of guideways 317 and 318 define paths that will be designated as E and W paths and that are in side-by-side relation for movement of carrier vehicles in parallel but opposite E and W directions and in which a pair of guideways 319 and 320 define N and S paths that cross the E and W paths in a crossing region 321 and that are in side-by-side relation for movement of carrier vehicles in parallel but opposite N and S directions.

Figure 24:
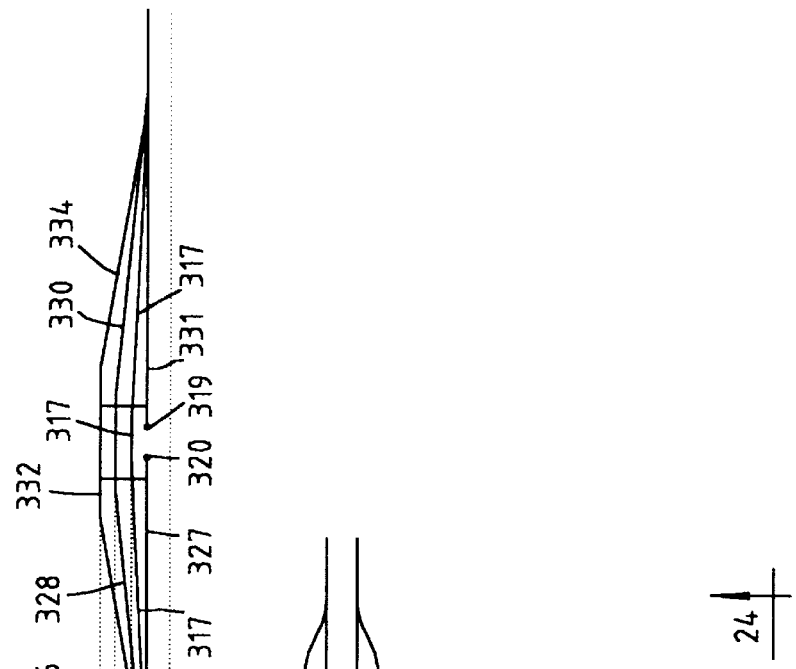
FIG. 24 is a diagrammatic sectional view of the interchange of FIG. 23, looking from along line 24—24 of FIG. 23.

FIG. 24 is a diagrammatic cross-sectional view looking from along line 24—24 of FIG. 3. A ground level 322 and four levels 323–326 at progressively higher elevations above the ground level 322 are indicated by dotted lines. The N and S paths are at the first level 323 above ground level. The E and W paths have central portions at the second level 324 to crossover the N and S paths and portions that are inclined downwardly to end portions at the first level 323. Portion of certain branch paths that are in the crossing regions are at the third and fourth levels 325 and 326.

Four branch paths 327–330 are provided for movement of vehicles from either of the E and W paths to either of the N and S paths and are respectively designated as E-S, E-N, W-N and W-S paths. Four branch paths 331–334 are provided for movement of vehicles from either of the N and S paths to either of the E and W paths and are respectively designated as N-W, N-E, S-E and S-W paths.

The E-S branch path 327 extends off from the E path through a divergent Y section and then extends in the E direction toward the crossing region 321 and to a turn portion, then in the S direction away from the crossing region 321 to enter a convergent Y section and join the S path 320. All of the branch path 327 is at the first level 323.

The E-N branch path 328 extends off from the E path 317 through a divergent Y section and in the E direction toward the crossing region 321 and to a turn portion, then in the N direction away from the crossing region 321 to enter a convergent Y section and join the N path 319. The ends of the branch path 328 are at the first level 323 but it is inclined upwardly to a part of the turn portion that extends at a 45 degree angle through the crossing region 321 and that is at the third level 325, being then inclined downwardly away from the turn portion.

The W-N branch path 329 extends off from the W path through a divergent Y section and then extends in the W direction toward the crossing region 321 and to a turn portion, then in the N direction away from the crossing region 321 to enter a convergent Y section and join the N path 319. All of the branch path 329 is at the first level 323.

The W-S branch path 330 extends off from the W path 318 through a divergent Y section and in the W direction toward the crossing region 321 and to a turn portion, then in the S direction away from the crossing region 321 to enter a convergent Y section and join the S path 320. The ends of the W-S branch path 330 are at the first level 323 but it is inclined upwardly to a part of the turn portion that extends at a 45 degree angle through the crossing region 321 and that is at the third level 325, being then inclined downwardly away from the turn portion.

The N-E branch path 331 extends off from the N path through a divergent Y section and then extends in the N direction toward the crossing region 321 and to a turn portion, then in the E direction away from the crossing region 321 to enter a convergent Y section and join the E path 317. All of the N-E branch path 331 is at the first level 323.

The N-W branch path 332 extends off from the N path 319 through a divergent Y section and in the N direction toward the crossing region 321 and to a turn portion, then in the W direction away from the crossing region 321 to enter a convergent Y section and join the W path 318. The ends of the N-W branch path 332 are at the first level 323 but it is inclined upwardly to a part of the turn portion that extends at a 45 degree angle through the crossing region 321 and that is at the fourth level 326, being then inclined downwardly away from the turn portion.

The S-W branch path 333 extends off from the S path through a divergent Y section and then extends in the S direction toward the crossing region 321 and to a turn portion, then in the E direction away from the crossing region 321 to enter a convergent Y section and join the W path 318. All of the S-W branch path 333 is at the first level 323.

The S-E branch path 334 extends off from the S path 320 through a divergent Y section and in the S direction toward the crossing region 321 and to a turn portion, then in the E direction away from the crossing region 321 to enter a convergent Y section and join the E path 317. The ends of the S-E branch path 334 are at the first level 323 but it is inclined upwardly to a part of the turn portion that extends at a 45 degree angle through the crossing region 321 and that is at the fourth level 326, being then inclined downwardly away from the turn portion.

In FIG. 23, part of the branch path 328 is shown for clarity of illustration as being slightly offset from a parallel part of the branch path 327 but should be understood as being in a preferred position in substantially vertical alignment with the path 327 being well above the first level 323 in which the path 327 is located. Corresponding parts of the branch paths 330, 332 and 334 should be similarly understood as being above and in substantially vertical alignment with parts of the branch paths 329, 331 and 333.

The parts of the E-N and W-S paths 328 and 330 that are at the third level 325 and that extend at 45 degree angles are in parallel relation and are spaced apart only a short distance of on the order of 12 feet or less. Similarly the parts of the paths 332 and 334 that are at the fourth level and that extend at 45 degree angles are in parallel relation and are spaced apart only a short distance of on the order of 12 feet or less. The turn portions of the E-S, W-N, N-E and S-W branch paths 327, 329, 331 and 333 are right angle turns which may have a very short radius, of on the order of 20 feet or less for example. As a result, the portions of the paths in the crossing region may be located above an intersection of two streets and the center line of each of the major portions of each of the branch paths 327, 329, 331 and 333 can be spaced only a short distance from the center line of one of the E, W, N and S paths to be above side portions of an underlying street. For example, a spacing of 12 feet or less may be used, it being noted that to facilitate illustration, the lengths of the paths are shown as being much shorter that is actually the case in relation to the horizontal spacings of paths. With spacings and turns of short radii as described, all of the paths may be located above streets in an urban region, minimizing the need for acquisition of additional rights-of-way.

Figure 25:
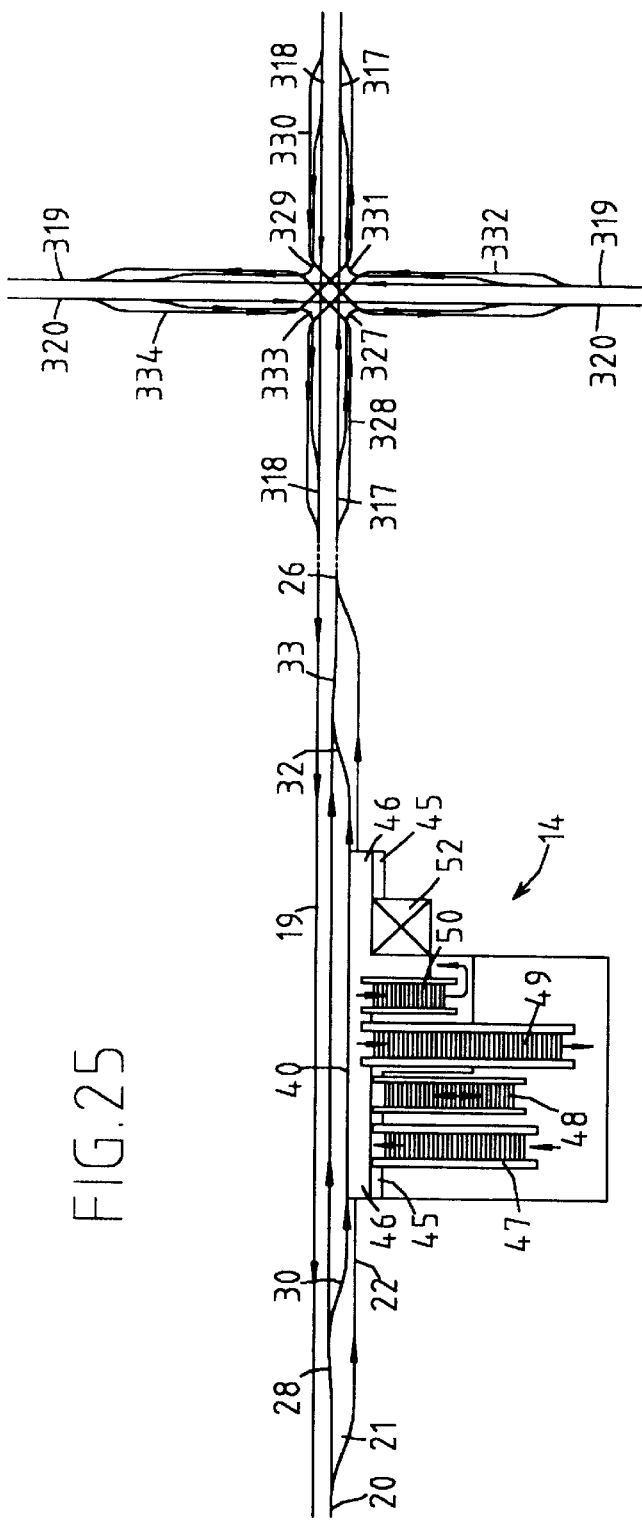
FIG. 25 is a diagrammatic view of the passenger station shown in FIGS. 1–3 in relation to the interchange shown in FIG. 24.

FIG. 25 diagrammatically shows how the interchange 316 may be used in relation to the station 14. The lower and upper platforms 45 and 46 are shown diagrammatically, also the up escalator 47, lower stairs 48, down escalator 49, upper stairs 50 and elevator 52. Sections 19 provide a west bound main line path while an east bound main line path is provided by the section 20, left portion of the divergent Y junction 21, up ramp 28 left portion of divergent Y junction 30, guideway sections between junctions 30 and 32, the left hand portion of the convergent Y junction 32 and the section 26.

Vehicles that carry empty cabins may exit the east bound main line path to enter a lower branch path that extends along the lower platform 45 and that is formed by the right-hand portion of divergent Y section 21, sections 22 and 24 and the right hand portion of the convergent Y section 25. Vehicles that carry cabins to be unloaded at the station 14 may exit the east bound main line path to enter an upper branch path that includes the right-hand portion of the divergent Y section 30, the section 40 that extends along the upper platform 46 and the right-hand portion of the convergent Y section 32.

The system may be programmed to obtain any one of a number of modes of operation with respect to movements of vehicles through the interchange 316 after either going past the station along the east bound main line path, or exiting the station 14 after loading of a cabin or exiting the station after unloading of one or more passengers.

A number of possible modes are shown by the following table:

| Mode No. | After Passing Station | After Unloading of Passenger(s) | After Loading of Passenger(s) |
|---|---|---|---|
| 1 | E path 317 | E path 317 | E path 317 |
| 2 | E-S path 327 to S path 320 | E-S path 327 to S path 320 | E-S path 327 to S path 320 |
| 3 | E-N path 328 to N path 319 | E-N path 328 to N path 319 | E-N path 328 to N path 319 |
| 4 | E path 317 | E path 317 | E-S path 327 to S path 320 |
| 5 | E path 317 | E path 317 | E-N path 328 to N path 319 |
| 6 | E-S path 327 to S path 320 | E-S path 327 to S path 320 | E path 317 |
| 7 | E-S path 327 to S path 320 | E-S path 327 to S path 320 | E-N path 328 to N path 319 |
| 8 | E-N path 328 to N path 319 | E-N path 328 to N path 319 | E path 317 |
| 9 | E-N path 328 to N path 319 | E-N path 328 to N path 319 | E-S path 327 to S path 320 |

In modes 1, 3 and 3 all passenger cabins are moved through the interchange on the same path, either on the E path 317, along the E-S branch path 327 and to the S path 320, or along the E-N branch path 328 and to the N path 319. In modes 4–9, the cabins are moved along different paths.

With mode 4, all departing passengers entering the station 14 will go to the lower platform and enter an awaiting cabin which will then be carried along the E-S path 327 and to the S path 320. However, all passenger cabins that either pass the station or which unload one or more passengers and then exit the station will be moved along the E path 317. Any passenger who exits a cabin at the station 14 may either exit the station 14 or he may go down from the upper platform 46 to the lower platform 45 and enter an awaiting cabin which will then be carried along the E-S path 327 and to the S path 320. Thus in mode 4, the station 14 operates as a transfer station to allow passengers to exit a cabin and enter another cabin to go on the S path, while other passengers who do not exit the cabin will be carried on the E path to their chosen destination or destinations.

In all of the modes shown in the foregoing table, both passenger cabins which pass the station and cabins which exit after unloading of one or more passengers therefrom go along the same path. This will normally be the case. However, modes are possible in which cabins that have unloaded a passenger may go along a path different from the path taken by cabins passing the station. For example, after being unloaded, cabins that still carry one or more passenger may be moved along the same path as those passing the station while cabins that are empty may be moved along a different path. As another example, the mode 4 operation may be modified to allow a passenger who has entered a station preceding the station 14 to select a station along a continuation of the S path 320. If that station is the only remaining station selected in a cabin approaching the station 14, that cabin may be moved past the station 14 and be moved along E-S path to the S path to continue to the selected station. If however, one or more other passengers have selected a station or stations along a continuation of the E path 317, the cabin will stop at the unloading region of the station 14 and any passenger or passengers who have selected a station along a continuation of the S path will be instructed to exit the vehicle and go to the lower platform and enter a cabin bound for stations along a continuation of the S path 320.

Vehicles which carry automobile platforms or freight containers and vehicles which carry cabins occupied by a single passenger are not subject to the same restrictions as vehicles that carry multi-passenger cabins and may moved through the interchange 316 according to the destination selected by the driver of the automobile, the sender of the freight container or the single passenger.

Figure 26:
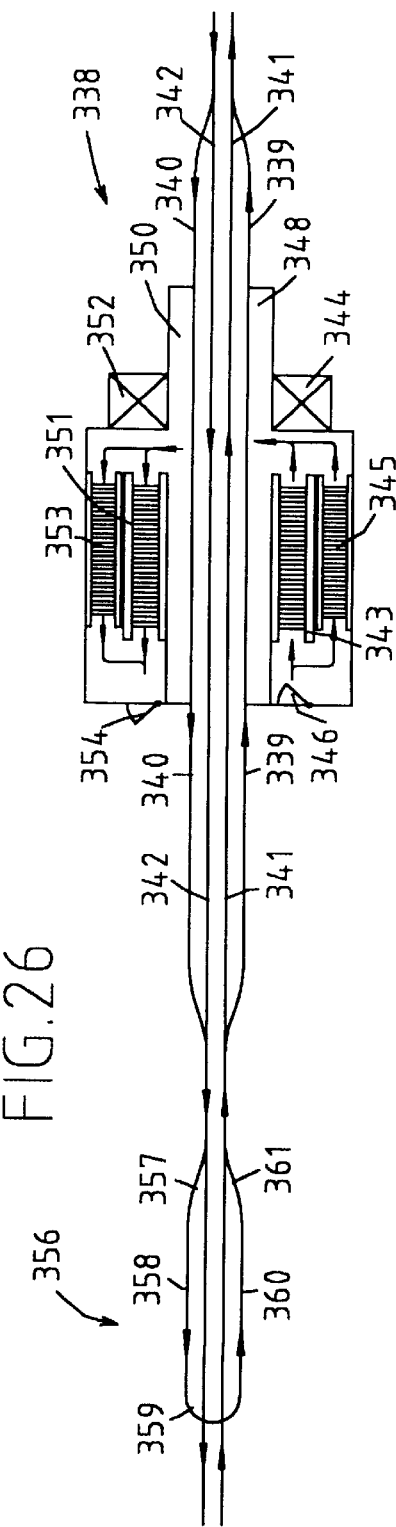
FIG. 26 is a diagrammatic view of one alternative passenger station arrangement, also showing a turn-around of the system.

FIG. 26 diagrammatically illustrates an alternative passenger station arrangement in which two stations 337 and 338 are provided alongside an E branch path 339 and a W branch path 340 that are associated with an E main path 341 and a W main path 342 for vehicles moving in opposite E and W directions.

The station 337 is shown as being a loading station for departing passengers and as including an up escalator 343, an elevator 344 and a stairway 345. Passengers who enter through a door 346 may be carried or may climb up to a platform 348 and enter an awaiting cabin. The platform 348 preferably has a length such that four or more cabins may await entry of passengers and, although not clear from the drawing, the branch path 339 should be understood as having a length such that a substantial number of empty cabins can accumulate in a queue awaiting entry into the station 339.

The station 338 is shown as being an unloading station for arriving passengers who may move from an arriving cabin and onto a platform 350 and then use a down escalator 351, an elevator 352 or a stairway 353 to move down to a lower level and exit through an exit door 354.

Guideways that provide the E and W branch and main paths 339–342 may preferably be supported above a street between the loading and unloading stations 337 and 338. Additional mating pairs of loading and unloading stations may be provided along continuations of the E and W main paths 341 and 342. To allow travel in both E and W directions, alternate stations along the E path are loading stations the others are unloading stations, each loading station on one side being mated with an unloading station on the opposite side. Each passenger who enters a loading station on one side of a street to travel to a destination in either the E or W direction may to return in the opposite direction to an unloading station on the opposite side of the street.

FIG. 26 also shows a turn around path 356 which may be used to cause vehicles moving along the main E path 341 to the turned around and enter the W path 342 and travel in the opposite direction. It may be used, for example, to cause passenger cabins that are empty after leaving the unloading station 338 along the W path 342 to be moved back along the E path 341 to enter the branch path 339 for the station 337 or to enter the branch path of another loading station where empty cabins may be in short supply.

The turn around path 356 comprises the right part of a divergent Y junction 357, an up ramp 358, a 180 degree turn 359 that is above the paths 341 and 342, a down ramp 360, and the right part of a convergent Y junction 361. The left parts of the Y junctions 357 and 361 form portions of the W path 342 and the E path 341. The construction of the carrier vehicle 270 as described in connection with FIG. 22 allows use of a short radius for the 180 degree turn, may be 18 feet, for example. The turn around path 356 and the guideways that form the paths 341 and 342 may be readily supported above a street.

FIG. 27 diagrammatically illustrates another alternative passenger station arrangement that is similar to that of FIG. 26. Two stations 365 and 366 are provided alongside an E branch path 367 and a W branch path 368 that are associated with an E main path 369 and a W main path 370 vehicles moving in opposite E and W directions. The paths 367–370 may be formed by guideways supported above a street and the stations 365 and 366 are preferably on opposite sides of the street. Either station 365 or station 366 may be used as either a loading station or an unloading station. A typical use is one in which one is used as a loading station and the other is used as an unloading station.

When station 365 is used a loading station, passengers may enter through a door 371 at ground level and use stairs 372 or an elevator 373 to reach a platform 374 and enter an awaiting cabin along the branch path 367. The platform 374 preferably has a length sufficient for substantially simultaneous loading of a plurality of cabins and the branch path 337 preferably has a length sufficient for storage of a substantial number of cabins in a queue awaiting entry into the station 365.

When station 366 is used as an unloading station, arriving passengers may exit onto a platform 376 from a cabin stopped along the W branch path 368 and then use stairs 377 or an elevator 378 to go down to ground level and exit through a door 380.

The drawing may suggest that the door 371 of the station 365 is usable only for entrance and that the door 380 of the station 366 is usable only for exit, but either door may be used for either entrance or exit. When station 365 is used as a loading station and station 366 is used as an unloading station, departing passengers who do not wish to cross a street to use the loading station 365 may enter through the door 380 of station 366, use the stairs 377 to reach the platform 368, then use stairs 381 to reach a cross-over 382 that is above the paths 367–370, and then use stairs 383 to reach the platform 374 of the loading station 365 to enter an awaiting cabin and travel in the E direction to a desired destination. Alternatively, such passengers after entering through the door 380 may use the elevator 378 to reach the cross-over 382 and then use the elevator 373 to reach the platform 374.

Similarly, passengers arriving on the platform 376 of the unloading station 366 and who may wish to exit from station 365 at the opposite side of the street may use the stairs 381 or the elevator 378 to reach the crossover 382 and then use stairs 383 and stairs 383 or the elevator 373 to reach ground level and exit through the door 371.

As an alternative, passengers arriving on the platform 376 may wish to use the station 365 to travel back in the opposite direction. They may wish to do so if they have missed a stop or to reach an unloading station in the opposite direction that is closer to the desired destination.

It is also noted that the stations 365 and 366 may be used as a transfer point. When station 365 is used as a loading station and station 366 is used as an unloading station, cabins leaving the loading station 365 may be programmed to go along a path different from the path used by cabins arriving at the unloading station 366. Passengers arriving at the unloading station 366 who may wish to go to destinations along such a path may use the stairs 381 and 383, elevators 378 and 373 and crossover 382 to reach the platform 374 and enter an awaiting cabin to be carried to their desired destination.

Although not shown in FIG. 27, both stations 365 and 366 and the crossover 382 are preferably provided with roofs to protect passengers from the elements.

FIG. 28 illustrates a portion of a system in which pairs of mating stations are used in conjunction with the interchange 316. Mating stations that are like stations 365 and 366 of FIG. 27 are depicted but it will be understood that the discussion is applicable to other types of mating stations such as stations 337 and 338 of FIG. 26. A series of five station pairs 385, 386, 387, 388 and 389 are shown along extensions in the W direction of the E and W paths 317 and 318 of the interchange 316. Station pairs 391 and 392 are shown along extensions in the E direction of the E and W paths 317 and 318; station pairs 393 and 394 are shown along extensions in the S direction of the N and S paths 319 and 320; and station pairs 395 and 396 are shown along extensions in the N direction of the N and S paths 319 and 320. In the complete system, additional stations are provided along further path extensions in the W, E, S and N directions.

Reference characters are applied to the stations for explaining one possible use thereof. "LS", "LN", "LE" and "LW" indicate the use of a station as a loading station and a direction at which a cabin loaded thereat will usually be moving when leaving the interchange 316. "U" indicates the use of a station as an unloading station and is followed by a designation of its location with reference to the interchange. For example, in the designation "UE–1", E indicates movement from the station in the E direction; "–" indicates that cabins thereat have not reached the interchange whereas "+" would indicate that cabins thereat have left the interchange; and "1" indicates a position closest to the interchange. Thus "UE+2" indicates the second loading station after leaving the interchange in the E direction. Stations such as "UW+4", "UE–3", "UE+3", "US+3" and "UN+3" are not shown but are provided along the aforementioned further path extensions in the W, E, S and N directions.

It is not usual that eight passengers will enter a cabin at one loading station and select eight different destinations. However, it may be assumed that eight passengers do enter a cabin at the "LE" loading station of the pair 388 and select the UE+1, UE+2, UE+3, UN+1, UN+2, UN+3, US+1 and US+2 unloading stations as destinations. The cabin will move in the E direction through the interchange and stop at the UE+1 unloading station of the pair 391. The UE+1 passenger is then instructed to exit the cabin and exit the station; the UN+1 and UN+2 passengers are instructed to exit the cabin and move to the loading station LN of the pair 391; and the five remaining passengers are cautioned to remain in the cabin. The cabin will then move to the UE+2 station of the pair 392. The UE+2 passenger is then instructed to exit the cabin and exit the station; the US+1 and US+2 passengers are instructed to exit the cabin and to move to the loading station LS of the pair 392; and the remaining LE+3 passenger is cautioned to remain in the cabin which is then moved to the UE+3 station that is not shown in FIG. 28, allowing the UE+3 passenger to exit.

The UN+1 and UN+2 passengers who exited a cabin at the station UE+1 and moved to the station LN to enter a cabin thereat will be moved by that cabin through a branch path of the interchange 316 and to the UN+1 and UN+2 stations. Similarly, the US+1 and US+2 passengers who exited a cabin at the station US+2 and moved to the station LS to enter a cabin thereat will be moved by that cabin to the US+1 and US+2 stations.

The operation is similar with respect to passengers who have entered cabins at loading stations that are not shown but that are along further extensions of the N, S, E and W paths.

When all passengers in a cabin that exits from or passes the last unloading station before reaching an interchange have selected destinations that require movement in the same direction when exiting the interchange 316, the cabin will exit in that direction, moving directly along a branch path through the interchange if necessary. For example, suppose that the only passengers entering a cabin at the LE loading station of the station pair 388 are a passenger UE–1, a passenger US+1 and a passenger US+2. The cabin will stop at the station UE–1 to allow the first passenger to exit, leaving only the US+1 and US+2 passengers in the cabin. The cabin will then move directly through a branch path of the interchange 316 to exit along the south path 320 and stop first at the station US+1 and then at the station US+2.

The loading stations of the station pairs 385, 386 and 391–396 are designated transfer stations, one purpose of which is to allow transfer of a passenger to a cabin which will move from the interchange in a direction to move the passenger toward his or her selected destination. However, they are not limited to such use. Other passengers may use the such transfer stations to reach their destination if they are willing to encounter one or more transfers in doing so. For, example if at the loading station LN of the pair 391, a UN+1 transfer passenger, a UW+3 and a UE+3 passenger enter together, the cabin will stop at the UN+1 station of the pair 395 to allow the UN+1 transfer passenger to exit and to allow the UW+3 passenger to move to the LW station of the pair 395 to enter a cabin and be carried to the UW+3 station. Then the cabin will stop at the UN+2 station of the pair 396 to allow the UE+3 passenger to move to the LE station of the pair 396 and to enter a cabin thereat and be carried to the UE+3 station. In a similar way a US+1 passenger might enter a cabin at the LN station of the pair 391 and reach his or her destination after transfers at the station pairs 395 and 385.

If no transfer passenger enters a cabin at one of the transfer stations, another passenger entering a cabin may be carried to his or her destination without encountering any transfer operation. For example, a US+1 passenger who enters a cabin alone at the IN station of the pair 391 may be carried directly through a branch path of the interchange 316 and to the US+1 station.

Accordingly, each cabin moves in response to the destinations that are selected by the entering passengers, stopping only at selected destinations and such transfer stations as may be necessary to allow passengers to reach selected destinations.

As aforementioned, a control system is provided that controls each vehicle to move to a selected station along a guideway and that has features like disclosed in my aforesaid U.S. Pat. No. 5,590,604. Monitoring and control units are provided along each guideway path to monitor the speed of passing vehicles and to receive data therefrom, including data that identifies the vehicle, the passenger cabin or other load carried thereby and the destination or destinations that have been selected by a passenger in a cabin, the driver of an automobile or the shipper of a freight container. Each monitoring and control unit sends data to passing vehicles that includes data for control of the maximum speed thereof and for reducing the speed of a passing vehicle when necessary to maintain a safe distance behind a vehicle ahead.

The control system also includes section control units each of which is coupled to a plurality of monitoring and control units. For traffic control, billing, maintenance and other functions, data as to activity in the system may be transmitted to a central control unit which may be coupled to a plurality of region control units each of which is coupled to a plurality of the section control units. When necessary, override controls may be exercised from a region control unit and/or the central control unit but, in general, it is desirable that each portion of the system operate autonomously as much as possible to minimize the adverse effects that might result from mal-function of the central control unit or any regional control unit.

A section control unit is generally assigned to each portion a system in which a loading/unloading operation may take place, to each portion of a system that includes a divergent Y section and to each portion of a system in which a merging operation may take place. One section control unit may control a large number of monitoring and control units along a long length of a straight guideway paths but it is desirable to limit the number of units controlled, to limit any adverse effect that might result from a mal-function of a section control unit.

FIG. 29 shows an arrangement of section control units for the portion of the system that includes the passenger station 14 of FIGS. 1–3. A region control unit 400 which may have a link 401 to a central control unit, not shown, is coupled to section control units 403–409. Each section control unit is coupled to monitoring and control units in a portion of the system that is indicated in dotted lines.

Unit 403 monitors and controls a portion of the system that includes the guideway section 20 while unit 404 monitors and controls movements through the divergent Y section 21 and is preferably coupled to monitoring and control units along a length of the main path leading up to the entrance to the section 21 for sending control data to each entering vehicles to control the path it will follow through the Y section 21. If a vehicle entering the portion controlled by unit 404 carries an empty cabin and if no signal has been received by unit 404 from the region control 400 to indicate otherwise, the vehicle will be controlled to take the right-hand path through the Y junction to enter the queue section 22. In other cases, the vehicle will be controlled to take the left-hand path through the Y junction 21.

The section control unit 405 controls a portion of the system that includes the Y junction 28. If an entering vehicle carries a passenger cabin having a passenger that is to exit at the station, either as a final destination or to transfer to another cabin, the vehicle will be controlled to take the right-hand path through the Y junction 28. In other cases, the vehicle will be controlled to take the left-hand path through the Y junction 28.

The section control unit 406 controls a portion of the system that includes the "queue" guideway portion 22. It obtains data as to the number of vehicles in the portion 22 and sends it to the regional control unit. In response, additional vehicles with empty cabins may be programmed to be moved to the section 22.

If the section 22 is full of cabin-carrying vehicles no additional empty cabins will normally be programmed to be moved to the section 22 as a destination. However, empty cabins that are located at a distance may be programmed to move to the section 22 with the expectation that cabins in the section will be moved out of the section 22 by the time the new empty cabins arrive. If the section 22 is full it sends a signal to the region control unit 400 which in turn sends a signal to the control unit 404 which is such that if that expectation is not realized, such newly empty cabins will be moved along the left-hand path of the Y junction 21 and to be so reprogrammed as to be sent to another location.

Potential problems that might otherwise arise from mal-function of section control units and region control units are obviated by the existence of direct connections between monitoring and control units of adjacent sections such that a vehicle in each section will be safely slowed down or stopped as necessary when there is a slow moving or stopped vehicle in the section ahead.

The section control unit 407 controls a portion of the system that includes sections 19 of the west-bound main guideway path. Unit 407 is shown connected to the region control 400 which controls east-bound movements but unit 407 may be connected to a separate region control unit that is used to control west-bound movements.

Section control unit 408 controls a portion of the system that controls movements in the diverging and converging Y sections 25 and 32, and movements along the main guide-way section and branch guideway sections that lead to the sections 25 and 32. It effects merge control operations such that after exit of one or more passengers at the upper platform 46 or after entry of passengers from the platform 45 and into a cabin, a cabin-carrying vehicle may be accelerated and safely merged into the flow of movement of other vehicles along the main line path. The merge control operation is depicted in the flow diagram of FIG. 35 and is described hereinafter.

The final section control unit 409 controls the portion of the system that includes the main guideway path section 26 on which vehicles exit the portion of the system shown in FIG. 29.

FIG. 30 shows an arrangement of section control units for a portion of the system that includes the passenger stations 337 and 338 of alternative passenger station arrangement of FIG. 26. The same arrangement of section control units is usable for a portion of the system that includes the stations 365 and 366 of the alternative passenger station arrangement of FIG. 27.

A region control unit 412 which may have a link 413 to a central control unit, not shown, is coupled to four section control units 415, 416, 417 and 418 that control movement of vehicles in the E direction through or past the station 337 along the branch E path 339 or the main E path 341. A separate region control unit might be used for control of movements in the west direction but region control unit 412 is also shown coupled to four section control units 419, 420, 421 and 422 that control movement of vehicles in the W direction past or through the station 338 along the branch W path 340 or the main W path 342. Each section control unit is coupled to monitoring and control units in a portion of the system that is indicated in dotted lines.

Section control unit 415 controls movements along the portion of the main E path 341 to the west of a divergent Y section at which vehicles may enter the branch E path 339 while section control unit 416 controls movements through that divergent Y section. The operation of units 415 and 416 is substantially the same as the operation of units 403 and 404 of the arrangement shown in FIG. 29.

Section control unit 417 controls movements along portions of both the branch E path 339 and the main E path 341 that are between divergent and convergent Y sections and also controls movements through that convergent Y section. Unit 417 may control movements in a queue portion of the branch E path 339 or a separate section control unit may be provided corresponding to the section control unit 406 of the arrangement of FIG. 29. The main function of the control unit 417 is to control merge operations such that after passengers enter cabin stopped in a loading region of the station 337 along the E branch path 339 and after the cabin is ready for movement, the vehicle that carries the cabin is accelerated and safely merged into the flow of movement of other vehicles along the main line E path 341. The merge control operation of the section control unit 417 is a simpler version of that used by the section control 408 of the arrangement of FIG. 29 and that is depicted in the flow diagrams of FIGS. 36 and 37 and described hereinafter.

Section control unit 418 controls movement leaving the convergent Y section in the main E path and corresponds to section control unit 409 of the arrangement of FIG. 29.

The operation of the section control units 419, 420, 421 and 422 which control movements in the W direction is similar to that of the section control units 415, 416, 417 and 418 that control movements in the E direction.

FIG. 31 diagrammatically shows the relationship of circuits of a passenger cabin and a carrier vehicle to monitoring and control units which determine the speeds of passing vehicles and send corresponding signals rearwardly through serial connections between the units. Each thereby obtains data as to the distance to and the speed of a vehicle ahead, computes the safe speed at which a passing vehicle should operate and sends a corresponding signal to any passing vehicle. The operation of the monitoring and control units is described in detail herein in connection with the flow diagram of FIG. 34.

FIG. 31 depicts monitoring and control units that are assumed to be associated with a divergent Y section such as the section 21 as shown in FIGS. 1 and 25. The speed of a vehicle that is to follow a selected path through a divergent Y section must be controlled in response any vehicle ahead that may be in a region approaching the section as well as any vehicle that may be in the selected path.

Three groups of monitoring and control units are shown in FIG. 31. Units 425, which will be referred to as "approach units", are assumed to be along the forward end portion of a path approaching the entrance of a divergent Y section. Units 426, which will be referred to as "main units", are assumed to be along a path through the left-hand portion of the Y section and a continuation thereof. Units 427, which will be referred to as "branch units", are assumed to be along a path through the right-hand portion of the Y section and a continuation thereof.

The carrier vehicle 270, indicated in dotted lines, includes a circuit 430 that is arranged for bi-directional wireless communications with the monitoring and control units 425, 426 and 427, being in communication with the approach units when approaching the entrance to the divergent Y section, with the main units 426 when moving along the left-hand portion of the divergent Y section and a continuation thereof and being in communication with the branch units 427 when moving along the right-hand portion of the divergent Y section a continuation thereof.

An information signal is sent by each of the units 425, 426 and 427 to the unit behind which corresponds to a speed signal it develops from a passing vehicle and/or to an information signal the unit has received from a unit ahead. For sending such information signals, couplings 431 are provided between the main units 426, couplings 432 are provided between the branch units 427, pairs of couplings 433 and 434 are provided between the approach units 425, and a pair of couplings 435 and 436 is provided between the last approach unit and the first main and branch units.

If, for example, the carrier vehicle passes any one the main units 426, that unit will develop a signal that corresponds to the speed of the passing vehicle and sends an information signal which is sent rearwardly through a chain that includes the couplings 431 and preceding main line units, the coupling 435, the last of the approach units 425 and the couplings 433 and other approach units 425. Each unit along that chain then has data as to the distance to and speed of the carrier vehicle ahead and it can compute the speed at which a passing vehicle may be operated to maintain a safe following distance.

Similarly, such information signals may be sent rearwardly one of the branch units 426 through a chain that includes the couplings 432 and preceding branch units, the coupling 436, the last of the approach units 425 and the couplings 434 and other approach units 425.

As a result, a carrier vehicle passing any one of the illustrated approach units 425, or any approach unit that precedes those shown, can be sent a signal that commands it to operate at a speed such as to maintain a safe operating distance behind any vehicle ahead which is moving along or which may block the selected path, whether it be the main path or the branch path.

Each monitoring and control unit may determine the speed of a passing carrier vehicle without receiving a speed signal from the vehicle but may preferably receive a signal from the carrier vehicle circuit 430 that indicates the speed of the vehicle 270. In addition, each monitoring and control unit receives data from the vehicle circuit 430 that preferably includes ID and destination data and that may also include data as to the status of a passenger cabin or other load carried by the vehicle 270. As indicated in FIG. 31, the carrier vehicle circuit 430 is inductively coupled to a data store and transceiver unit 438 of a passenger cabin 439 that is indicated in dotted lines. The unit 438 is connected to eight data entry units 440, one for each passenger. Each passenger entering a cabin and taking a seat may use a key pad of a unit 440 to enter data as to a selected destination as well as data as to his or her identity which may be entered using a credit card or the equivalent. Such data is communicated to through the transceiver unit to the carrier vehicle circuit 430 and through the carrier vehicle circuit to monitoring and control units as the vehicle moves along its path. Data is communicated in the opposite direction to the unit 440 which preferably includes a visual display and/or audio signal means for confirming his or her entries, for instructing a passenger to exit when his or her destination is reached, for instructing a passenger to exit and transfer when a transfer is required, for instructing a passenger to stay in place when he or she should do so, etc. It should also include instructions and means for signaling that a passenger faces what he or she regards as an emergency situation.

Audio and video circuits 442 are also provided for giving instructions to all passengers in the cabin 439. Circuits 439 are coupled to a transceiver unit 443 which is inductively coupled to the carrier vehicle circuit 430.

The speed control operations of monitoring and control units 425, 426 and 427 that have been described are performed autonomously and do not require signals from a section control unit such as the section control unit 404 that is shown in FIG. 29 as being assigned to the Y section 21. However, signals are sent from the monitoring and control units to the section control unit 404 for monitoring purposes so that the system can keep track of the positions, conditions and movements of vehicles, the destinations and usages by passengers, automobile drivers and freight shippers and such other data as may be desirable for efficient maintenance, storage and dispatching of vehicles and for billing and other purposes.

Figure 36:
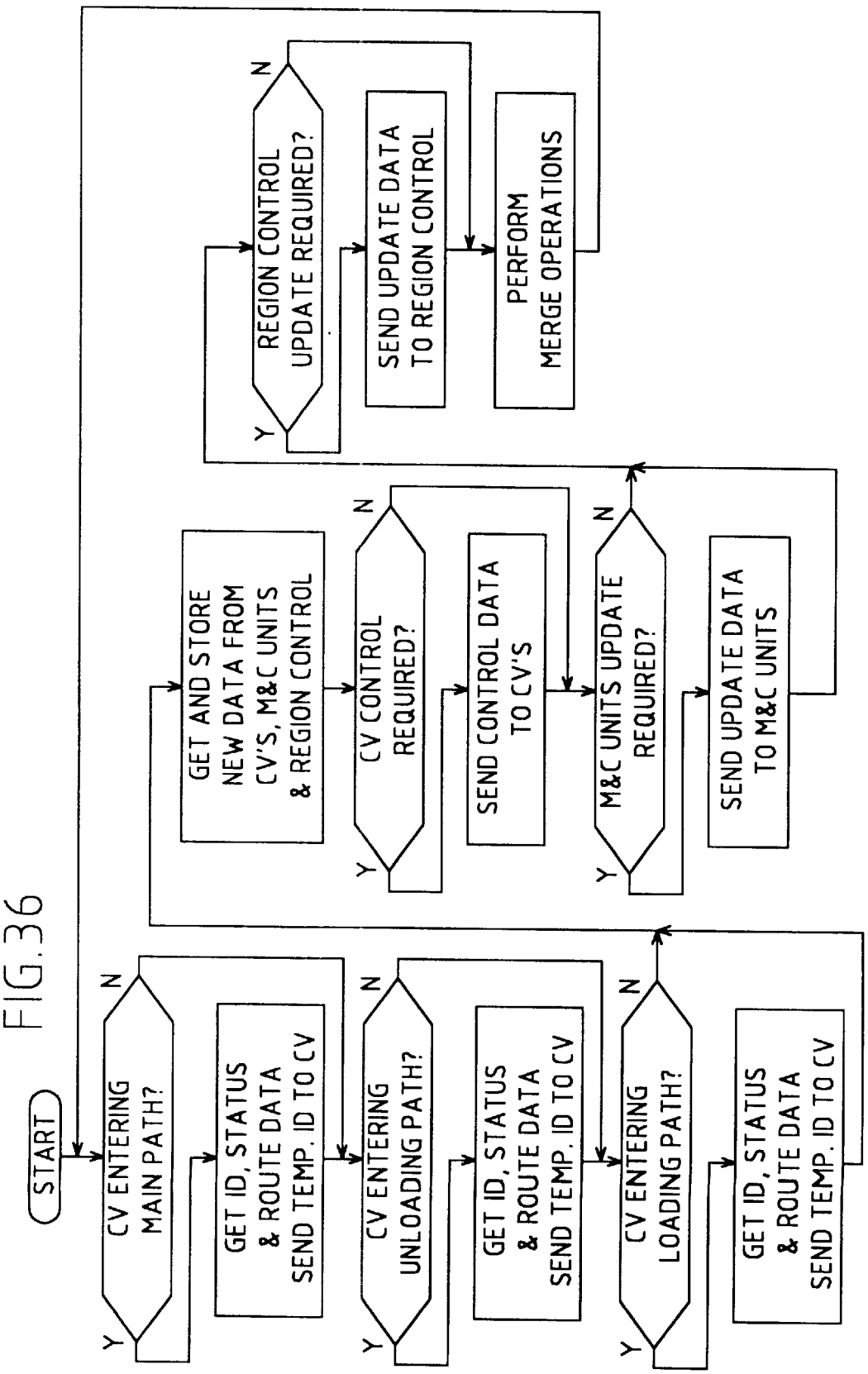
FIG. 36 is a flow diagram illustrating operations of a section control unit which controls a section in which certain merging operations occur.
Figure 37:
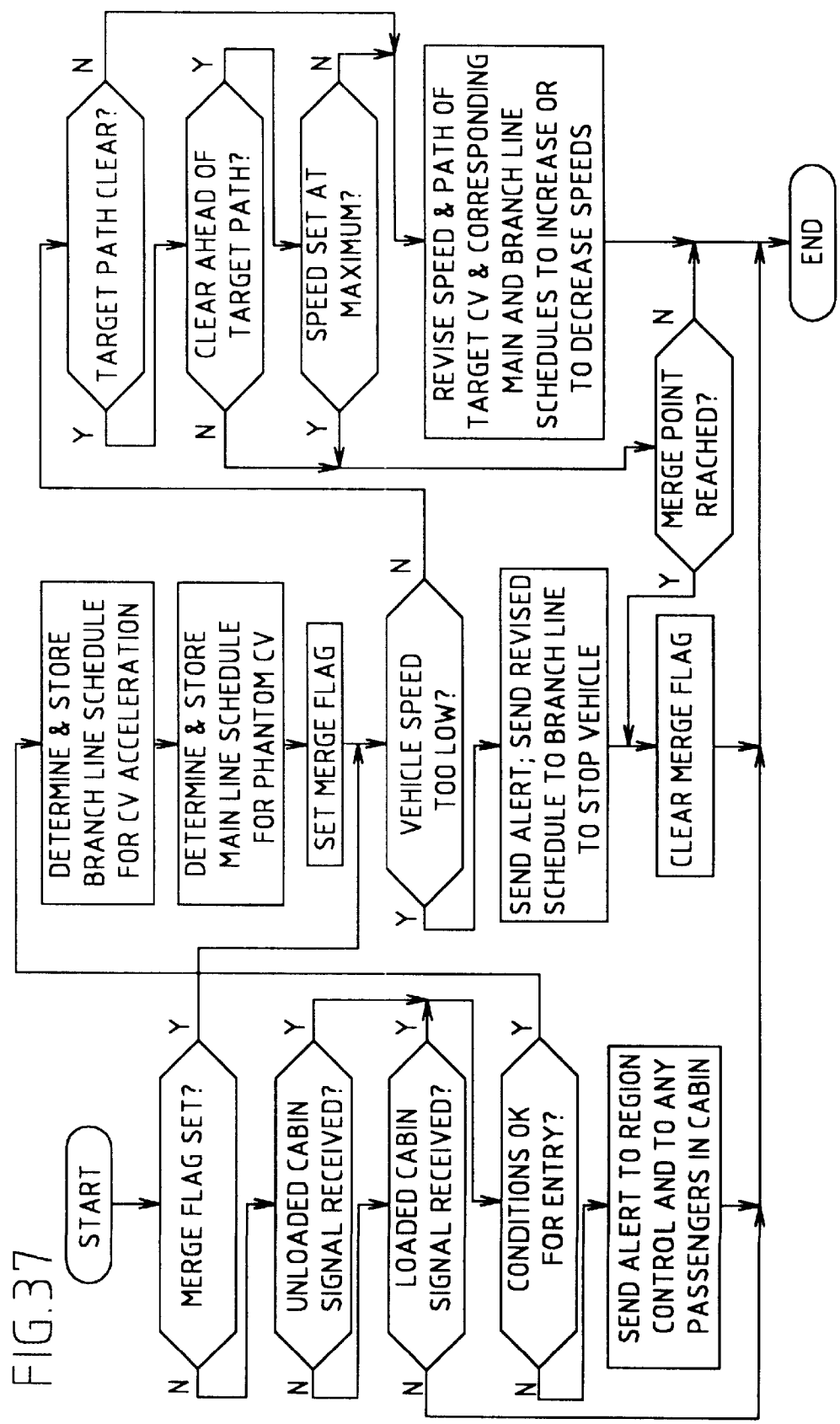
FIG. 37 is a flow diagram illustrating merging operations used in the flow diagram of FIG. 36.

Any section control unit may also send control signals to monitoring and control units under appropriate circumstances. For example, any section control unit may send data to any or all of its assigned monitoring and control units to reduce the maximum speeds of passing vehicles as required by adverse weather conditions. The section control unit 404 which is assigned to the divergent Y section may send override data to monitoring and control units to cause movement of a selected vehicle or all vehicles along a different path through the section. A section control unit assigned to a region where merging operations are to occur may send data to monitoring and control units to produce a "phantom" vehicle along a main path that corresponds to a vehicle being accelerated to move from a branch path to the main path. Merging operations are depicted in FIGS. 36 and 37 and are described hereinafter.

Also, as described in my aforementioned patents, means may be provided for establishing direct communications between a section control unit and carrier vehicles that are moving in the region to which the section unit is assigned, when such communications are either required or desired.

Carrier Vehicle Circuit (FIG. 32)

FIG. 32 is a block diagram of the carrier vehicle circuit 430, also showing components in the passenger cabin 439 as shown in FIG. 31, except that the data store and transceiver unit 438 is shown as including a data entry and storage circuit 438A and a transceiver 438B.

The circuit 430 includes a main processor 446 which is connected to a motor control circuit 447 and a transmission and drive control circuit 448 for control of a drive motor, transmission and brakes of the vehicle 270 of FIG. 22. An auxiliary processor 449 is connected to a direction and traction control circuit 450 which controls operation of the support assemblies 289, 290, 293, 294, 297 and 298 to control selective movement of the vehicle through either path of a divergent Y section and that are also usable to control traction.

The main and auxiliary processors 446 and 449 are interconnected for interchange of signals and are connected to a common memory circuit 451 that may be accessed by either processor for storage and retrieval of data.

The main processor 446 receives speed data from a tachometer 452 and has input ports connected to lines of a bus 453 for receiving data developed by the left and right side signal transmitting and receiving circuits of the vehicle 270. Such data include messages that are developed by the monitoring and control units and that include speed command data to be used by the vehicles in controlling the speeds of movement thereof. Such messages are transmitted serially in the form of signals modulated by digital data, being transmitted through monitoring and control conductors of a guideway from monitoring and control units along the guideway. In response to such signals, corresponding data are sent to the main processor 446 which then processes such data by comparing speed command data with carrier vehicle speed data developed by the tachometer 452 to send appropriate control data to the motor control and transmission and drive control circuits 447 and 448.

The main processor 446 also repetitively develops a message for transmission to monitoring and control units as the carrier vehicle 10 moves therealong. Each message includes digital data that correspond to the speed of movement of the carrier vehicle and digital "ID" data that identify the carrier vehicle. To transmit such data, the main processor 446 has output ports connected to lines of bus 453 and to lines a bus 454 for sending data to the left and right side signal transmitting and receiving circuits which develop and transmit signals to repetitively and serially transmit digital data through monitoring and control conductors to monitoring and control units. Each monitoring and control unit processes such data in a manner as hereinafter discussed to develop data including the aforementioned control data for transmission to passing vehicles.

For maximum reliability, it is desirable that monitoring and control units receive at least several complete messages during the time interval in which a carrier vehicle traveling at maximum speed passes through the length of the guideway which is assigned to one of the monitoring and control units. It is thus desirable to use a bit rate of serial transmission of the digital data which is as high as possible without sacrificing reliability and it is also desirable to minimize the length of the message. As hereinafter described, each section unit assigns identification data to each carrier vehicle entering the guideway section monitored by the unit for temporary use while the carrier vehicle moves through the section, and such temporary ID data are abbreviated in relation to complete identification data which distinguishes the carrier vehicle from all other carrier vehicles in the transportation system.

In sending messages to carrier vehicles, different communication channels, operative at different carrier frequencies, for example, are used by adjacent monitoring and control units. A channel designated as a #1 channel may be used in transmitting signals from alternate monitoring and control units along a guideway a #2 channel may be used in transmitting signals from the other monitoring and control units. Each of the signal transmitting and receiving circuits of the vehicle may develop output data from both channels and apply such data through lines that are connected to separate input ports of the main processor 446. With an overlap of regions of operation of the receiving circuits, data are received from one channel before data are no longer received by the other and information is provided to the carrier vehicle as to the location of the overlapping conductor portions. The data applied to the motor control and transmission and drive control circuits 447 and 448 are such that there is no attempt to abruptly accelerate or decelerate the vehicle in response a difference, which may sometimes be quite large, between new speed command data received from one channel and old speed command data received from the other. Instead, speed is changed at a rate which is a function of both the magnitude of the difference and the speed of travel of the vehicle.

The data entry and storage circuit 438A and the audio and video circuits 442 are coupled through the transceivers 438B and 443 to coils 457 and 458 that are inductively coupled to coils 459 and 460 when the cabin 439 is secured to the carrier vehicle 270. Other interfaces may be used including direct connections and optical couplings.

The auxiliary processor 449 is coupled through a transceiver 461, coils 459 and 457 and transceiver 438B to the data entry and storage circuit. Auxiliary processor 449 is also connected through a control line to a switch circuit 462 which couples the coil 460 to either a pair of lines of the bus 453 for the left side of the vehicle or a pair of lines of the bus 454 for the right side of the vehicle.

The audio and video circuits 442 are usable for receiving radio and television communications. Telephone communications and fax communications may also be accommodated.

Through the data entry and storage circuit 438A, data are transmitted to the auxiliary processor which include body ID data distinguishing the cabin 439 from other cabins and route data identifying the route to be followed by the vehicle 270. A passenger may enter data to change the route data to stop at a previously unscheduled destination, for example. Communications can also be transmitted from the auxiliary processor 449 to the data entry and storage circuit 438A.

The auxiliary processor 449 stores data obtained from the data entry and storage circuit 438A in the memory 451 which can be accessed by the processor 446 and sent directly to a section control unit signal transmitting and receiving circuits of the vehicle 270 and through section conductors that extend along the guideway.

When the auxiliary processor changes the direction of steering through signals applied to the direction and traction control circuit 450, the switch 462 is also operated to a corresponding position to appropriately couple either lines of bus 453 or lines of bus 454 to the transceiver 443.

Figure 33:
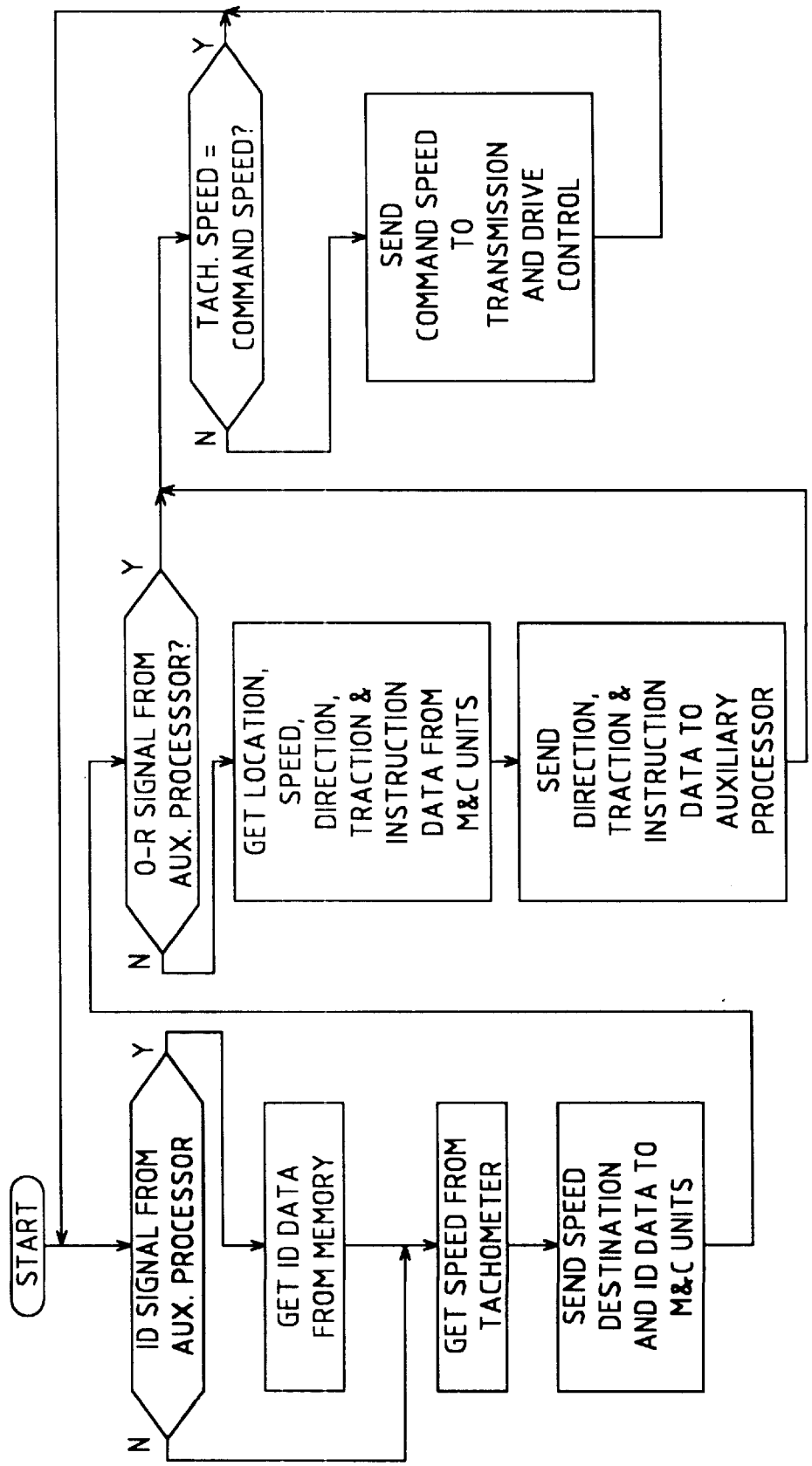
FIG. 33 is a flow diagram illustrating operations of the circuitry of FIG. 32.

Operation of Carrier Vehicle Unit (FIG. 33)

FIG. 33 is a flow chart illustrating the operation of the main processor 446 of the carrier vehicle circuit 430. At start, the Rain processor 446 checks for a signal from the auxiliary processor 449 which is applied when new temporary ID data are available to be used by the carrier vehicle 270 in continually sending data to monitoring and control units along the guideway.

Speed data are then obtained from the tachometer 452 and, along with ID data and destination data, are transmitted through one or both of the busses 453 and 454 and to one or both of the monitoring and control units that may be on opposite sides of the guideway and that are in proximity to the carrier vehicle. Usually, both busses are used in transmitting redundant data which can be compared by two monitoring and control units to detect possible errors and malfunctioning of equipment. The ID data identifies the carrier vehicle, the passenger cabin, automobile platform or other load carried by the vehicle and, for billing purposes, may identify the passengers and the owners of automobiles being carried. The destination data is obtained from that entered by passengers and automobile drivers.

A check is then made to determine whether an override signal has been developed by the auxiliary processor 449 that indicates that the section control unit is assuming direct control of the carrier vehicle. In that event, the section control unit will be sending direction, traction, instruction and speed command data to the auxiliary processor 449 which will send corresponding signals to the direction and traction control circuit 450, to a passenger cabin or other load through the transceiver 461 and to the switch 462 for operation of any audio or video circuits carried by the load. If the section unit has not assumed direct control, data is obtained from the monitoring and control units as to their location together with speed, direction, traction and instruction data. The direction, traction and instruction data are then sent to the auxiliary processor 449.

Next, speed command data, which may have been obtained either directly from the section control unit or from the nearest of the monitoring and control units along the guideway are compared with data obtained from the tachometer 452. If they are effectively equal, the operation returns to the start point. If not, the command speed data are sent to the transmission and drive control circuit 448 to correct the speed of the vehicle, accelerating or decelerating as may be required. If the speed reaches zero, the transmission and drive control circuit 450 may operate to apply brakes to all wheels of the vehicle.

Figure 34:
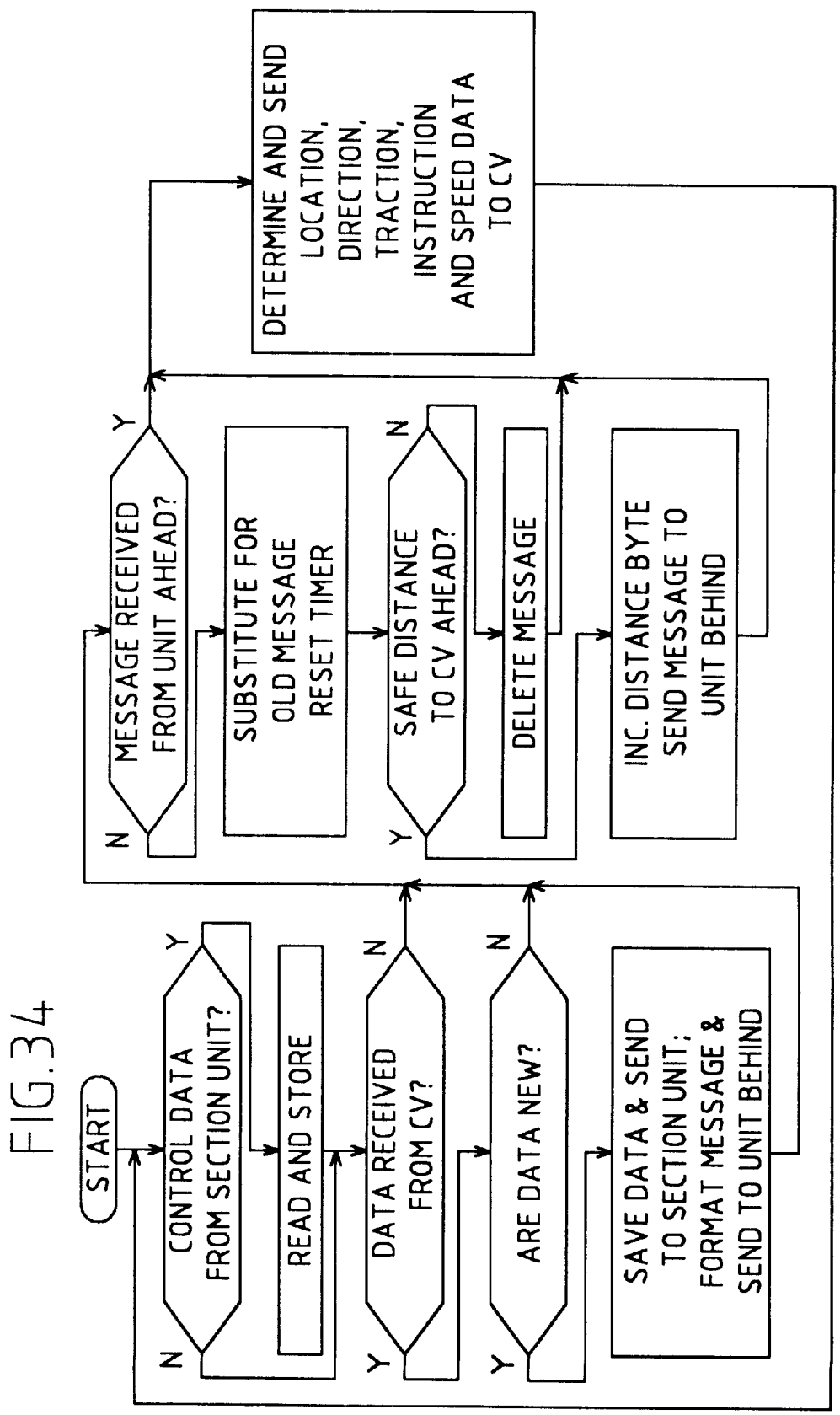
FIG. 34 is a flow diagram illustrating operations of monitoring and control units.

Operation of Monitoring & Control Unit (FIG. 34)

FIG. 34 is a flow diagram illustrating the operation of a processor of a monitoring and control unit which may have a circuit similar to that shown in FIG. 30 of my U.S. Pat. No. 5,706,735. First, the processor obtains and stores any new control data which may be available from a section control unit such as the unit 404 shown in FIGS. 29 and 30. Such data may include new maximum speed data which may dictate a lower speed of operation along a guideway when, for example, weather conditions are such that operation at high speeds is unsafe. Such data may also include direction control instructions to be sent to a carrier vehicle and instructions for passengers in a passenger cabin to be sent to the passengers through the carrier vehicle circuit.

Next a check is made for new data from a passing carrier vehicle. If new data are obtained, they are saved and then sent to the section unit. Then a message is formatted and sent to the unit behind. Each transmitted message includes speed data which may be in the form a single 8-bit byte of data, but is preferably in the form of two 8-bit bytes of data for greater accuracy.

Each message also includes data which will be referred to as the distance byte and which is initially set at zero, or some other certain value, in the originating monitoring and control unit. The message is passed along serially in a rearward direction along the guideway and the distance byte is incremented each time the message is passed so that the distance byte identifies the originating unit. If, for example, the effective spacing between units is 15 feet and the byte which originally had a zero value has been incremented in one unit increments to five, the receiving unit is supplied with data indicating that the distance to the originating unit is the product of 15 times the sum of 5 plus 1 or 90 feet. Preferably, any delays in passing the message along are insubstantial, but any substantial delays can be taken into account by a receiving unit.

As shown in the flow diagram of FIG. 34, when a message is received, it is substituted for any old message that may exist and a timer which is placed in a reset condition. Then a determination is made as to whether, for the purpose of determining whether to pass on the message to a unit behind, there is a safe distance ahead to the carrier vehicle which was just detected to originate the message. The distance to the originating unit is determined as discussed above. Whether or not it is safe to avoid passing on the message depends upon the value of the speed data in the message. If the speed data shows that the detected carrier vehicle is traveling at a high speed, there may be no need to pass the message on even though the distance is relatively short. On the other hand, if the detected carrier vehicle is traveling at a low speed or is stopped, the distance must be quite large before it is safe to not pass on the message. Accordingly, the safe value of the distance byte increases in inverse relation to the speed indicated by the speed data.

If it is determined that the message should be passed on, it is sent to the unit behind after incrementing the distance byte.

Finally, the processor of the monitoring and control unit determines direction, traction, instruction and speed data and sends such data to any passing carrier vehicle along with as to the location of the monitoring and control unit.

The direction data will control whether the grooved wheels on one side of the other of the carrier vehicle 270 will be lowered to control whether the vehicle moves through the left-hand or right-hand path of a divergent Y junction. Such data may be determined from data that are received from the passing carrier vehicle and that indicate the path to be followed through a divergent Y junction ahead of the monitoring and control unit. The data used in determining direction data may be also be data obtained from a section control unit or they may be data previously obtained by preceding monitoring and control units. Direction data obtained from more than one source should be the same and may be compared to detect possible errors.

The traction data may be obtained in a manner similar to the direction data but may be data stored in the monitoring and control unit as when, for example, the unit is along a portion of a guideway in which increased traction is desirable such as along an upwardly or downwardly inclined or curved portion of a guideway.

The instruction data may, for example, be data to be sent to a passing carrier vehicle to alert one or more passengers in a cabin carried by the vehicle that they are to exit at a station ahead or to alert occupants of an automobile carried by the vehicle that they are approaching or at a destination unloading station. Such data may determined from data obtained from the passing carrier vehicle that shows that one or more passengers have selected the station ahead.

As another example, the instruction data may be data that are to be sent to a passing carrier vehicle to send an alert as to an emergency condition to all passengers in a passenger cabin carried by the vehicle or to all occupants of an automobile carried by the vehicle. Such data may be determined from data obtained though a channel of communication between the section control unit and the monitoring and control unit. In this situation, the data may be obtained through a separate channel of communication between the section unit and the carrier vehicle, it being desirable that there be more than one channel of communication in case one should fail, especially in emergency situations.

The command speed data are determined either from maximum speed data or from data in a message from a unit ahead including data corresponding to the distance to and speed of a carrier vehicle ahead. When determined from data in a message, the command speed data will require a decreased speed when the vehicle is too close to the vehicle ahead and will require an increase in speed when the speed when the vehicle is too far behind the vehicle ahead, unless the speed is already at a speed set by the maximum speed data which may either have a default value or a value determined from data received from a section control unit.

The distance to a unit which has detected a carrier vehicle ahead is determined from the distance byte of a pending message in the manner as discussed above but does not indicate the distance to the vehicle which may have moved since the message was originated and received. To more accurately determine the distance to the vehicle a distance is added equal to the product of the speed of the vehicle and the elapsed time indicated by the aforementioned timer which was reset at the time when the pending message was originally received.

The command speed data are increased as a function of the maximum speed data, as a function of the speed of the vehicle ahead and as a function of the distance to the vehicle ahead, to obtain a certain following distance for each speed of the vehicle ahead. It is also dependent upon the capabilities of the carrier vehicle, including the responsiveness and reliability of its drive components and control circuitry and braking distances which can be safely and reliably obtained with all vehicles of the system. As examples of the considerations that are involved, if the maximum speed is 150 feet per second and the speed of the vehicle ahead is also 150 feet per second and the distance to the vehicle is 150 feet, a command speed of 150 feet per second might be quite safe. However, if the distance to the vehicle ahead is only 75 feet, it may be desirable that the command speed be reduced to less than 150 feet per second to low down any passing carrier vehicle and increase its distance to the vehicle ahead.

If the speed of the vehicle ahead is very low or if the vehicle ahead is stopped, it nay not be safe to send a command speed equal to the maximum speed until the distance to the vehicle ahead is quite large and substantially greater than a braking distance which can be safely obtained with the vehicle.

Figure 35:
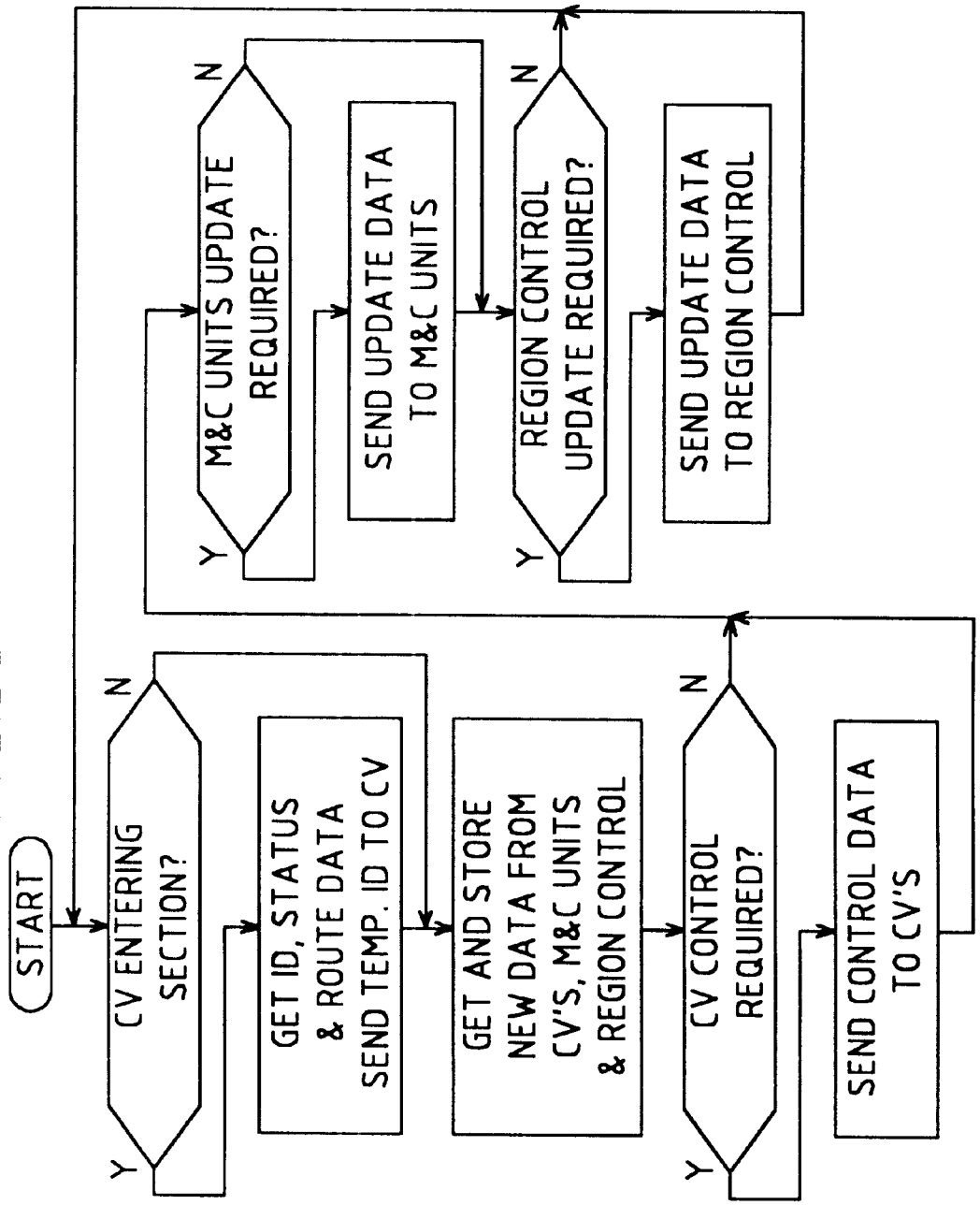
FIG. 35 is a flow diagram illustrating operations of a one type of section control unit.

Operation of Section Control Units (FIGS. 35–37)

FIGS. 35 and 36 show two types of flow diagrams for section control units. FIG. 35 is a diagram for section units such as units 403–407 and 409 of FIG. 29 or units 415, 416, 418, 419, 420 and 422 of FIG. 30 that do not control merge operations but which may control movements through divergent Y sections. FIG. 36 is applicable to section units that may control merging movements of vehicles that may enter the section from a main path or either of two branch paths while FIG. 37 shows details of a merge operation of FIG. 36. FIG. 36 is particularly applicable to the section unit 408 of FIG. 29 that controls merging of vehicles from either an unloading path or a loading path. A simplified version of FIG. 36 may be applied to the section units 417 and 421 of FIG. 30 or to other section units that control merging from a single branch path into a main path.

The section control unit operation of FIG. 35 starts with obtaining data from any carrier vehicle (CV) that may be entering the section. Complete ID data and status and route information are obtained from the entering vehicle and temporary ID data of abbreviated form may be assigned to and sent to the vehicle. Temporary ID data may not be required but is desirable in sections in which a number of vehicles may be present at the same time.

The data obtained by the section control unit from an entering carrier vehicle may be obtained directly and/or through the initial monitoring and control unit. It may include complete identification data as to the entering vehicle and the type of load, if any, that the vehicle carries and the route to a final destination the vehicle. As examples, the data may show that the vehicle carries no load and that it is being moved through a certain interchange to a certain storage or load transfer location; or that an empty platform is being moved to a certain automobile loading location through certain interchanges; or that an identified automobile is being carried to a certain automobile unloading location; or that an empty passenger cabin is being carried to a certain passenger loading station; or that certain identified passengers are being carried toward certain final destinations using certain transfer locations, if there are any.

Then any new data available from other carrier vehicles and monitoring and control units in the section, or from the region control unit, are obtained and stored in memory. From such data, a determination is made as to whether a situation exists that requires direct control of any or all carrier vehicles in the region to which the section unit is assigned. Such direct control may be exercised to insure that a vehicle will move through the proper path of a divergent Y junction. It may also be exercised when, for example, data has been received from region control for changing the destination of an empty vehicle or a vehicle which carries an empty passenger cabin or automobile platform. Direct control may also be exercised whenever a distress signal has been received from a passenger in a passenger cabin or an automobile driver or where there are weather, power failure or other conditions that require communications to passengers in passenger cabins and occupants of automobiles being carried.

If indicated, direct control is initiated by sending an override signal to the auxiliary processor 449 of the carrier vehicle and then sending any required speed, direction, traction and instruction data to the auxiliary processor 449.

The next operation shown in FIG. 35 is an operation to update data in the monitoring and control units of the section. An update of such data may be required to insure that a vehicle approaching a divergent Y section will follow the proper path through the section. It may also be required if, for example, data received from region control requires that the maximum speed of vehicles should be reduced because of adverse weather conditions. As another example, the section control unit may be programmed to respond to a disabled vehicle on a branch path of a divergent Y junction by sending data to monitoring and control units to move all vehicles on the main path and to alert passengers in passenger cabins and occupants of automobiles as to what is happening.

The final section control operation of FIG. 35 is to send update data to the region control unit as to any change since the last update of such data. For billing purposes, the region control unit requires data as use of the system by passengers, automobile owners and freight shippers and data as to the locations and status of all vehicles is required for use in monitoring and supervising overall operations and controlling movement and dispatching of vehicles for efficient use thereof.

FIG. 36 differs from FIG. 35 in that identification, status and route data are obtained from vehicles entering a main path, a first branch path or a second branch path and also differs in that a final operation performed in each cycle is a merge operation, the details of which are shown in FIG. 37. The first and second branch paths are indicated as being an unloading path and a loading path, the diagram being particularly applicable to operation of the section unit 408 of FIG. 29. A simplified version of FIG. 36 may be used for section units such as units 417 and 421 in which there is only one branch path which is used for either loading or unloading of cabins, or for any section unit that may control merging of vehicles from a single branch path into a main path.

The operation of FIG. 36 is more complex than that of FIG. 35 with respect to the number of vehicles that are being monitored and controlled. It is also more complex in that during merging operations, update of monitoring and control units will be required in each cycle and update data will be sent to the monitoring and control units during each cycle that includes merge data developed from schedules that are determined during the merge operation shown in FIG. 37. Such merge data operates to simulate a phantom vehicle moving along the main path and to control movement of a vehicle that is accelerating on a branch path and moving toward entry into the main path.

The merging operations illustrated in FIG. 37 are similar to those used and discussed in detail in my prior disclosures including that in my U.S. Pat. No. 5,706,735. When a cabin is ready for movement into the main line path, after passengers have entered from the loading platform 45 of the station 14 or exited onto the unloading platform 46, the carrier vehicle cannot be simply accelerated and moved into the main line path since it might collide with a carrier vehicle moving along the main line path. To avoid such a collision, use is made of the message passing operations of the monitoring and control units that have been described in connection with FIG. 34. Data are supplied to monitoring and control units to produce a scheduled acceleration of an entering vehicle along a branch path and to initially create a "phantom" vehicle on the main line path at a point well in advance of a merge point at which a branch path enters the main path. The speed of the phantom vehicle so created is thereafter gradually reduced to follow at a safe distance behind any vehicle that may be ahead on the main line path when a merge point is reached. Any vehicle that may be behind the phantom vehicle is caused to follow at a safe following distance. In effect, a space is opened up for safe entry of the accelerating vehicle into the main line path when it reaches the merge point.

As shown in FIG. 37, a test is made for a set condition of a merge flag which is set after setting up for merge operations. If the merge flag is not set, a test is made for an unloaded cabin signal which may be applied after one or more passengers have exited a cabin at the platform 46 and the doors of the cabin have been closed to allow movement to a destination of a passenger who remains aboard or to a storage location of the cabin if empty. If no unloaded cabin signal is received, a similar test is made for a loaded cabin signal which may be applied when one or more passengers have entered a cabin from the platform 45 and the cabin ready for movement to a selected destination.

If neither an unloaded cabin signal nor a loaded cabin signal is received the merge operation is ended. However, if either signal is received, a check is made to see if conditions for entry are satisfactory. This check includes a check of all monitoring and control units along both the main path and both branch paths, to determine among other things whether there are vehicles on the main path which are stalled or moving too slowly and which would interfere with entrance of the waiting vehicle on the branch path. If conditions are not satisfactory, alerts are sent to region control and also to any occupants of the vehicle to inform them about the situation.

If conditions for entry are satisfactory, a determination is made as to the speed and position of a target vehicle on the main path which may either be an actual vehicle moving along the main line path or an imaginary vehicle if no actual vehicle is present. Data are then determined as to a branch path schedule for acceleration of the waiting vehicle to reach the merge point at a safe following distance behind the target vehicle. Data are also determined as to a main line schedule for a phantom vehicle that will be following the target vehicle at a safe following distance when the target vehicle reaches the merge point. The data forming such branch path and main path schedules determine the update data that is sent to the monitoring and control units along the branch and main paths during each part of the complete cycle as shown in FIG. 36.

The target vehicle may be an actual or imaginary vehicle moving at a normal speed along the main path or it lay be an actual vehicle that is moving at a slower than normal speed. The schedule of the phantom vehicle may be so determined as to start at the initial position of the target vehicle and to then gradually reduce its speed and thereby increase the distance it follows behind the target vehicle to reach a safe following distance before the phantom vehicle reaches the merge point. Any vehicle that is initially behind the target vehicle may then "see" the phantom vehicle as being ahead and will reduce its speed and maintain a safe following distance behind the target vehicle.

The operation takes into account that conditions may change. A vehicle on the main path that is chosen as the target may slow down to require the entering vehicle reduce its rate of acceleration, or it may increase its speed from a less than normal initial speed to allow the entering vehicle to increase its rate of acceleration. The entering vehicle may not accelerate according to the initial schedule but still accelerate at an acceptable rate, or it may fail to accelerate at an acceptable rate.

After the initial schedules are determined, the acceleration of the waiting vehicle is initiated and the merge flag is set.

Next, a check is made as to whether the speed of the entering vehicle is too low in relation to the scheduled speed. If the speed at any time is below an acceptable limit such that the vehicle is unlikely to be capable of reaching the desired speed when entering the main path, a signal is sent to monitoring and control units of the branch guideway to bring the vehicle to a stop and appropriate alerts are sent, the merge flag being then cleared.

If the speed of the entering vehicle is acceptable, a check is made determine whether a target path is clear. The target path is clear if there is no vehicle in the main path that is within a safe following distance behind either the target vehicle or the phantom vehicle. If the target path is not clear due to slowing down of the vehicle that was chosen as the target vehicle, the branch and main line schedules are revised to decrease speeds.

There are also conditions in which the schedules may be revised to increase speeds as when the speed of the vehicle originally chosen as the target vehicle was initially low and has since increased. If the target path is clear, a further check is made to determine whether the main line is clear for a certain distance ahead of the target path and whether the set speed is at a maximum. It the path is clear ahead and the set speed is not at a maximum, speed and path of the target vehicle and the branch and main line schedules are changed to increase speeds.

If the target path is clear but the main guideway path is not clear ahead of the target path or if the speed has been set at a maximum, a check is made to determine whether the merge point has been reached, in which case the merge flag is cleared.

The use of the merge flag as shown is desirable for maximum safety in that it prevents the start of acceleration of one vehicle while another vehicle is being accelerated, but limits the rate at which vehicles can enter the main line. To speed up operations, one vehicle could be allowed to start accelerating while one or more other vehicles are being accelerated by providing a plurality of merge operations similar to that shown in FIG. 37 that are assigned to vehicles as they are ready to start. Each such operation should include a merge flag for that operation and should also include branch and main line schedule determinations that take into account the positions and speeds of other vehicles on the main and branch paths.

Figure 38:
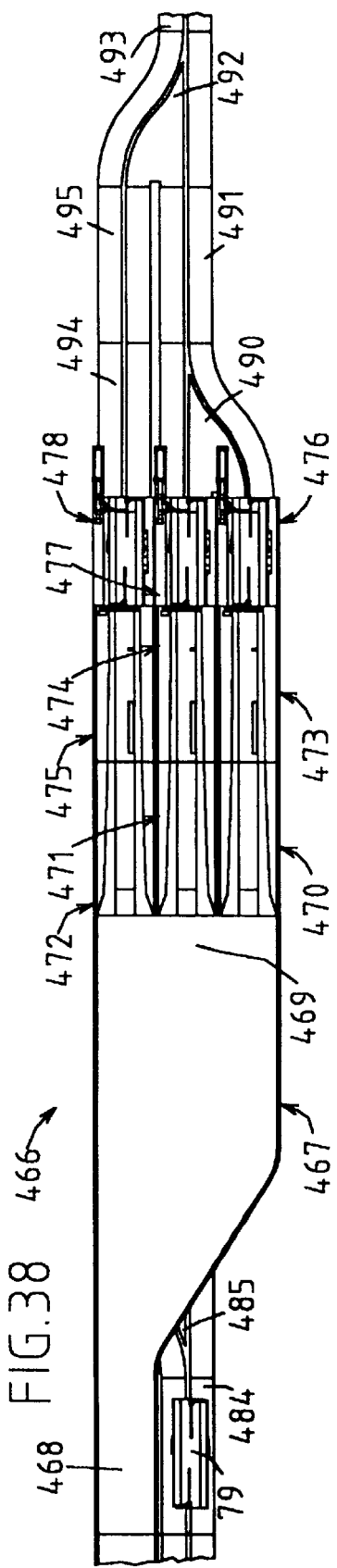
FIG. 38 is a top plan view of a three lane loading station.
Figure 39:
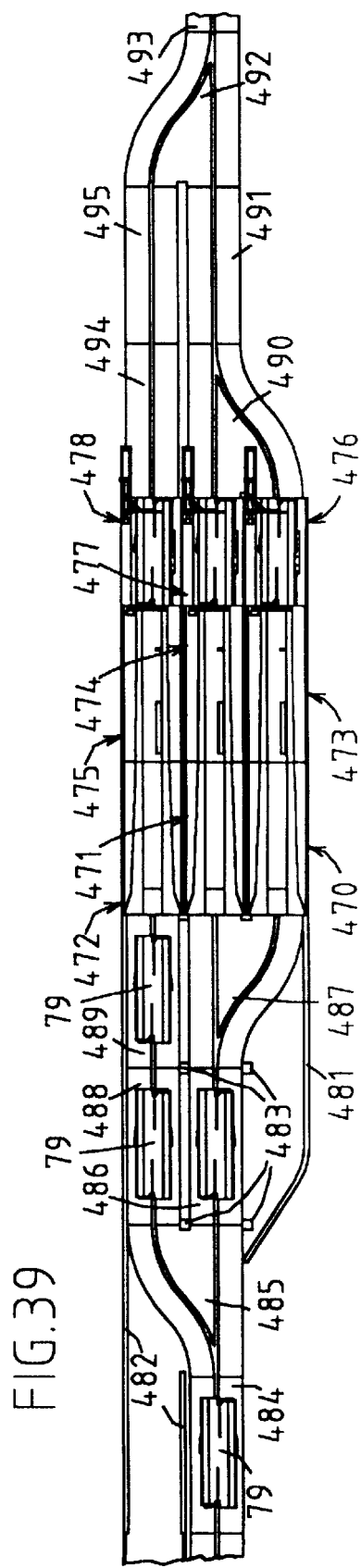
FIG. 39 is a view like FIG. 38 but with an automobile support structure removed to show the configuration of guideways.

Multi-lane Automobile Loading Station (FIGS. 38 and 39)

A multi-lane automobile loading station 466 is shown in FIGS. 38 and 39 which allows rapid loading of automobiles onto platforms in periods of peak demand, thereby reducing waiting times and increasing the number of vehicles that can enter during rush hours. A three lane station is shown but it will be understood stations may be provided having any desired number of lanes.

The station 466 as shown in the top plan view of FIG. 38 includes an automobile entry structure 467 which provides an area which widens from a single lane entry portion 468 to an exit portion 469 that is three lanes wide. Automobiles can be driven from the exit portion 469 and through three entrance sections 470, 471 and 472 and three supply sections 473, 474 and 475 and onto waiting platforms 79 in exit portions 476, 477 and 478. The entrance sections 470–472, supply sections 473–475 and exit sections 476–478 have constructions like the entrance section 90, supply section 93 and exit section 94 of the single lane loading station shown in FIGS. 4–6 and 9–12.

FIG. 39 shows the station 466 with the automobile entry structure 467 removed, to show guideways for carrier vehicles that carry platforms into the entrance sections 470–472. FIG. 39 also shows wall structures 481 and 482 and columns 483 that support the automobile entry structure 467 above the path of platforms moved along the guideways. A platform 79 is shown above a guideway section 484 which is at the end of a queue portion of a branch guideway. The queue portion may store a large number of platforms waiting to enter the station 466 when required.

Platforms 79 may be moved by the vehicles from the section 484 and through any one of three paths. The first path is through the right-hand side of a divergent Y section 485, then through a straight section 486 and through the right-hand side of a divergent Y section 487 and into the entrance section 470. The second path is through the right-hand side of the section 485, the section 486 and the left-hand side of section 487 and into the entrance section 471. The third path is through the left-hand side of section 485 and through straight sections 489 and 490 and into the entrance section 472.

After loading of an automobile onto a platform in the exit section 476, the carrier vehicle for the platform is moved into the right-hand side of a convergent Y section 490, then through a straight guideway section 491, then through the right-hand side of a convergent Y section 492 and to a section 493 from which it may move through the right-hand section of another convergent Y section, not shown, and into a main guideway path, also not shown.

After loading of an automobile onto a platform in the exit section 477, the carrier vehicle for the platform is moved into the left-hand side of the convergent Y section 490, then through the straight guideway section 491, then through the right-hand side of the convergent Y section 492 and to the section 493.

After loading of an automobile onto a platform in the exit section 478, the carrier vehicle for the platform is moved through straight sections 494 and 494 and through the left-hand side of the convergent Y section 492 and to the section 493.

Unloading operations require less time than loading operations, but where desired, a multi-lane automobile unloading station can be provided. For example, a three lane unloading station may have a construction similar to that of the multi-lane loading station 466. It may use guideway sections like the sections 485–489 of the station 466 for entry of automobiles on platforms, three entrance and three receiving sections that are in side-by-side relation and that are like sections 119 and 120. For exit of platforms that are empty after being unloaded, guideway sections may be provided that are like sections 490–495 and that are below an automobile exit structure which is the mirror image of the automobile entrance structure 467 of the station 466.

It will be understood that modifications and variations may be effected without departing from the spirit and scope of the novel concepts of this invention.

I claim:

1. A transportation system, comprising a plurality of load-carriers, a plurality of vehicles for carrying said load-carriers, and guideways defining paths for movement of said vehicles to position said vehicles at loading regions for loading of loads on said load-carriers and at unloading regions for unloading of loads from said load-carriers, characterized in that said paths include a main path for movement of said vehicles at high speed therealong and branch paths that extend along said main path between divergent and convergent Y sections which allow movement of said vehicles off of said main path and to stop points in said branch paths and then back to enter said main path at merge points at the ends of said convergent Y sections, said loading regions being located at stop points in certain of said branch paths and said unloading regions being located at stop points in others of said branch paths, each of said vehicles being controllable to move from said main path and onto one of said certain branch paths to stop at one of said loading regions for rapid loading of a load-carrier thereat and being controllable to thereafter automatically move from said one of said certain branch paths and through said main path at high speed and through one or more of said others of said branch paths to stop at one or more of said unloading regions for unloading of a load from a load-carrier at each such unloading region.

2. A transportation system as defined in claim 1, wherein said certain branch paths include queue portions that immediately precede loading regions of said certain branch paths and that facilitate rapid movement of said vehicles and said load-carriers to said loading regions of said certain branch paths, said queue portions having sizes sufficient for containing at least several load-carriers awaiting entry into said loading regions of said certain branch paths.

3. A transportation system as defined in claim 2, wherein certain of said loading regions are arranged into groups, each group following a queue portion of one branch path, and the loading regions of each group being usable for loading of loads at the same time.

4. A transportation system as defined in claim 3, wherein the loading regions of certain of said groups of loading regions are located seriatim along branch path portions of substantial length and are usable for loading of passengers into a plurality passenger cabins at the same time.

5. A transportation system as defined in claim 3, wherein loading regions of certain of said groups of loading regions are selectively usable, wherein first guideway means are provided for allowing selective movement of load-carriers from a queue portion of a branch path to said selectively usable loading regions of said certain of said groups, and wherein second guideway means are provided to allow movement of loaded load-carriers from said selectively usable loading regions of said certain of said groups and to an end portion of said branch path.

6. A transportation system as defined in claim 5, wherein certain of said load-carriers are automobile-carriers that are arranged to support automobiles thereon, and wherein said selectively usable loading regions are for loading of automobiles onto said automobile-carriers.

7. A transportation system as defined in claim 5, including load-supply means for supporting loads in regions above said first guideway means and on rearward sides of said selectively usable loading regions for movement of said loads forwardly from said load-supply means and onto load-carriers in said selectively usable loading regions.

8. A transportation system as defined in claim 7, wherein said load-supply means and load-carriers in said selectively usable loading regions are relatively positionable in a first condition in which forward ends of said load-supply means and rearward ends of said load-carriers are at substantially the same level and are also relatively positionable in a second condition in which movement of load-carriers is allowed from said queue portions and under said load-supply means to said selectively usable loading regions, means for placing said load-supply means and load-carriers in said first condition for transfer of loads from said load-supply means to said load carriers, and means for placing said load-supply means and said load-carriers in said second condition for movement of load-carriers from said queue and under said load-supply means to said loading regions.

9. A transportation system as defined in claim 8, wherein certain of said load-carriers are automobile-carriers that are arranged to support automobiles thereon and wherein said load-supply means allow automobiles to be driven thereon and to be driven therefrom onto said automobile-carriers.

10. A transportation system as defined in claim 1, wherein certain of said load-carriers are automobile-carriers that are arranged to support automobiles thereon and wherein certain of said loading and unloading regions are usable for loading and unloading of automobiles onto and from said automobile-carriers.

11. A transportation system as defined in claim 10, wherein others of said load-carriers are passenger cabins and wherein others of said loading and unloading regions are usable for loading and unloading of passengers into and from said passenger cabins.

12. A transportation system as defined in claim 1, wherein at least one station is provided having loading regions and unloading regions at different loading and unloading levels and in adjacent relation to portions of associated branch paths that are located one above the other.

13. A transportation system as defined in claim 12, wherein certain of said loading regions are passenger loading regions for loading of passengers onto passenger cabins and certain of said unloading regions are passenger unloading regions for unloading of passengers from passenger cabins.

14. A transportation system as defined in claim 1, wherein certain of said loading regions are passenger loading regions for loading of passengers onto passenger cabins and certain of said unloading regions are passenger unloading regions for unloading of passengers from passenger cabins, wherein a plurality of passengers may enter a passenger cabin together at each of said passenger loading regions and select one or more of said passenger unloading regions as destinations, and wherein said vehicles are controllable to stop each passenger cabin loaded with one or more passengers only at passenger unloading regions selected by passengers who have entered together at one of said passenger loading regions.

15. A transportation system as defined in claim 1, wherein certain of said loading regions are passenger loading regions for loading of passengers onto passenger cabins and certain of said unloading regions are passenger unloading regions for unloading of passengers from passenger cabins, and wherein at least one station is provided having a passenger loading region and a passenger unloading region at different levels that are both above ground level and in adjacent relation to portions of associated branch paths that are located one above the other, said station including an up escalator for moving departing passengers from said ground level to said passenger loading region and a down escalator for moving passengers from said unloading region to said ground level.

16. A transportation system as defined in claim 1, wherein a pair of main paths guideway paths are provided in adjacent parallel relation for vehicles moving in opposite directions, wherein a pair of branch paths extend along said pair of main paths and allow movement of vehicles off of said main paths and to stop points and then back onto said main paths, wherein certain of said load-carriers are passenger cabins, and wherein a passenger loading station is provided along one of said pair of branch paths and a passenger unloading station is provided along the other of said pair of branch paths.

17. A transportation system as defined in claim 16, means providing an interconnecting path for movement of passengers between said passenger loading and unloading stations to allow passengers exiting from a passenger cabin at said passenger unloading station to move to said passenger loading station.

18. A transportation system, comprising a plurality of load-carriers, a plurality of vehicles for carrying said load-carriers, and guideways defining paths for movement of said vehicles to position said vehicles at loading and unloading regions for loading of loads on said load-carriers and for unloading of loads from said load-carriers, characterized in that said paths include a main path and branch paths that extend along said main path between divergent and convergent Y sections which allow movement of vehicles off of said main path and to stop points and then back to enter said main path at merge points at the ends of said convergent Y sections, said loading and unloading regions being located at stop points in said branch paths, each of said vehicles being controllable to move from said main path and onto one of said branch paths to stop at one of said loading regions for loading of a load-carrier thereat and being controllable to thereafter automatically move through said main path and through one or more of said others of said branch paths to stop at one or more of said unloading regions for unloading of a load from a load-carrier at each such unloading region, wherein monitoring and control means are provided at intervals along said main and branch paths, and wherein said vehicles move past said monitoring and control means during movement along said main and branch paths, said vehicles including data communication means for receiving data from and sending data to load-carriers carried by said vehicles and for receiving data from and sending data to said monitoring and control means while passing thereby, whereby data communication links are provided between said monitoring and control units and said load-carriers through said data communication means of passing vehicles.

19. A transportation system as defined in claim 18, wherein certain of said load-carriers are passenger cabins each of which may carry a number of passengers and each of which includes data entry and display means for each passenger, said data communication means being usable for communicating data that indicate the desires of passengers to said monitoring and control units and being usable for communicating instructions from said monitoring and control units to said passengers.

20. A transportation system as defined in claim 1, wherein each of said vehicles comprises: direction control means for control of the direction of movement through said divergent Y sections to control between continuing movement on a main path and moving on a branch path to a stop point therealong, and means for obtaining direction control data during movement along said guideway paths for control of said direction control means to cause said vehicle to move along a main path until reaching a divergent Y section that leads to a destination stop point.

21. A transportation system as defined in claim 20, wherein monitoring and control means are provided along said main and branch paths for sending speed command data to passing vehicles, and wherein each of said vehicles includes means responsive to said speed command data to control its speed of movement.

22. A transportation system as defined in claim 21, wherein said speed command data control the speeds of vehicles moving on main and branch paths toward each convergent Y section to allow vehicles moving from said branch path to safely merge between vehicles moving on said main path.

23. A transportation system as defined in claim 20, wherein monitoring and control means are provided at intervals along said guideway paths, wherein each of said vehicles includes means for sending destination data to said monitoring and control units, and wherein each of said monitoring and control means includes means for receiving destination data from a passing vehicle and sending corresponding control data to a passing vehicle.

24. A transportation system as defined in claim 23, wherein each of said monitoring and control means includes means for sending instruction data to a passing vehicle, and wherein each of said vehicles includes means for receiving said instruction data and for supplying corresponding instructions to an occupant of a load carried by the vehicle.

25. A transportation system as defined in claim 23, wherein each of said monitoring and control means obtains speed data as to the speed of passing vehicles and passes said speed data in a rearward direction to other monitoring and control means, wherein each of said monitoring and control means processes speed data passed from monitoring and control means ahead and determines and sends speed command data to any passing vehicle, and wherein each of said vehicles includes means responsive to received speed command data for controlling its speed of movement.

26. A transportation system as defined in claim 25, wherein said speed command data control the speeds of vehicles moving on main and branch paths toward said merge points to allow vehicles moving from said branch path to reach said merge points between vehicles moving on said main path.

27. A transportation system as defined in claim 26, wherein phantom vehicle data are supplied to monitoring and control means along said main path to be passed rearwardly and to have the effect of causing vehicles moving therealong to see phantom vehicles ahead that will reach merge points at the same times as vehicles entering from branch paths.

28. A transportation system comprising a plurality of load-carriers, a plurality of vehicles for carrying said load-carriers, and guideways defining paths for movement of said vehicles to position said vehicles at stop regions that include regions for loading and unloading of loads on and from said load-carriers, said paths including first and second paths in side-by-side relation for movement of said vehicles in parallel but opposite first and second directions, third and fourth paths that cross said first and second paths in a crossing region and that are in side-by-side relation for movement of said vehicles in parallel but opposite third and fourth directions, a first branch path extending from said first path and in said first direction toward said crossing region and then turning to extend in said fourth direction away from said crossing region to join said fourth path, and a second branch path extending from said first path and in said first direction toward said crossing region and then turning to extend in said third direction away from said crossing region and to then join said third path, portions of said first and paths that are in said crossing region being at a first level, portions of said third and fourth paths that are in said crossing region being at a second level that is different from said first level, and a portion of said second branch path that is in said crossing region being at a third level that is different from said first and second levels, thereby avoiding interference between paths in said crossing region.

29. A transportation system as defined in claim 28, wherein said guideways are supported in regions that are above intersecting first and second streets with said first and second paths being above middle portions of said first street and said third and fourth paths being above middle portions of said third and fourth streets, initial portions of said first and second branch paths being above one side portion of said first street, and final portions of said first and second branch paths being above opposite side portions of said second street.

30. A transportation system as defined in claim 28, wherein said paths further include a third branch path extending from said third path and in said third direction toward said crossing region and then turning to extend in said first direction away from said crossing region to then join said first path, and a fourth branch path extending from said third path and in said third direction toward said crossing region and then turning to extend in said second direction away from said crossing region and to then join said second path, said fourth branch path being at a fourth level that is different from said first, second and third levels.

31. A transportation system as defined in claim 30, wherein said paths further include a fifth branch path extending from said second path and in said second direction toward said crossing region and then turning to extend in said third direction away from said crossing region to then join said third path, and a sixth branch path extending from said second path and in said second direction toward said crossing region and then turning to extend in said fourth direction away from said crossing region and to then join said fourth path, said sixth branch path being at said third level.

32. A transportation system as defined in claim 31, wherein said paths further include a seventh branch path extending from said fourth path and in said fourth direction toward said crossing region and then turning to extend in said second direction away from said crossing region to then join said second path, and an eighth branch path extending from said fourth path and in said fourth direction toward said crossing region and then turning to extend in said first direction away from said crossing region and to then join said first path, said eighth branch path being at said fourth level.

33. A transportation system, comprising: loading and unloading stations, a plurality of load-carriers in the form of automobile platforms, a plurality of carrier vehicles for carrying said platforms, guideway means defining paths of movement of said vehicles, said platforms being movable along said guideway means and in loaded conditions from loading positions at said loading stations to unloading positions at said unloading stations and being movable alone said guideway means in an unloaded condition from said unloading positions at said unloading stations to said loading positions at said loading stations, forward and rearward lock means operable to project upwardly from said platforms for engagement with forwardly and rearwardly facing portions of automobiles to limit movement of said automobiles relative to said platforms, and means for placing both of said rearward and forward lock means in lowered positions during movements of said platforms when in an unloaded condition, for keeping said rearward lock means at a lowered position at said loading stations while moving automobiles in a forward direction and onto platforms in loading positions thereat, for operating both of said rearward and forward lock means to said upwardly protecting positions to lock an automobile thereto during movements of said platforms in loaded conditions, and for lowering said forward lock means at said unloading stations while moving automobiles in a forward direction and off of platforms in unloading positions thereat.

34. A transportation system as defined in claim 33, control gate means at said loading and unloading stations for control of movements of automobiles onto and off of said platforms.

35. A transportation system as defined in claim 33, wherein said loading stations include load-supply means for supporting automobiles in positions to be moved in said forward direction and onto platforms in loading positions thereat, and wherein said unloading stations include load-receiving means for supporting automobiles moved in said forward direction and off of platforms in unloading positions thereat, said paths of movement being such that said platforms are moved under said load-supply means to reach said loading positions and being such that said platforms are moved under said load-receiving means after being unloaded at said unloading positions, and wherein first positioning means are provided for positioning forward ends of said load-supply means at the same level as rearward ends of platforms in said loading positions, and second positioning means are provided for positioning rearward ends of said load-receiving means at the same level as forward ends of said platforms in said unloading positions.

36. A transportation system as defined in claim 35, wherein said load-supply means are pivotally supported for movement about horizontal axes at rearward ends thereof, and wherein said load-receiving means are pivotally supported for movement about horizontal axes at forward ends thereof, said first positioning means comprising means for elevating forward ends of said load-supply means while moving platforms under said load-supply means and to said loading positions and lowering said forward ends of said load-supply means to the level of said rearward ends of said platforms in said loading positions, and said second positioning means comprising means for lowering said rearward ends of said load-receiving means to the level of said forward ends of said platforms in said unloading positions and for elevating rearward ends of said load-receiving means while moving platforms under said load-receiving means and from said unloading positions.

37. A transportation system as defined in claim 35, including means for lowering both of said forward and rearward lock means during movements of said platforms to said loading positions at said loading stations and also during movements of said platforms from said unloading positions at said unloading stations.

38. A transportation system as defined in claim 35, wherein said loading stations and unloading stations, said loading and unloading positions thereof, guideway paths adjacent thereto and said load-supply and load-receiving means thereof are all elevated above ground level, upwardly inclined ramp means for use in driving automobiles from ground level to said load-supply means, and downwardly inclined means for use in driving automobiles from said load-receiving means to ground level.

39. A transportation system as defined in claim 33, wherein buffer means are provided in said loading stations that include buffer elements engageable by the front bumpers of automobiles being moved onto platforms in said loading positions and that resiliently limit forward movements of automobiles and absorb energy, said buffer means being movable out of the paths of forward movement of platforms after loading of automobiles thereon.

40. A transportation system as defined in claim 39, display means carried by said buffer means for displaying instructions to drivers of automobiles.

41. A transportation system as defined in claim 39, means operable before said automobiles are moved onto platforms in said loading positions for effecting measurements of dimensions of said automobiles and for controlling positioning of said buffer means to properly position said automobiles on said platforms when front bumpers thereof engage said buffer elements.

42. A transportation system as defined in claim 33, wherein lock control means are provided at said loading stations that operate after loading of automobiles on said platforms to move said forward and rearward lock means upwardly from folded positions and then rearwardly and forwardly into engagement with front and rear bumpers of the automobiles, and wherein lock control means are provided at said unloading stations to move said forward and rearward lock means forwardly and rearwardly and then downwardly to said folded positions.

43. A transportation system as defined in claim 42, wherein protective elements are provided at the sides of said platforms that are controlled by said lock control means to be moved upwardly from lower folded positions to upwardly projecting protective positions alongside automobiles on said platforms.

44. Apparatus for use in moving automobiles, comprising: platforms for supporting said automobiles, forward and rearward lock means movable from lowered folded positions to upwardly projecting unfolded positions, actuating means for moving said forward lock means rearwardly while in said unfolded positions to engage forwardly facing portions of automobiles and for moving said rearward lock means forwardly while in said unfolded positions to engage rearwardly facing portions of automobiles so as to limit forward and rearward movements of said automobiles relative to said platforms, said actuating means being operable for lowering said rearward lock means to folded positions when moving automobiles in a forward direction and onto said platform, and said actuating means being operable for lowering said forward lock means to folded positions when moving automobiles in a forward direction and off of said platform.

45. Apparatus as defined in claim 44, said actuating means including first operating elements operable when loading automobiles onto platforms to initially move said forward and rearward lock means from said lowered folded positions to said upwardly projecting unfolded positions and second and third operating elements operable to then move said forward lock means in rearward directions and said rearward lock means in forward directions and into engagement with said portions of automobiles, said second and third operating elements being initially operable when unloading automobiles from platforms to move said forward and rearward lock means in forward and rearward directions away from said portions of said automobiles and said first operating elements being then operable to move both of said forward and rearward lock means downwardly to said lowered folded positions.

46. Apparatus as defined in claim 45, wherein said forward and rearward lock means are engageable with front and rear bumpers of automobiles and are supported at the forward and rearward ends of first and second support members and that are rotatable about longitudinal axes parallel to the direction of movement of said automobiles onto and off of said platforms, said first operating elements being connected to said support members to rotate said support members about said axes when moving said lock means between folded and unfolded conditions, and said second and third operating elements being connected to said support members to move said support members in longitudinal directions when moving said lock means toward and away from said bumpers.

47. Apparatus as defined in claim 46, wherein rack and pinion means are provided for moving said support members in said longitudinal directions, said rack and pinion means including pinions connected to said second and third operating elements and racks connected to said support members.

48. Apparatus as defined in claim 45, wherein separate loading and unloading positions are provided for loading and unloading of said platforms, said actuating means including loading control elements positioned for operative engagement with said first, second and third operating elements when said platforms are in said loading positions and including unloading control elements positioned for operative engagement with said first, second and third operating elements when said platforms are in said unloading positions.

* * * * *